(12) United States Patent
Baribault et al.

(10) Patent No.: US 11,474,253 B2
(45) Date of Patent: Oct. 18, 2022

(54) BEAM-STEERING DEVICES AND METHODS FOR LIDAR APPLICATIONS

(71) Applicant: LeddarTech Inc., Quebec (CA)

(72) Inventors: Robert Baribault, Quebec (CA); Pierre Olivier, Quebec (CA)

(*) Notice: Subject to any disclaimer, the term of this patent is extended or adjusted under 35 U.S.C. 154(b) by 0 days.

(21) Appl. No.: 17/703,581

(22) Filed: Mar. 24, 2022

(65) Prior Publication Data
US 2022/0229190 A1 Jul. 21, 2022

Related U.S. Application Data

(63) Continuation of application No. 17/382,155, filed on Jul. 21, 2021.
(Continued)

(51) Int. Cl.
*G01S 17/93* (2020.01)
*G01S 7/481* (2006.01)
(Continued)

(52) U.S. Cl.
CPC ............ *G01S 17/93* (2013.01); *G01S 7/4817* (2013.01); *G01S 7/4865* (2013.01); *G01S 7/497* (2013.01);
(Continued)

(58) Field of Classification Search
CPC ...... G01S 17/93; G01S 7/4817; G01S 7/4865; G01S 7/497; G01S 17/32; G01S 17/86; G01S 17/89; G01S 17/42; G01S 17/10; G01S 17/931; G01S 7/4815; G01S 7/4816; G01S 7/484; G01S 7/4863; G01S 17/04; G01S 7/4811; G01S 7/499; G01S 17/36; G01S 17/58; G01S 17/88; G01S 17/894; G01S 7/4808; G01S 7/4812; G01S 7/4814; G01S 7/4818; G01S 7/483; G01S 7/486;
(Continued)

(56) References Cited

U.S. PATENT DOCUMENTS 3,045,231 A   7/1962   Emory
3,954,335 A   5/1976   Bodlaj
(Continued)

FOREIGN PATENT DOCUMENTS

CA   2710212   7/2009
CA   2782180   6/2011
(Continued)

OTHER PUBLICATIONS

Akindinov et al., Detection of Light Pulses Using an Avalanche Photodiode Array with a Metal-Resistor-Semiconductor Structure, Instruments and Experimental Techniques, Nov. 2004, vol. 48, No. 3, 205, pp. 355-363, Russia.
(Continued)

*Primary Examiner* — Yuqing Xiao
*Assistant Examiner* — Amir J Askarian
(74) *Attorney, Agent, or Firm* — Fish & Richardson P.C.

(57) ABSTRACT

A LIDAR apparatus for scanning a scene is provided that includes a transmitter stage, a receiver stage, a beam-steering engine configured to steer the light beam received from the transmitter stage in different directions to scan at least a portion of the scene. The beam-steering engine is responsive to steering commands to produce corresponding deflections of the light beam.

17 Claims, 64 Drawing Sheets

Related U.S. Application Data

(60) Provisional application No. 63/145,795, filed on Feb. 4, 2021, provisional application No. 63/136,765, filed on Jan. 13, 2021, provisional application No. 63/054,634, filed on Jul. 21, 2020.

(51) Int. Cl.
  *G01S 7/4865* (2020.01)
  *G01S 17/32* (2020.01)
  *G01S 17/86* (2020.01)
  *G01S 7/497* (2006.01)
  *G01S 17/89* (2020.01)

(52) U.S. Cl.
  CPC .............. *G01S 17/32* (2013.01); *G01S 17/86* (2020.01); *G01S 17/89* (2013.01)

(58) Field of Classification Search
  CPC ...... G01S 7/4861; G01S 7/4868; G01S 7/487; G01S 7/4876; G01S 7/4914; G01S 7/4972; G02B 26/0858; G02B 26/10; G02B 26/105; G02B 27/106; G02B 27/1086; G02B 5/1871; G02F 1/133638; G02F 1/134309; G02F 1/1347; G02F 1/139; G02F 1/292; G02F 2203/01; G02F 2203/07; G02F 2203/24
  See application file for complete search history.

(56) References Cited

U.S. PATENT DOCUMENTS

| | | |
|---|---|---|
| 5,126,869 A | 6/1992 | Lipchak |
| 5,128,874 A | 7/1992 | Bhanu et al. |
| 5,195,144 A | 3/1993 | Parquier et al. |
| 5,198,657 A | 3/1993 | Trost et al. |
| 5,298,905 A | 3/1994 | Dahl |
| 5,396,510 A | 3/1995 | Wilson |
| 5,471,215 A | 11/1995 | Fukuhara |
| 5,565,870 A | 10/1996 | Fukuhara |
| 5,587,908 A | 12/1996 | Kajiwara |
| 5,633,901 A | 5/1997 | Bottman |
| 5,699,151 A | 12/1997 | Akasu |
| 5,745,806 A | 4/1998 | Saito |
| 5,812,249 A | 9/1998 | Johnson et al. |
| 5,831,717 A | 11/1998 | Ikebuchi |
| 5,852,491 A | 12/1998 | Kato |
| 5,870,178 A | 2/1999 | Egawa |
| 5,896,103 A | 4/1999 | Bunch |
| 5,923,417 A | 7/1999 | Leis |
| 5,933,225 A | 8/1999 | Yamabuchi |
| 5,987,395 A | 11/1999 | Donges |
| 6,100,539 A | 8/2000 | Blumcke |
| 6,115,112 A | 9/2000 | Hertzman |
| 6,115,114 A | 9/2000 | Berg et al. |
| 6,252,655 B1 | 6/2001 | Tanaka |
| 6,323,941 B1 | 11/2001 | Evans et al. |
| 6,502,053 B1 | 12/2002 | Hardin et al. |
| 6,522,393 B2 | 2/2003 | Higashino |
| 6,553,130 B1 | 4/2003 | Lemelson et al. |
| 6,587,185 B1 | 7/2003 | Ide |
| 6,606,054 B2 | 8/2003 | Okamura |
| 6,650,403 B2 | 11/2003 | Ogawa |
| 6,657,704 B2 | 12/2003 | Shirai |
| 6,665,057 B2 | 12/2003 | Schellmann |
| 6,710,859 B2 | 3/2004 | Shirai |
| 6,765,495 B1 | 7/2004 | Dunning et al. |
| 6,829,043 B2 | 12/2004 | Lewis |
| 6,847,462 B1 | 1/2005 | Kacyra et al. |
| 6,850,156 B2 | 2/2005 | Bloomfield et al. |
| 6,897,465 B2 | 5/2005 | Remillard |
| 6,989,781 B2 | 1/2006 | Steinbuch |
| 7,023,531 B2 | 4/2006 | Gogolla |
| 7,068,214 B2 | 6/2006 | Kakishita |
| 7,177,014 B2 | 2/2007 | Mori |
| 7,221,271 B2 | 5/2007 | Reime |
| 7,350,945 B2 | 4/2008 | Albou et al. |
| 7,385,626 B2 | 6/2008 | Aggarwal et al. |
| 7,417,718 B2 | 8/2008 | Wada et al. |
| 7,508,496 B2 | 3/2009 | Mettenleiter et al. |
| 7,619,754 B2 | 11/2009 | Reil et al. |
| 7,852,461 B2 | 12/2010 | Yahav |
| 7,957,639 B2 | 6/2011 | Lee et al. |
| 7,957,900 B2 | 6/2011 | Chowdhary et al. |
| 8,045,249 B2 | 10/2011 | Kobayashi et al. |
| 8,189,051 B2 | 5/2012 | Shih et al. |
| 8,290,208 B2 | 10/2012 | Kurtz et al. |
| 8,446,492 B2 | 5/2013 | Nakano et al. |
| 8,457,827 B1 | 6/2013 | Ferguson et al. |
| 8,547,374 B1 | 10/2013 | Sadjadi et al. |
| 8,548,229 B2 | 10/2013 | Badino et al. |
| 8,587,686 B1 | 11/2013 | Riza et al. |
| 8,723,717 B2 | 5/2014 | Saito |
| 8,736,818 B2 | 5/2014 | Weimer |
| 8,761,594 B1 | 6/2014 | Gross et al. |
| 8,791,851 B2 | 7/2014 | Elad et al. |
| 8,908,159 B2 | 12/2014 | Mimeault |
| 8,982,313 B2 | 3/2015 | Escuti et al. |
| 8,996,224 B1 | 3/2015 | Herbach |
| 9,063,549 B1 | 6/2015 | Pennecot |
| 9,098,754 B1 | 8/2015 | Stout |
| 9,164,511 B1 | 10/2015 | Ferguson et al. |
| 9,188,980 B2 | 11/2015 | Anderson |
| 9,774,789 B2 | 9/2017 | Ciurea |
| 10,098,727 B1 | 10/2018 | Galstian |
| RE47,134 E | 11/2018 | Mimeault |
| 10,191,156 B2 * | 1/2019 | Steinberg ................ G01S 17/89 |
| 10,412,368 B2 | 9/2019 | Osterwood |
| 10,571,552 B1 | 2/2020 | Gao |
| 10,825,010 B2 | 11/2020 | Olmstead |
| 10,832,438 B2 | 11/2020 | Gozu |
| 10,884,278 B2 | 1/2021 | Hegyi |
| 11,022,857 B2 | 6/2021 | Lee |
| 11,061,406 B2 | 7/2021 | Mao |
| 11,087,494 B1 | 8/2021 | Srinivasan |
| 2001/0024271 A1 | 9/2001 | Takayanagi |
| 2001/0045981 A1 | 11/2001 | Gloger et al. |
| 2002/0097995 A1 | 7/2002 | Nakata |
| 2002/0141618 A1 | 10/2002 | Ciolli |
| 2003/0193642 A1 | 10/2003 | Tominaga et al. |
| 2004/0035620 A1 | 2/2004 | McKeeferey |
| 2004/0135992 A1 | 7/2004 | Munro |
| 2004/0164946 A1 | 8/2004 | Cavanaugh et al. |
| 2005/0117364 A1 | 6/2005 | Rennick et al. |
| 2005/0200832 A1 | 9/2005 | Kawai et al. |
| 2005/0269481 A1 | 12/2005 | David et al. |
| 2006/0072099 A1 | 4/2006 | Hoashi |
| 2006/0147089 A1 | 7/2006 | Han et al. |
| 2006/0149472 A1 | 7/2006 | Han et al. |
| 2006/0186702 A1 | 8/2006 | Kisanuki et al. |
| 2006/0274545 A1 | 12/2006 | Rosenstein |
| 2006/0274918 A1 | 12/2006 | Amantea et al. |
| 2007/0024841 A1 | 2/2007 | Kloza |
| 2007/0091294 A1 | 4/2007 | Hipp |
| 2007/0097349 A1 | 5/2007 | Wada |
| 2007/0165967 A1 | 7/2007 | Ando |
| 2007/0181810 A1 | 8/2007 | Tan |
| 2007/0187573 A1 | 8/2007 | Aoki |
| 2007/0189455 A1 | 8/2007 | Allison |
| 2007/0255525 A1 | 11/2007 | Lee |
| 2008/0046150 A1 | 2/2008 | Breed |
| 2008/0077327 A1 | 3/2008 | Harris |
| 2008/0199165 A1 | 8/2008 | Ng et al. |
| 2008/0297870 A1 | 12/2008 | Kobayashi et al. |
| 2009/0102699 A1 | 4/2009 | Behrens et al. |
| 2009/0109082 A1 | 4/2009 | Rose |
| 2009/0251680 A1 | 10/2009 | Farsaie |
| 2010/0014781 A1 | 1/2010 | Liu et al. |
| 2010/0040285 A1 | 2/2010 | Csurka et al. |
| 2010/0091263 A1 | 4/2010 | Kumagai |
| 2010/0157280 A1 | 6/2010 | Kusevic |
| 2010/0191117 A1 | 7/2010 | Kabakov |
| 2010/0204974 A1 | 8/2010 | Israelsen |
| 2010/0211247 A1 | 8/2010 | Sherony |

(56) References Cited

U.S. PATENT DOCUMENTS

| | | |
|---|---|---|
| 2010/0235129 A1 | 9/2010 | Sharma |
| 2010/0245535 A1 | 9/2010 | Mauchly |
| 2010/0315618 A1 | 12/2010 | Hertzman |
| 2011/0026008 A1 | 2/2011 | Gammenthaler |
| 2011/0081043 A1 | 4/2011 | Sabol |
| 2011/0134249 A1 | 6/2011 | Wood et al. |
| 2011/0141306 A1 | 6/2011 | Nakano et al. |
| 2011/0292406 A1 | 12/2011 | Hollenbeck et al. |
| 2012/0021595 A1 | 1/2012 | Kim |
| 2012/0026510 A1 | 2/2012 | Crampton et al. |
| 2012/0035788 A1 | 2/2012 | Trepagnier |
| 2012/0038902 A1 | 2/2012 | Dotson |
| 2012/0044093 A1 | 2/2012 | Pala |
| 2012/0044476 A1 | 2/2012 | Earhart et al. |
| 2012/0148100 A1 | 6/2012 | Kotake et al. |
| 2012/0188467 A1 | 7/2012 | Escuti et al. |
| 2012/0206627 A1 | 8/2012 | Reschidko et al. |
| 2012/0229304 A1 | 9/2012 | Dalal |
| 2012/0214037 A1 | 12/2012 | Nehmadi |
| 2012/0310518 A1 | 12/2012 | Chen et al. |
| 2012/0326959 A1 | 12/2012 | Murthi et al. |
| 2013/0050430 A1 | 2/2013 | Lee |
| 2013/0107065 A1 | 5/2013 | Venkatraman et al. |
| 2013/0174102 A1 | 7/2013 | Leu |
| 2014/0077988 A1 | 3/2014 | Saito |
| 2014/0078263 A1 | 3/2014 | Kim |
| 2014/0094307 A1 | 4/2014 | Doolittle et al. |
| 2014/0118716 A1 | 5/2014 | Kaganovich |
| 2014/0132722 A1 | 5/2014 | Bauza et al. |
| 2014/0139639 A1 | 5/2014 | Wagner et al. |
| 2014/0240464 A1 | 8/2014 | Lee |
| 2014/0267631 A1 | 9/2014 | Powers |
| 2014/0280230 A1 | 9/2014 | Masato et al. |
| 2014/0358429 A1 | 12/2014 | Shutko |
| 2015/0071541 A1 | 3/2015 | Qutub et al. |
| 2015/0285912 A1 | 10/2015 | Hammes |
| 2015/0310273 A1 | 10/2015 | Shreve |
| 2015/0340875 A1 | 11/2015 | Prasad et al. |
| 2015/0356357 A1 | 12/2015 | McManus et al. |
| 2015/0362587 A1 | 12/2015 | Rogan |
| 2015/0379766 A1 | 12/2015 | Newman |
| 2016/0018526 A1 | 1/2016 | Van Den Bossche |
| 2016/0047903 A1 | 2/2016 | Dussan |
| 2016/0104289 A1 | 4/2016 | Chang |
| 2016/0144695 A1 | 5/2016 | Higgins |
| 2016/0180530 A1 | 6/2016 | Friend |
| 2016/0214607 A1 | 7/2016 | Dolgov et al. |
| 2016/0295196 A1 | 10/2016 | Finn |
| 2017/0003392 A1 | 1/2017 | Bartlett et al. |
| 2017/0124781 A1 | 5/2017 | Douillard |
| 2017/0160600 A1 | 6/2017 | Galstian et al. |
| 2017/0246990 A1 | 8/2017 | Rosenblum |
| 2017/0269198 A1 | 9/2017 | Hall et al. |
| 2017/0328990 A1 | 11/2017 | Magee et al. |
| 2017/0371227 A1 | 12/2017 | Skirlo et al. |
| 2018/0081037 A1 | 3/2018 | Medina |
| 2018/0113200 A1 | 4/2018 | Steinberg et al. |
| 2018/0114388 A1 | 4/2018 | Nagler |
| 2018/0136321 A1 | 5/2018 | Verghese |
| 2018/0136540 A1 | 5/2018 | Park |
| 2018/0188359 A1 | 7/2018 | Droz |
| 2018/0189977 A1 | 7/2018 | Zecchini |
| 2018/0284286 A1 | 10/2018 | Eichenholz et al. |
| 2018/0293445 A1 | 10/2018 | Gao |
| 2018/0364334 A1 | 12/2018 | Xiang |
| 2019/0011541 A1 | 1/2019 | O'Keeffe |
| 2019/0025427 A1 | 1/2019 | O'Keeffe |
| 2019/0075281 A1 | 3/2019 | Hall |
| 2019/0121191 A1 | 4/2019 | Hegyi |
| 2019/0176844 A1 | 6/2019 | Sedlmayr |
| 2019/0219675 A1 | 7/2019 | Yoon |
| 2019/0219681 A1 | 7/2019 | Atshushi |
| 2019/0227175 A1 | 7/2019 | Steinberg |
| 2019/0271767 A1 | 9/2019 | Keilaf |
| 2019/0317217 A1 | 10/2019 | Day et al. |
| 2019/0318177 A1 | 10/2019 | Steinberg |
| 2019/0353784 A1 | 11/2019 | Toledano |
| 2020/0013181 A1 | 1/2020 | Uyeno |
| 2020/0033454 A1 | 1/2020 | Hong et al. |
| 2020/0072950 A1 | 3/2020 | Phillip |
| 2020/0099824 A1 | 3/2020 | Benemann |
| 2020/0099872 A1 | 3/2020 | Benemann |
| 2020/0284883 A1 | 9/2020 | Ferreira |
| 2020/0353939 A1 | 11/2020 | Meng |
| 2021/0003711 A1 | 1/2021 | Vandenberg |
| 2021/0025997 A1 | 1/2021 | Rosenzweig |
| 2021/0041712 A1 | 2/2021 | Bilik et al. |
| 2021/0063841 A1 | 3/2021 | Yuan |
| 2021/0080575 A1 | 3/2021 | Nehmadi |
| 2021/0124367 A1 | 4/2021 | Lim |
| 2021/0129868 A1 | 5/2021 | Nehmadi |
| 2021/0190958 A1 | 6/2021 | Nonaka |
| 2021/0208263 A1 | 7/2021 | Sutavani |
| 2021/0255637 A1 | 8/2021 | Kale |
| 2021/0293931 A1 | 9/2021 | Nemet |
| 2022/0026539 A1 | 1/2022 | Bernier |
| 2022/0026540 A1 | 1/2022 | Olivier |
| 2022/0026573 A1 | 1/2022 | Baribault |
| 2022/0026576 A1 | 1/2022 | Baribault |

FOREIGN PATENT DOCUMENTS

| | | |
|---|---|---|
| CN | 106462949 | 8/2019 |
| DE | 3535391 | 5/1990 |
| DE | 10361869 | 7/2005 |
| DE | 102019132239 | 6/2021 |
| EP | 2204670 | 6/2014 |
| JP | H04172285 | 6/1992 |
| JP | 912723 | 5/1997 |
| JP | 2005170184 | 6/2005 |
| JP | 2006521536 | 9/2006 |
| JP | 2007121116 | 5/2007 |
| JP | 09178786 | 8/2009 |
| JP | 09222476 | 10/2009 |
| JP | 2010091378 | 4/2010 |
| JP | 2010529932 | 9/2010 |
| JP | 2010286307 | 12/2010 |
| JP | 11101637 | 5/2011 |
| WO | WO1991007672 | 5/1991 |
| WO | WO2000012960 | 3/2000 |
| WO | WO2005008271 | 1/2005 |
| WO | WO2008017316 | 2/2008 |
| WO | WO2008070319 | 6/2008 |
| WO | WO2011014743 | 2/2011 |
| WO | WO2011077400 | 6/2011 |
| WO | WO2018055449 | 3/2018 |
| WO | WO2019106429 | 6/2019 |
| WO | WO2019197894 | 10/2019 |

OTHER PUBLICATIONS

Atiq et al., "Vehicle Detection and Shape Recognition Using Optical Sensors: A Review", 2010 Second International Conference on Machine Learning and Computing, Feb. 11, 2010 (Nov. 2, 2010).

Baig et al., "Fusion Between Laser and Stereo Vision Data For Moving Objects Tracking in Intersection Like Scenario", Fusion Between IV'2011—IEEE Intelligent Vehicles Symposium, Jun. 2011, Baden-Baden, Germany. pp. 262-367, ff10.1109/IVS.2011.5940576ff.

Braun et al., "Nanosecond transient electroluminescence from polymer light emitting diodes", Applied Physics Letters, vol. 61(26):3092-3094 (Dec. 1992).

CA Requisition in Canadian Appln. No. 3125618, dated Oct. 15, 2021, 4 pages.

CA Requisition in Canadian Appln. No. 3125623, dated Nov. 1, 2021, 4 pages.

CA Requisition in Canadian Appln. No. 3125716, dated Oct. 18, 2021, 4 pages.

CA Requisition in Canadian Appln. No. 3125718, dated Nov. 25, 2021, 3 pages.

Canadian Examiners Report in CA Appln. No. 2865733, dated May 31, 2021, 3 pages.

(56) References Cited

OTHER PUBLICATIONS

English translation of the Notification of Reasons for Rejection issued in Japanese Patent Application No. 2018077339, dated Mar. 25, 2019, 8 pages.
EP Search Report in EP Appln. No. 16774190.9, dated Jan. 28, 2019.
Escuti, Michael J. and W. Michael Jones, "Polarization-Independent Switching With High Contrast From A Liquid Crystal Polarization Grating", Society for Information Display, 2006.
Final Office Action dated Apr. 18, 2018 in connection with U.S. Appl. No. 15/373,189, 9 pages.
International Preliminary Report on Patentability in International Application No. PCT/IB2013/051667, dated Sep. 2, 2014, 6 pages.
International Search Report and Written Opinion for PCT/US2016/025252, Moscow, Russia, dated Aug. 11, 2016.
International Search Report and Written Opinion in International Application No. PCT/IB2013/051667, dated Jul. 9, 2013, 8 pages.
Kim et al., "Wide-Angle, Nonmechanical Beam Steering Using Thin Liquid Crystal Polarization Gratings", Advanced Wavefront Control: Methods, Devices and Applicatinos VI, 2008, 7093:709302-1-12.
Non-Final Office Action dated Oct. 31, 2017 in connection with U.S. Appl. No. 15/373,189, 31 pages.
Notice of Allowance dated Jul. 13, 2018 in connection with U.S. Appl. No. 15/373,189 (13 pages).
Notice of Allowance dated Mar. 8, 2018 in connection with U.S. Appl. No. 14/984,704, (8 pages).
Office Action in U.S. Appl. No. 17/3 82,144, dated Nov. 19, 2021, 17 pages.
Office Action in U.S. Appl. No. 17/382,155, dated Dec. 24, 2021, 23 pages.
Office Action in U.S. Appl. No. 17/382,163, dated Jan. 13, 2022, 31 pages.
Office Action in U.S. Appl. No. 17/382,177, dated Dec. 21, 2021, 25 pages.
Office Action dated Jun. 15, 2017 in connection with U.S. Appl. No. 14/984,704, (13 pages).
Office Action dated Oct. 9, 2019 in connection with U.S. Appl. No. 16/011,820 (25 pages).
Office Action dated Sep. 17, 2019 in connection with U.S. Appl. No. 15/867,995 (38 pages).
PCT International Preliminary Report on Patentability in International Appln. No. PCT/IL2018/050102, dated Aug. 6, 2019, 10 pages.
PCT International Search Report and Written Opinion in International Appln. No. PCT/CA2021/051010, dated Oct. 4, 2021, 18 pages.
PCT International Search Report and Written Opinion in International Appln. No. PCT/CA2021/051011, dated Oct. 6, 2021, 15 pages.
PCT International Search Report and Written Opinion in International Appln. No. PCT/CA2021/051012, dated Nov. 2, 2021, 11 pages.
PCT International Search Report and Written Opinion in International Appln. No. PCT/CA2021/051013, dated Oct. 21, 2021, 21 pages.
PCT International Search Report and Written Opinion in International Appln. No. PCT/IL2018/50102, dated Aug. 8, 2018, 14 pages.
Petrovskaya et al., "Awareness of Road Scene Participants for Autonomous Driving", Stanford University (USA), Inria (France), Coimbra University (Portugal), University of Frieburg (Germany), University of Oxford (UK), Ohio Northern University (USA), Oct. 12, 2011.
Supplemental Notice of Allowability dated Sep. 12, 2018 in connection with U.S. Appl. No. 15/373,189 (4 pages).

\* cited by examiner

|   |    | -30   | -22.5 | -15  | -7.5 | 0    | 7.5  | 15   | 22.5 |
|---|----|-------|-------|------|------|------|------|------|------|
|   |    | -22.5 | -15   | -7.5 | 0    | 7.5  | 15   | 22.5 | 30   |
| 6 | 12 | 1     | 2     | 3    | 4    | 5    | 6    | 7    | 8    |
| 0 | 6  | 9     | 10    | 11   | 12   | 13   | 14   | 15   | 16   |
| -6| 0  | 17    | 18    | 19   | 20   | 21   | 22   | 23   | 24   |
|-12| -6 | 25    | 26    | 27   | 28   | 29   | 30   | 31   | 32   |

FIG. 20A

(cell 3 shaded)

|   |    | -30   | -22.5 | -15  | -7.5 | 0    | 7.5  | 15   | 22.5 |
|---|----|-------|-------|------|------|------|------|------|------|
|   |    | -22.5 | -15   | -7.5 | 0    | 7.5  | 15   | 22.5 | 30   |
| 6 | 12 | 1     | 2     | 3    | 4    | 5    | 6    | 7    | 8    |
| 0 | 6  | 9     | 10    | 11   | 12   | 13   | 14   | 15   | 16   |
| -6| 0  | 17    | 18    | 19   | 20   | 21   | 22   | 23   | 24   |
|-12| -6 | 25    | 26    | 27   | 28   | 29   | 30   | 31   | 32   |

FIG. 20B

(cell 5 shaded)

|   |    | -30   | -22.5 | -15  | -7.5 | 0    | 7.5  | 15   | 22.5 |
|---|----|-------|-------|------|------|------|------|------|------|
|   |    | -22.5 | -15   | -7.5 | 0    | 7.5  | 15   | 22.5 | 30   |
| 6 | 12 | 1     | 2     | 3    | 4    | 5    | 6    | 7    | 8    |
| 0 | 6  | 9     | 10    | 11   | 12   | 13   | 14   | 15   | 16   |
| -6| 0  | 17    | 18    | 19   | 20   | 21   | 22   | 23   | 24   |
|-12| -6 | 25    | 26    | 27   | 28   | 29   | 30   | 31   | 32   |

FIG. 20C

(cell 31 shaded)

|   |    | -30 | -22.5 | -15  | -7.5 | 0   | 7.5 | 15   | 22.5 |
|---|----|-----|-------|------|------|-----|-----|------|------|
|   |    | -22.5 | -15 | -7.5 | 0    | 7.5 | 15  | 22.5 | 30   |
| 6 | 12 | 1   | 2     | ///  | 4    | 5   | 6   | 7    | 8    |
| 0 | 6  | 9   | 10    | 11   | 12   | 13  | 14  | 15   | 16   |
| -6 | 0 | 17  | 18    | 19   | 20   | 21  | 22  | 23   | 24   |
| -12 | -6 | 25 | 26   | 27   | 28   | 29  | 30  | 31   | 32   |

FIG. 44A

|   |    | -30 | -22.5 | -15 | -7.5 | 0 | 7.5 | 15 | 22.5 | 37.5 |
|---|----|-----|-------|-----|------|---|-----|----|------|------|
|   |    | -22.5 | -15 | -7.5 | 0 | 7.5 | 15 | 22.5 | 30 | 30 |
| 6 | 12 | 1 | 2 | /// | 4 | 5 | 6 | 7 | 8 | 9 |
| 0 | 6  | 10 | 11 | 12 | 13 | 14 | 15 | 16 | 17 | 18 |
| -6 | 0 | 19 | 20 | 21 | 22 | 23 | 24 | 25 | 26 | 27 |
| -12 | -6 | 28 | 29 | 30 | 31 | 32 | 33 | 34 | 34 | 36 |

FIG. 44B

|   |    | -37.5 | -30 | -22.5 | -15 | -7.5 | 0 | 7.5 | 15 | 22.5 |
|---|----|-------|-----|-------|-----|------|---|-----|----|------|
|   |    | -30 | -22.5 | -15 | -7.5 | 0 | 7.5 | 15 | 22.5 | 30 |
| 6 | 12 | 1 | 2 | 3 | 4 | 5 | 6 | 7 | 8 | 9 |
| 0 | 6  | 10 | 11 | 12 | 13 | 14 | 15 | 16 | 17 | 18 |
| -6 | 0 | 19 | 20 | 21 | 22 | 23 | 24 | 25 | 26 | 27 |
| -12 | -6 | 28 | 29 | 30 | 31 | 32 | 33 | 34 | 34 | 36 |

FIG. 44C

BEAM-STEERING DEVICES AND METHODS FOR LIDAR APPLICATIONS

CROSS-REFERENCE TO RELATED APPLICATIONS

This application is a continuation application of and claims the benefit of priority under 35 USC § 120 to U.S. application Ser. No. 17/382,155, filed on Jul. 21, 2021, which claims the benefit of U.S. Provisional Patent Application No. 63/054,634 filed Jul. 21, 2020, U.S. Provisional Patent Application No. 63/136,765 filed Jan. 13, 2021, and U.S. Provisional Patent Application No. 63/145,795 filed Feb. 4, 2021, the entire contents of which are hereby incorporated by reference.

FIELD OF THE INVENTION

The invention relates to a beam-steering device and a method for operation of a beam-steering device, particularly for LIDAR systems using one or more light beam-steering stages to selectively deflect a light beam.

BACKGROUND OF THE INVENTION

LIDAR systems can be used in various applications, such as in vehicles, portable computer devices (e.g., smartphones, laptops, tablets) and augmented/virtual reality devices/systems, in order to image a field of view and locate objects within the field of view. A LIDAR system directs light outward over a range of angles and receives reflections of the light from objects. Many current LIDAR systems use a mechanical-scanning device, such as a gimbal or spinning disks or polygons in order to disperse outgoing light beams. However, such mechanical-scanning devices often come with resolution issues, maintenance issues, assembly issues and/or temperature dependence issues.

Beam-steering devices using one or more steering stages are described in the U.S. Pat. No. 8,982,313, the contents of which are hereby incorporated by reference. In a specific example of implementation, each steering stage includes a polarization grating with a director pattern that interacts with incoming light to deflect the light at a selected propagation angle. In the active version of the steering stage, the polarization grating includes a switchable liquid crystal layer having a periodic profile of spatially varying optical anisotropy, for example as provided by a birefringent liquid crystal material. The polarization grating is capable of diffracting incident light into three possible diffracted orders ($0^{th}$, $+1^{st}$ and $-1^{st}$) according to input polarization and applied voltage.

More specifically, the polarization grating is switchable between at least two operational modes. The switching alters the periodic profile of the grating such that the grating interacts with incoming light differently in each operational mode. Accordingly, the switching provides a level of control over the direction of propagation of the light. The switching operation is characterized by an on mode and an off mode. The on mode is achieved by applying a voltage to the grating which induces a change to the periodic profile. For instance, the voltage can alter the profile such that the grating will no longer deflect the light at some angle. Rather the light will propagate along its incoming direction. The off mode is achieved by removing the voltage which allows the periodic profile to acquire its original configuration in which it deflects the light. As such, when voltage is applied to the grating, the light deflecting effect is negated. And when no voltage is applied, the periodic pattern deflects lights at an angle. That angle can be positive or negative depending on the polarization handedness of the incoming light beam.

The polarization of the incident light introduced into the polarization grating is controlled by a polarization selector, which is also switchable. Typically, the polarization selector is placed before the polarization grating. The polarization selector may include a liquid-crystal layer operable to be switched between a first mode that does not substantially alter the polarization of the incident light and a second mode that alters the polarization state of light passing through it.

In the passive version, the polarization grating is not switchable. The polarization selector is still switchable. In this version, the polarization grating is capable of diffracting incident light in two diffracted orders ($+1^{st}$, $-1^{st}$), the order selection being made by controlling the polarization of the incident light beam with the polarization selector.

The switching operation of the polarization grating and/or of the polarization selector is not an instantaneous event. In other words, some time is required after a voltage is applied for the operational mode of the optical component to change. Similarly, when the voltage is removed a relaxation time is required for the optical component to revert back to its initial operational mode. Typically, the relaxation time is significantly longer than the switching on time. The relaxation time and the switching on time are transition periods during which the optical component does not behave as expected in terms of light transmission properties. It is therefore preferable not to rely on the optical component during those transitions for predictable light management performance.

The consequence of the switching on time and the relaxation time is that the beam-steering rate is limited. Moving the beam from one step to the next step requires waiting for the switching on time and/or relaxation time to pass.

For these and other reasons, there is a need to improve manufacturability, performance and use of LIDAR systems in aspects such as range, resolution, field-of-view, and physical and environmental robustness. It is therefore an objective of the invention to provide improved methods and systems for better management of the LIDAR apparatus using a beam-steering engine.

SUMMARY OF THE INVENTION

As embodied and broadly described herein the invention provides a LIDAR apparatus for scanning a scene, comprising a transmitter stage for generating a light beam, a receiver stage and a beam-steering engine configured to steer the light beam to scan at least a portion of the scene. The beam-steering engine includes a first steering stage to steer the light beam by performing continuous deflection of the light beam and a second steering stage to steer the light beam steered by the first steering stage by performing stepwise deflection of the light beam steered by the first steering stage.

As embodied and broadly described herein, the invention further includes a method for scanning a scene, comprising providing a LIDAR apparatus including a transmitter stage for generating a light beam, a receiver stage, a beam-steering engine configured to steer the light beam to scan at least a portion of the scene, the beam-steering engine including a first steering stage to steer the light beam by performing continuous deflection of the light beam and a second steering stage downstream the first steering stage to steer the light beam steered by the first steering stage by performing stepwise deflection of the light beam. The method includes deflecting the light beam by the first steering stage with a continuous motion and deflecting the light beam stepwise by the second steering stage to scan the scene and sensing an optical return with the receiver stage and generating an output conveying a representation of the scene.

As embodied and broadly described herein, the invention further provides a LIDAR apparatus for scanning a scene, comprising a transmitter stage for generating a light beam, a receiver stage, a beam-steering engine configured to steer the light beam received from the transmitter stage to scan at least a portion of the scene, the beam-steering engine including an optical component, the beam-steering engine being responsive to steering commands to steer the light beam in a steering range by performing an angular deflection of the light beam in discrete steps within the steering range. The LIDAR apparatus further includes a controller comprising a data processor for receiving at an input data describing a sub-portion of the scene to be scanned by the LIDAR apparatus and deriving from the input data steering commands configured to operate the steering engine such that the light beam is directed at the sub-portion of the scene.

As embodied and broadly described herein the invention further includes a method for scanning a scene, comprising generating a light beam, providing a beam-steering engine configured to steer the light beam to scan at least a portion of the scene, the beam-steering engine including an optical component, the beam-steering engine being responsive to steering commands to steer the light beam in a steering range by performing an angular deflection of the light beam in discrete steps within the steering range, receiving data describing a sub-portion of the scene to be scanned by the light beam, and processing the data with a data processing device to generate steering commands configured to operate the steering engine such that the light beam is directed at the sub-portion of the scene.

BRIEF DESCRIPTION OF THE DRAWINGS

A detailed description of embodiments is provided below, by way of example only, with reference to drawings accompanying this description, in which:

FIGS. 20A, 20B and 20C show examples of 2D scanning over the segmented FoV represented by the steering angle configurations of FIG. 12B.

FIG. 44A shows a field of emission of the LIDAR apparatus of FIG. 42 divided into selectable tiles resulting from the 2D beam steering angles that are possible using a first LCPG beam steering element of the LIDAR apparatus.

FIG. 44B shows a field of view of the LIDAR apparatus of FIG. 42 divided into selectable tiles resulting from the 2D beam steering angles that are possible using a second LCPG beam steering element when the LIDAR apparatus is operated in a first mode.

FIG. 44C shows a field of view of the LIDAR apparatus of FIG. 39 divided into selectable tiles resulting from the 2D beam steering angles that are possible using the second LCPG beam steering element when the LIDAR apparatus is operated in a second mode.

It is to be expressly understood that the description and drawings are only for purposes of illustrating certain embodiments and are an aid for understanding. They are not intended to be and should not be limiting.

DESCRIPTION OF AN EXAMPLE OF IMPLEMENTATION

LIDAR Systems

Radiation with wavelength in the optical region of the electromagnetic spectrum i.e., from the ultraviolet up to the infrared, can interact with matter in various states through mechanisms such as optical absorption and scattering. Early after the advent of the first lasers, it was recognized that these novel sources of coherent optical radiation could be used for sensing solid objects, particulate matter, aerosols, and even molecular species located at long distances. Remote sensing applications emerged owing to some distinctive features of laser sources. For example, several types of laser sources emit optical pulses carrying high energy that can propagate in the atmosphere in the form of a slowly-diverging optical beam. Similar to the radio and microwave radiation sources used in common radar instruments, systems that employ light sources for remote sensing applications are generally known as LIDAR systems, or simply LIDARs, which is the acronym for light detection and ranging.

Figure 1:
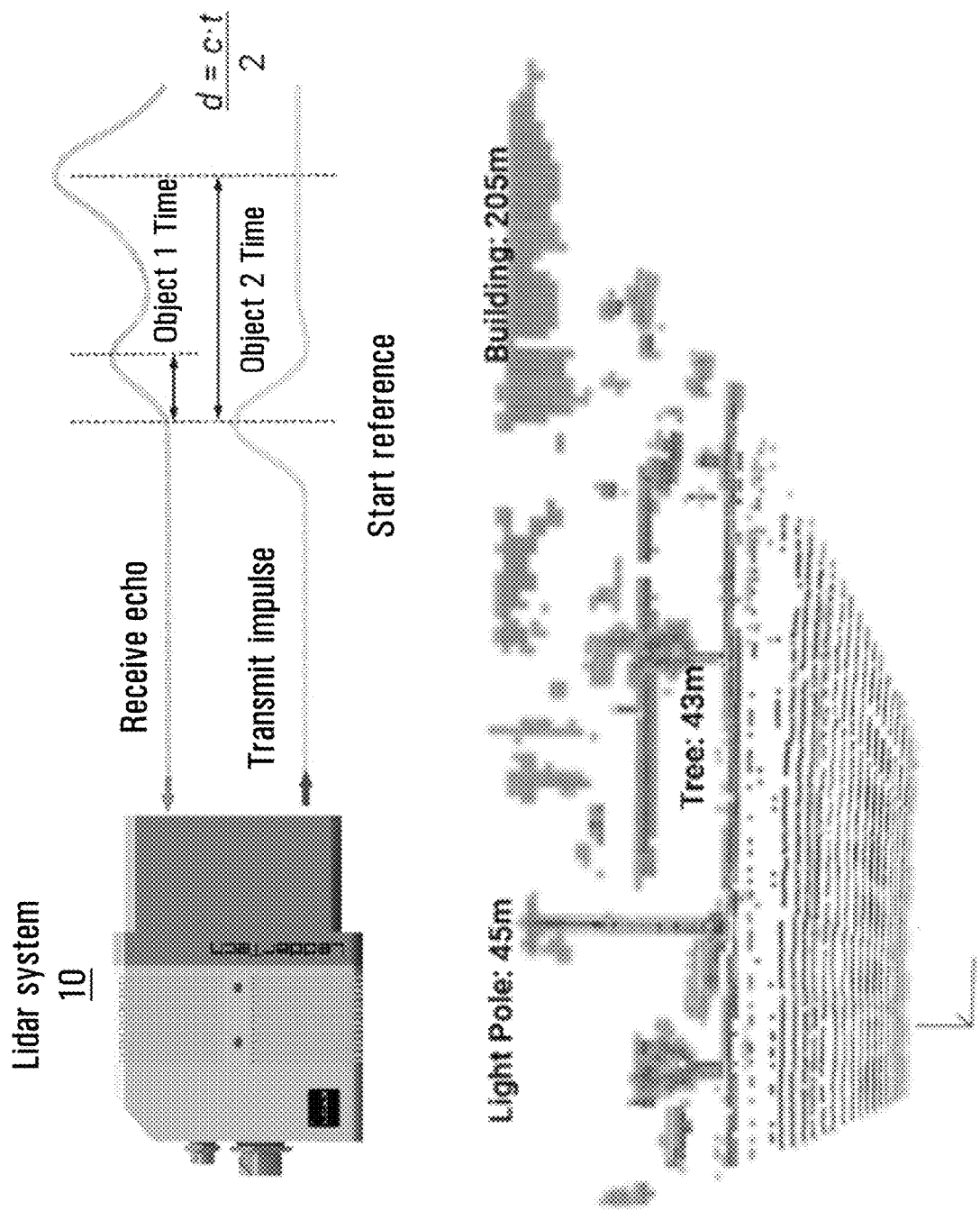
FIG. 1 shows an example of a LIDAR system transmitting an optical impulse into a field of view and determining range of objects based on time of flight of echoes reflected back from the objects within the field of view.

LIDAR works much like radar, emitting optical light pulses (e.g., infrared light pulses) of short duration, typically in the ns (nanosecond, 1 ns=$10^{-9}$ s) range, either in single-shot regime or in the form of a pulse train of limited duration, instead of radio waves and measuring how long they take to come back after hitting nearby objects. This is shown conceptually in FIG. 1, which shows a LIDAR system 10 transmitting an output laser pulse and receiving echoes from two objects. The time between the output laser pulse and the reflected pulses allows the LIDAR sensor to calculate the distance to each object precisely, based on the speed of light. For example, the range R of an object may be deduced from the measured full round-trip time T of the optical pulse using the simple relation:

$$R = \frac{cT}{2n},$$

where c is the speed of light in vacuum, which scales to roughly 3×$10^8$ m/s, and n denotes the refractive index of the medium in which the optical pulse propagates. Methods for optical ranging are not limited to the pulsed TOF technique. Methods such as optical triangulation, interferometric phase-shift range finding, and frequency-modulated continuous-wave (FMCW) range finding, just to name of few, exist as well. The review paper of M.-C. Amann et al. ("Laser ranging: a critical review of usual techniques for distance measurement", Optical Engineering vol. 40, pp. 10-19, January 2001) discusses these techniques in greater details.

LIDAR systems may be capable of capturing millions of such precise distance measurement points each second, from which a 3D matrix of its environment can be produced. Information on objects' position, shape, and behavior can be obtained from this comprehensive mapping of the environment, as shown in the example mapping shown in FIG. 1.

General Overview of a LIDAR System

Figure 2:
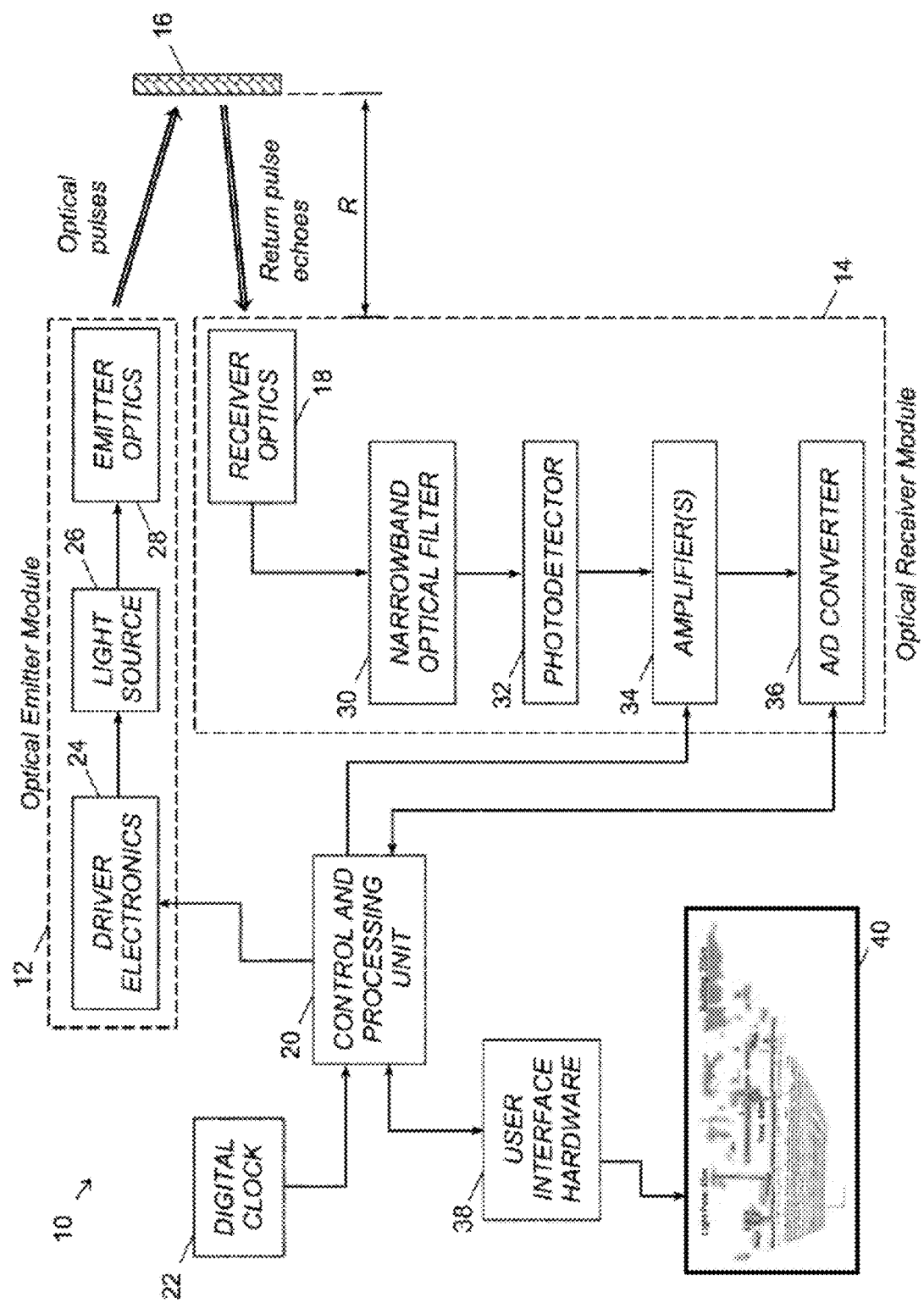
FIG. 2 shows examples of basic LIDAR system components for detection and ranging.

The various embodiments of the present disclosure described below are intended for implementation in a LIDAR system. Some of the basic elements of a LIDAR system 10 may be better appreciated by referring to the schematic block diagram depicted in FIG. 2. The LIDAR system 10 comprises an optical emitter module 12 for emission of a train of optical pulses having predetermined characteristics, and an optical receiver module 14 for the capture and pre-processing of the return signal waveforms. For example, the signal waveforms originate from the fraction of the emitted optical pulse energy that is reflected or backscattered by an object 16 located at range R from the LIDAR system 10, and which is in the field of view (FoV) of the receiver optics 18. In this non-limiting example, a control and processing unit 20 controls the operation of both optical emitter 12 and optical receiver 14 modules. Among other things, the control process may synchronize the emission of each individual optical pulse with the start of the sampling and A/D data conversion of the return signal collected by the receiver module 14. A digital clock 22 may be used to generate clock signals for the control and processing unit 20 to ensure precise timing of both modules, for example.

Optical Emitter Module

Upon reception of a trigger signal from the control and processing unit 20, the driver electronics 24 may generate an electrical current pulse whose duration lies in the ns range. The current pulse is then routed to the light source 26 for emission of an optical pulse. The light source 26 is generally a laser, but other types of optical sources, such as light-emitting diodes (LEDs), can be envisioned without departing from the scope of the present disclosure. The use of semiconductor laser diode assemblies now prevails in LIDAR systems. The laser diode assembly may comprise a single-emitter laser diode, a multiple-emitter laser diode, or even a two-dimensional stacked array of multiple-emitter laser diodes. The specific type of light source integrated in a LIDAR system 10 depends, inter alia, on factors such as the peak optical output power required for successful ranging at the desired maximum range, the emission wavelength, and the device cost. Light sources such as fiber lasers, microchip lasers and even solid-state lasers find their way in LIDAR applications, particularly when no laser diode source exists at the desired emission wavelength. The optical pulses pass through the emitter optics 28 before leaving the optical emitter module 12. The emitter optics 28 shapes the optical pulses in the form of a beam having the desired propagation characteristics. The primary optical beam characteristics may be the beam divergence, the transverse size of the beam irradiance profile at the exit aperture of the emitter module 12 (e.g., for eye safety concerns), and the spatial beam quality. The emitter 28 and receiver optics 18 are generally boresighted so as the optical beam path and the field of view of the receiver module 14 overlap over a predetermined range interval.

Optical Receiver Module

The return optical signals collected by the receiver optics 18 may pass through a narrowband optical filter 30 for removal of the parasitic background light before impinging on the sensitive surface of a photodetector 32. The photodetector 32 is generally an avalanche or PIN photodiode, or a 1 D or 2D array of such photodiodes, with material composition suited to the wavelength of the optical pulses. The pre-amplified voltage signal from the photodetector 32 may then fed to an amplifier 34. The amplifier circuit may comprise a matched filter to limit the electrical bandwidth of the optical receiver module 14. The control and processing unit 20 may control the amplifier gain to ensure that the signal amplitude fits within the input voltage dynamic range of the A/D converter 36. It is known in the art that other amplifier configurations could be used as well, such as a logarithmic amplifier or a set of amplifiers mounted in parallel, each amplifier having a fixed gain. The A/D converter 36 digitizes the input voltage signals at a sampling rate of typically several tens to few thousands of MS/s (mega-samples per second). The time period between two consecutive digital sampling operations defines the extent of the so-called range bins of the system 10, when expressed in units of distance.

In many cases the output of the LIDAR system may be used by autonomous computer-based processes, e.g., to make navigation or mobility decisions in autonomous vehicle applications. In some cases, a user may operate the system 10 and receive data from it through the user interface hardware 38. For instance, the measured range to the targeted object 16 and/or a more detailed 3D map of the field of view may be displayed in digital form on a liquid-crystal or plasma visual display 40. In augmented reality applications, the detailed 3D map data may be combined with high-definition image data, e.g., from a high-definition digital camera (not shown), in order to allow virtual objects/elements to be placed in a virtual environment displayed on the display 40.

Vehicles of all types now use LIDAR to determine which obstacles are nearby and how far away they are. The 3D maps provided by LIDAR components not only to detect and position objects but also identify what they are. Insights uncovered by LIDAR also help a vehicle's computer system to predict how objects will behave and adjust the vehicle's driving accordingly.

Semi- and fully-autonomous vehicles may use a combination of sensor technologies. This sensor suite could include Radar, which provides constant distance and velocity measurements as well as superior all-weather performance, but lacks in resolution, and struggles with the mapping of finer details at longer ranges. Camera vision, also commonly used in automotive and mobility applications, provides high-resolution information in 2D. However, there is a strong dependency on powerful Artificial Intelligence and corresponding software to translate captured data into 3D interpretations. Environmental and lighting conditions may significantly impact camera vision technology.

LIDAR, in contrast, offers precise 3D measurement data over short to long ranges, even in challenging weather and lighting conditions. This technology can be combined with other sensor data to provide a more reliable representation of both static and moving objects in the vehicle's environment.

Hence, LIDAR technology has become a highly accessible solution to enable obstacle detection, avoidance, and safe navigation through various environments in a variety of vehicles. Today, LIDARs are used in many critical automotive and mobility applications, including advanced driver assistance systems and autonomous driving.

In many autonomous driving implementations, the main navigation system interfaces with one or a few LIDAR sensors. It is desirable that the LIDAR sensor(s) offer high ranges and high resolutions in order to support functions such as localization, mapping and collision avoidance. In terms of localization, the first step of environment perception for autonomous vehicles is often to estimate the trajectories of the vehicle. Since Global Navigation Satellite System (GNSS) are generally inaccurate and not available in all situations, the Simultaneous Localization and Mapping (SLAM) technique is used to solve that problem. In terms of collision avoidance, a long detection range at cruising speed potentially provides sufficient time to react softly in case of an obstacle detection. For example, for standing users inside a shuttle, a safe and comfortable deceleration of 1.5 m/s$^2$ may be desirable. As an example, at 40 km/h, and at 1.5 m/s$^2$ deceleration, a distance of 47 m is needed to stop the shuttle, assuming a 0.5 s reaction time.

Many autonomous shuttles today rely on a long-range mechanical-scanning LIDAR sensor that is placed on top of the shuttle. However, as discussed earlier, mechanical-scanning devices, such as a gimbal or spinning disks or polygons often come with resolution issues, maintenance issues, assembly issues and/or temperature dependence issues. Therefore, it would be desirable to provide LIDAR systems with solid state scanning devices that avoid or at least mitigate one or more of these issues.

In terms of range and resolution, it is generally desirable to provide detectability at greater range and sufficient resolution to be able to accurately categorize detected objects.

Figure 3:
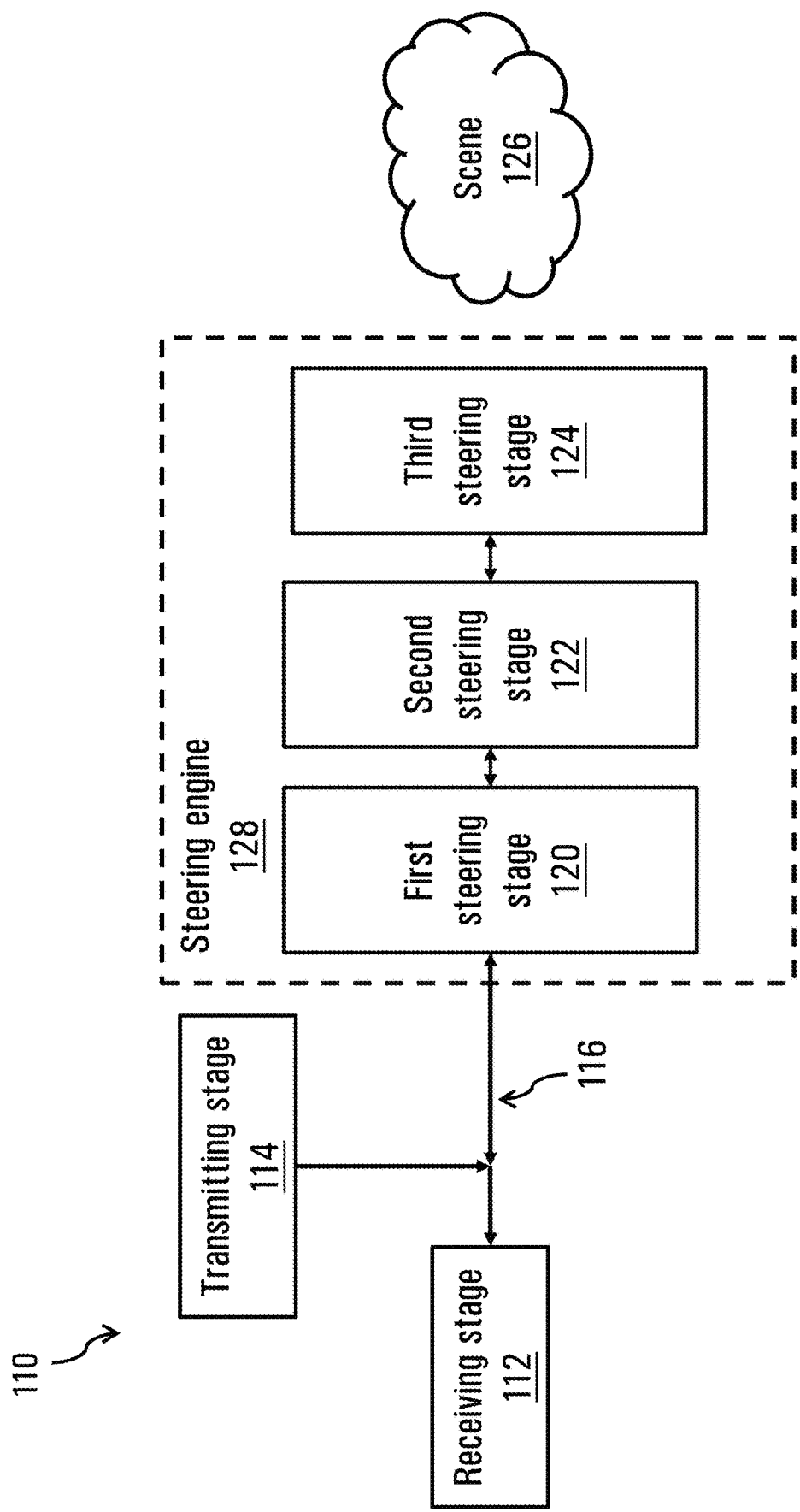
FIG. 3 is a block diagram illustrating components of a LIDAR apparatus using beam-steering.

With reference to FIG. 3, a LIDAR apparatus 110 is shown which creates a point cloud depicting the scene 126. The LIDAR apparatus 110 includes a transmitting stage 114, which includes a light source to illuminate the scene 126. Objects in the scene 126 will reflect or back scatter the projected light. The light returns are sensed by the receiving stage 112, where they are converted into electrical signals. The light returns convey distance information from objects in the scene 126 which can be measured on the basis of Time Of Flight (TOF) and Frequency-Modulated Continuous-Wave (FMCW), among others, as described earlier. A controller 168 shown in FIG. 12 converts the electrical signals into a point cloud which is a set of data points in space that represent a 3D shape of the scene. Typically, but not always, each data point has a set of X, Y and Z coordinates.

The LIDAR apparatus 110 has a beam-steering engine 128, including multiple beam-steering stages. For example, the LIDAR apparatus 110 may be placed at the front, back or side of a host vehicle to create a representation of the environment in which the vehicle travels. In the example shown, the beam-steering engine 128 has three beam-steering stages 120, 122 and 124, respectively. Each beam-steering stage is designed to deflect the light beam by a certain angle. The angular deflections produced at each stage add up (or subtract) to produce an outgoing beam that is directed at the scene 126. By altering the deflection angles at the beam-steering stages 120, 122 and 124 it is possible to displace the outgoing beam in a scanning motion and thus scan the scene.

Generally speaking, multiple beam-steering stages are useful because they can increase the overall angular beam deflection range at the output of the LIDAR apparatus and also increase the number of discrete angular steps within that overall range for an increased scanning resolution. In this example, three steering stages are being used, but it should be understood that more than three or less than three steering stages can be used. For example, a steering engine consisting of a single steering stage can be used. A more detailed example of a steering engine that includes seven stages is discussed later in this disclosure with reference to FIG. 8.

The beam-steering stages can operate on the basis of the same or different beam-steering technologies. For example, the first beam-steering stage 120 may include a moveable optical element. The optical element may be designed to reflect or diffract the incoming beam and by changing the position or orientation of the optical element the properties of the outgoing beam change, such as the angle of the propagation of the beam. In a specific example, the optical element can be a Micro-ElectroMechanical System (MEMS) using a moveable mirror to deflect the incoming beam and produce a scanning pattern of light. The MEMS mirror is controlled by a scanning mechanism that imparts to the mirror a cyclical movement producing a repeating scan of the outgoing beam. The scan can walk the beam in the horizontal direction, the vertical direction or have a hybrid pattern, such as for example a raster pattern. Typically, the movement of a MEMS mirror is a continuous movement over a predetermined angular steering range such as to produce a continuous displacement of the beam into the scene. By continuous displacement is meant a displacement where the mirror has either an infinite number of steps within the steering range or a finite number of micro steps, but the number of micro steps largely exceeds the discrete angular steering steps of the other steering stages. For example, the mirror may be configured to move in micro steps where each produces an angular deflection of less than 0.1 degree. In contrast, angular discrete steering steps, which is the mode of operation of the second and the third steering stages 122 and 124, are steps where the angular deflection from one step to the other is much larger, in the order of 2 degrees, 4 degrees, 5 degrees, 6 degrees or more per step.

The second beam-steering stage 122 may be a solid-state beam-steering stage using optical elements to selectively impart to the light beam a propagation direction that defines a non-zero angle with relation to the direction of incidence of the incoming beam. In a specific example of implementation, the second stage 122 uses a static grating with a director pattern that interacts with the incoming light to diffract the light in a direction of propagation that is determined by the director pattern properties. Optionally, in a so called, "active" configuration, the polarization grating is such that the director pattern can be selectively turned "on" or "off". In the operational "on" state, the director pattern re-directs the light in a propagation direction at the desired angle. In the "off" state the director pattern acts as a pass-through optical element and does not re-direct the light beam.

The sign of the light deflection angle when the director pattern is in the "on" state can be controlled by the handedness of the circular polarization of the incoming light beam. For instance, when the incoming beam has a right-hand circular polarization the director pattern deflects the light beam in one direction, while if the incoming beam has a left-hand circular polarization the director pattern deflects the light beam in the opposite direction. Accordingly, the outgoing beam can propagate along one of three possible directions: (1) a positive deflection angle; (2) no deflection and (3) a negative deflection angle.

In a variant, in the passive configuration, the polarization grating is not switchable. In this configuration the polarization grating produces either a positive deflection angle or a negative deflection angle.

Thus, the solid-state second beam-steering stage 122 may be a beam-steering device that can move the beam in discrete steps throughout the scan range. It therefore may be advantageous to use in the beam-steering engine 128 a steering stage that provides a continuous beam motion to provide a continuous motion of the beam projected from the LIDAR apparatus or at the least reduce the angular spacing between the beam steps.

Figure 8:
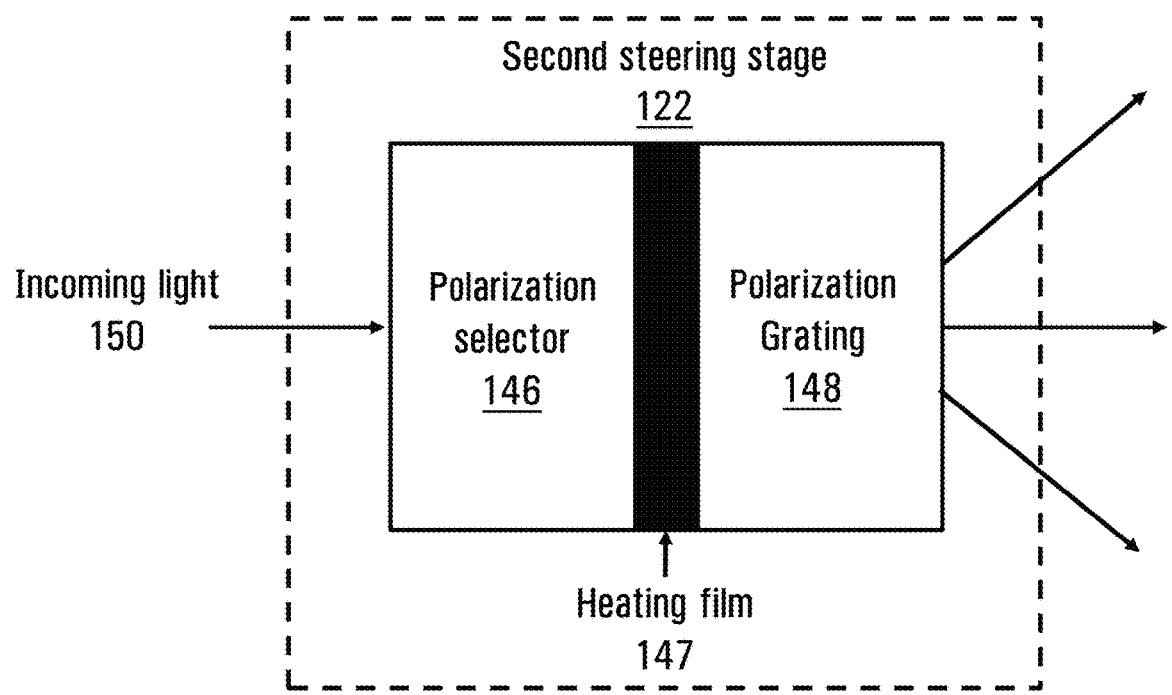
FIG. 8 is a block diagram showing the second steering stage of FIG. 7A provided with a heating element to manage the operational temperature of the second steering stage.

The third steering stage 124 can be identical to the second steering stage 122 and can be used to amplify the deflection angle of the beam and or add more discrete steps. In practice, a grating with a director pattern operates in a relatively high efficiency range if the light deflection is kept below a certain angular deflection. Above this angular deflection the efficiency drops. For that reason, it may be preferable to stack up several gratings, each deflecting the light by a certain angle that is within the high efficiency range, where the individual deflection angles add-up to a larger deflection angle. With specific reference to the graph shown in FIG. 13A, which shows an example plot of emission and reception efficiencies vs. horizontal steering angle for the multi-stage beam steering element of FIG. 8, it can be seen that the emission and reception efficiencies of the multi-stage beam steering element that will be discussed later with reference to FIG. 8, are not constant with steering angle. Emitter efficiency is the top curve (small dots) and receiver efficiency is the bottom curve (large dots). It will be noted that angular deflections that are less than about plus or minus 8 degrees maintain a high degree of efficiency; however, the efficiency drops with higher angles.

With specific reference now to FIG. 4 the transmitting and the receiving stages 112 and 114 will be described in greater detail. The transmitting stage 114 has a laser source 130 that can operate in the 900 nm range or alternatively in the 1500 nm range. The outgoing laser beam is focused by collimating optics 132 toward an optical path 116 that is shared by the transmitting stage 114 and the receiving stage 112, including a beam splitter 138 which separates the outgoing beam from the optical returns. In the case of the incoming beam received from the collimating optics 132, the laser light is highly polarized such that most of the energy is reflected by the beam splitter, which can be a polarization beam splitter toward the beam-steering engine 128 over the optical path 116. As to reflected or back-scattered light collected from the scene 126 and which is transmitted through the steering engine 128, the light is transmitted back over the optical path toward the beam splitter 138. However, since this light has lost a significant degree of polarization, the bulk of the energy is transmitted through the beam splitter 138 toward the receiving stage 112.

This shared optical path configuration has advantages in terms of simplicity and compactness, at the expense of some optical losses.

The returning optical light from the beam splitter 138 is received by an objective 136 which focuses the light on the sensitive surface of an optical receiver 134. The receiver 134 may be one using Avalanche Photo Diodes (APDs). While not shown in the drawings the electrical output of the receiver 134 is directed at the controller 290 shown in FIG. 12 that generates the point cloud. The controller 290 also controls the operation of the transmitting stage 114 and the operation of the steering engine 128 such as to synchronize all these components.

Figure 4:
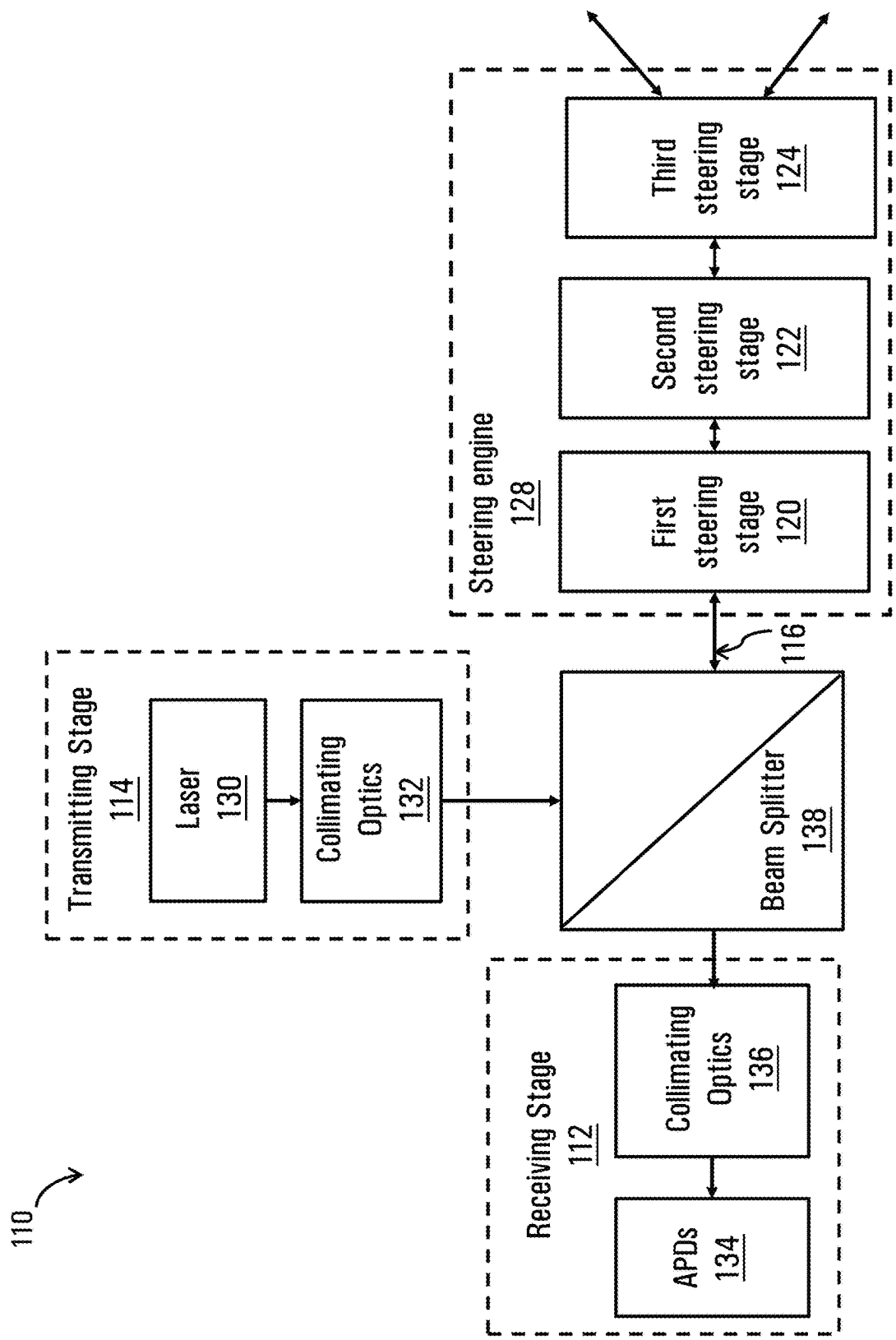
FIG. 4 is a more detailed block diagram of the receiving and transmitting stages of the LIDAR apparatus shown in FIG. 3.
Figure 5A:
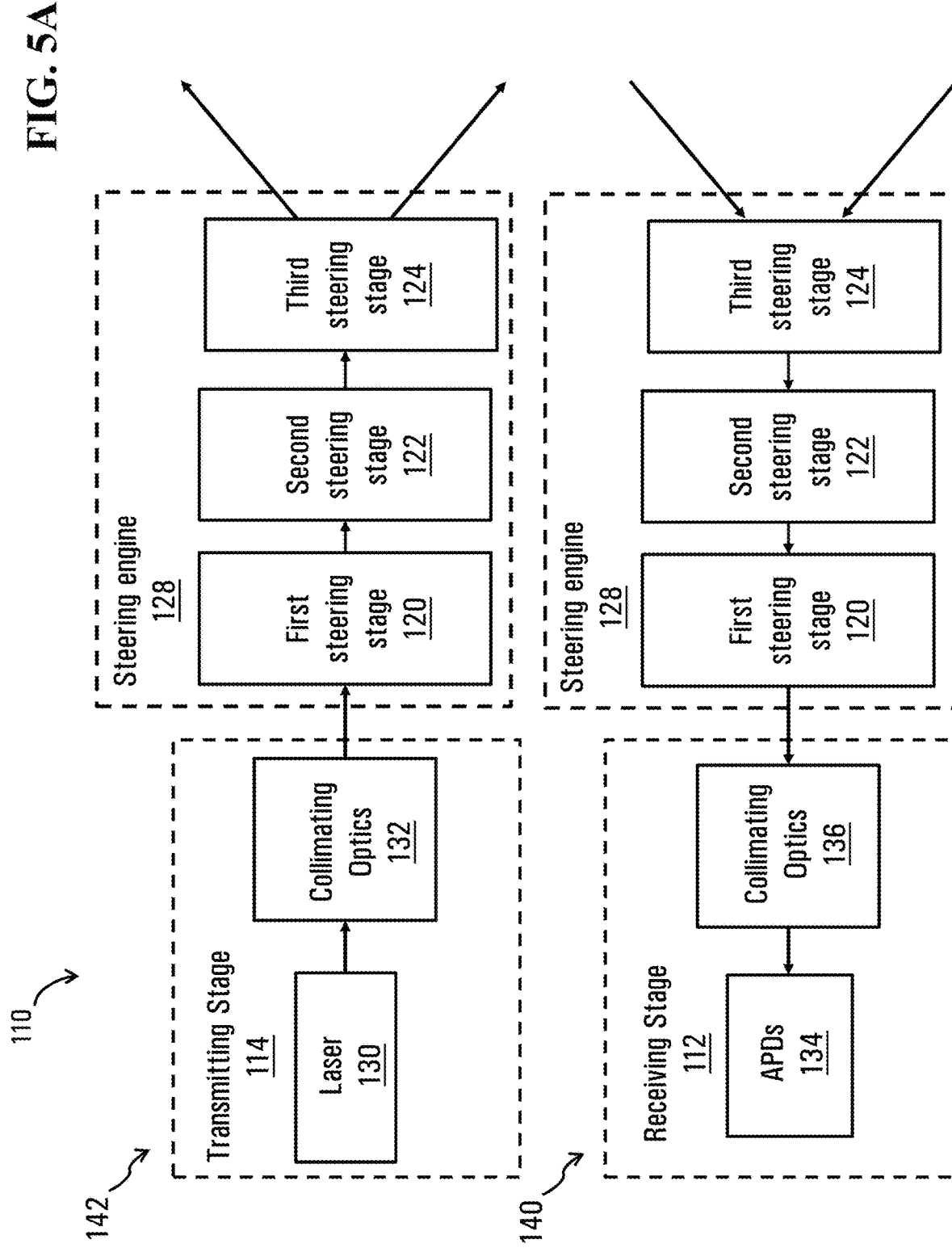
FIG. 5A is an arrangement which is a variant of the arrangement shown in FIG. 4.

FIG. 5A illustrates a variant of the architecture shown in FIG. 4, in which the transmitting and the receiving optical paths are separated and independent from each other. In this example, the LIDAR apparatus 110 has a transmitter 142 with a transmitting stage 114 using a dedicated steering engine 128 and a receiver 140 using its own steering engine 128. Physically, both the receiver 140 and the transmitter 142 are placed in a housing side by side, either vertically or horizontally. It is to be noted that the transmitting steering engine and the receiving steering engine are controlled independently from each other. While in most situations their operations would be synchronized it is possible, they are not always synchronized.

In some cases, the transmitting steering engine and the receiving steering engine may be identical. In other cases, the transmitting steering engine and the receiving steering engine may differ in one or more ways. For example, one may include more steering stages than the other and/or one or more of the steering stages in one of the steering engines may operate on the basis of a different beam-steering technology than one or more of the steering stages in the other steering engine.

Figure 5B:
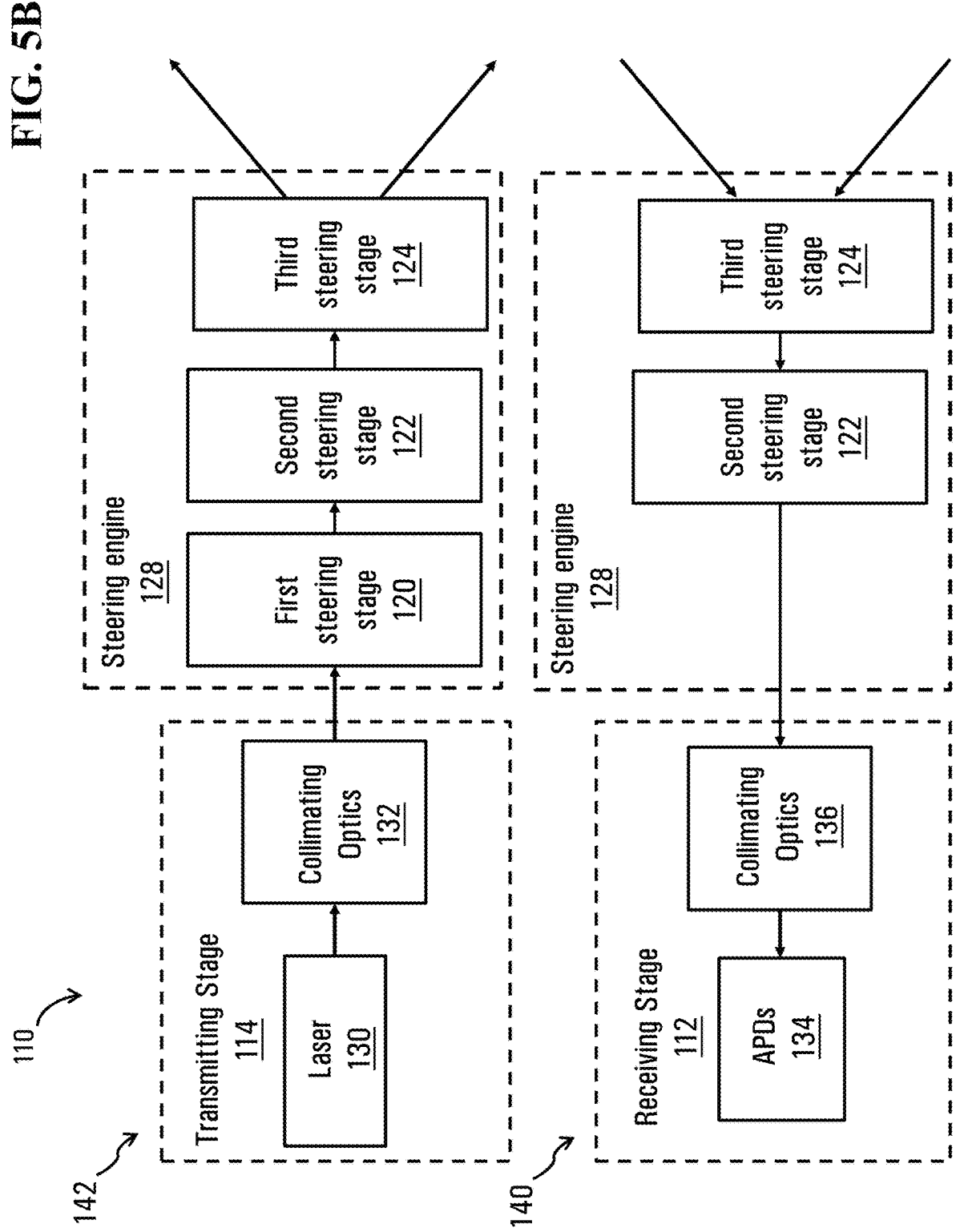
FIG. 5B is an arrangement which is another variant of the arrangement shown in FIG. 4.

For example, FIG. 5B illustrates a second variant of the architecture shown in FIG. 4 in which the transmitting and the receiving optical paths are separated and independent from each other. In this example the receiving steering engine omits the continuous-steering first steering stage 120 and only includes the discrete-steering second steering stage 122 and third steering stage 124. On the other hand, the steering engine 128 of the transmitter 140 in this example still includes the continuous-steering first steering stage 120 and the discrete-steering second steering stage 122 and third steering stage 124. A more detailed example of such an implementation is discussed later on with reference to FIG. 18A.

Figure 5C:
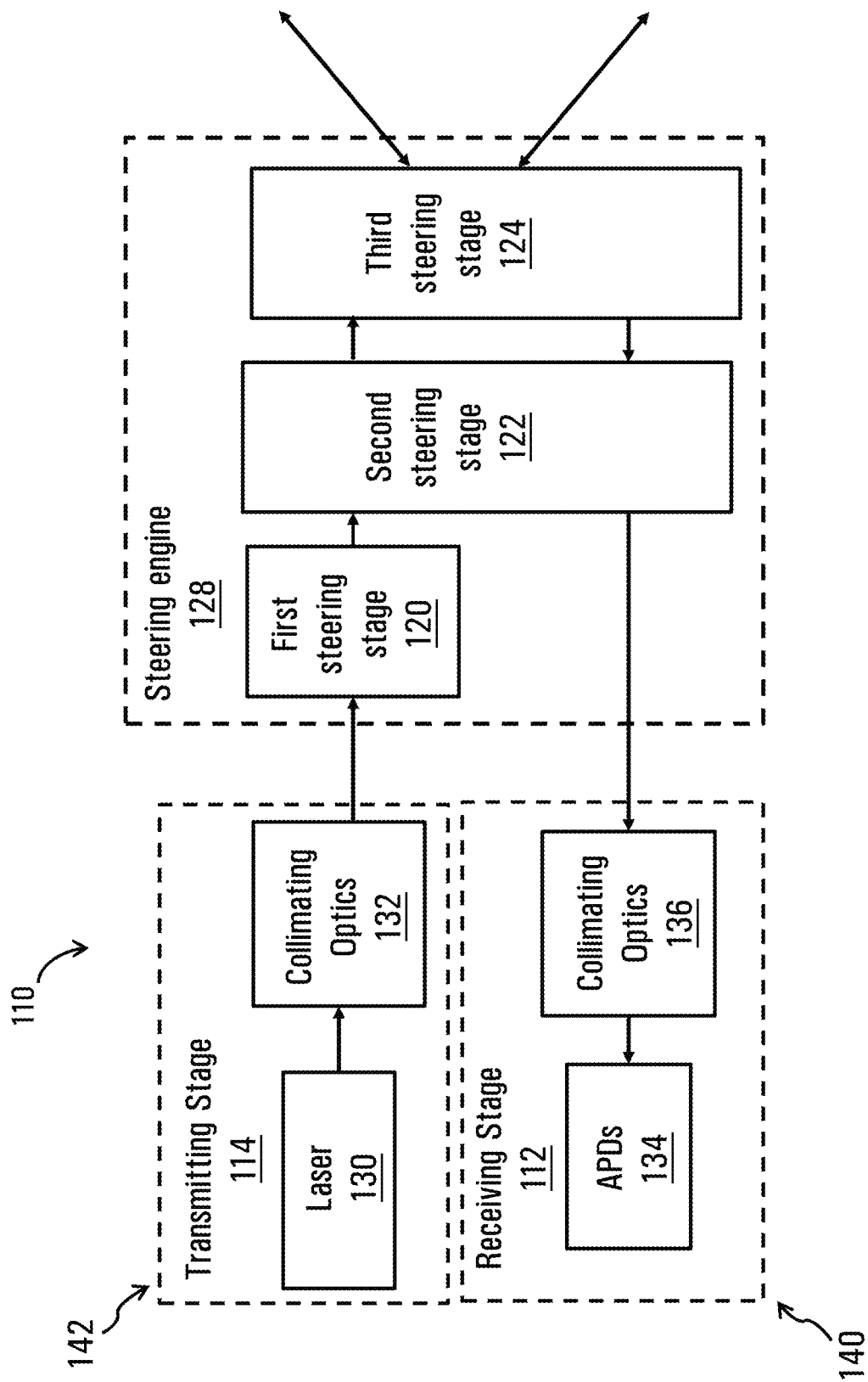
FIG. 5C is an arrangement which is yet another variant of the arrangement shown in FIG. 4.

FIG. 5C illustrates a third variant of the architecture shown in FIG. 4 in which the transmitting and the receiving optical paths are separated and independent from each other. In this example the receiver 140 and the transmitter 142 use a common steering engine 128. In this example, the first steering stage 120 of the common steering engine 128 is used only by the transmitter 142. The second steering stage 122 and the third steering stage 124 are used by both the receiver 140 and the transmitter 142. A more detailed example of such an implementation is discussed later on with reference to FIG. 18B.

Figure 6:
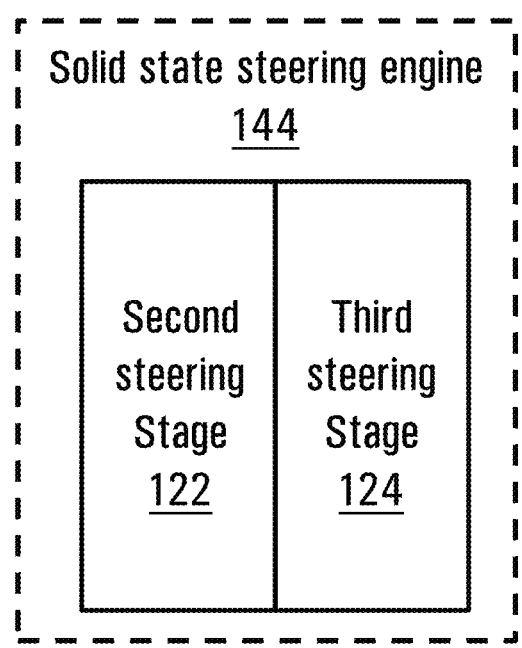
FIG. 6 is a more detailed block diagram of a solid-state steering engine which can be used in the LIDAR apparatus shown in FIG. 3.

With reference to FIG. 6, a block diagram of a preferred embodiment of the second and the third steering stages 122 and 124 is shown, forming a solid-state steering engine 144. The solid-state steering engine 144 has no moving parts and includes a stack of plate-like optical elements. It will be understood that the solid-state steering engine 144 can be coupled with a separate first steering stage, such as the steering stage 120 using MEMS optical elements, for example.

Figure 7A:
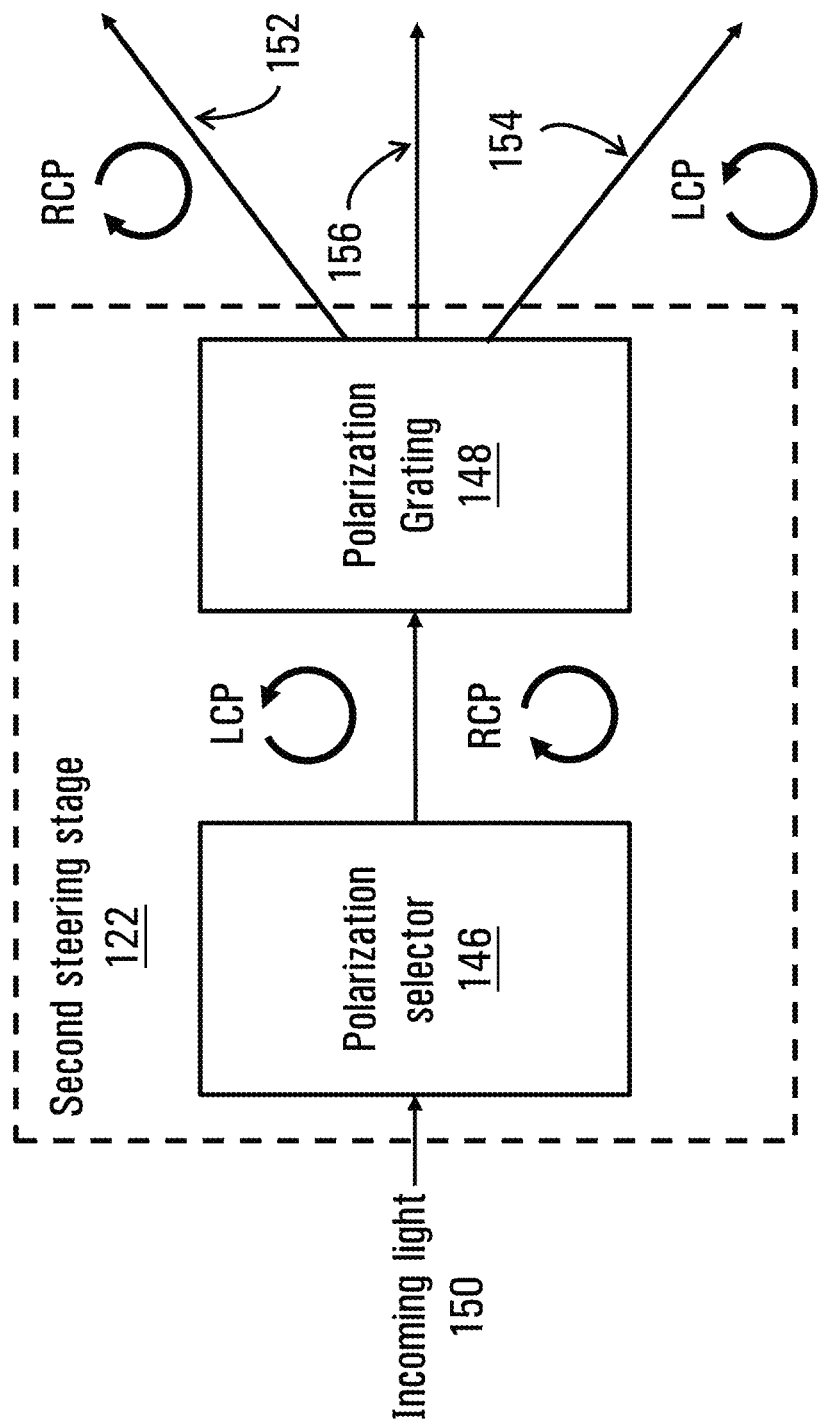
FIG. 7A is a block diagram illustrating a range of light propagation pathways of the second steering stage of the solid-state steering engine shown in FIG. 6, using a polarization grating in the active configuration.

With specific reference to FIG. 7A, the structure of the second steering stage 22 using an active polarization grating will be described. In this example, the second steering stage 122 has a plate-like polarization selector 146 stacked on a Polarization Grating (PG) 148, which preferably is a Liquid Crystal Polarization Grating (LCPG). The polarization selector 146 is preferably switchable between a first mode that does not change the polarization of the incident light beam 150 and a second mode that reverses the polarization of the light beam 150. For example, in some cases the polarization selector may be a switchable liquid crystal layer that is operable to be switched between the first mode and the second mode. In a specific example, the polarization selector 146 includes a waveplate. For details about the construction of the polarization selector and the LCPG the reader is invited to refer to the description in the U.S. Pat. No. 8,982,313 the contents of which are hereby incorporated by reference.

As discussed later the beam-steering stage 122 is responsive to steering commands, which are electrical signals that set the operational modes of the polarization selector 146 and the PG 148 (to the extent those modes are changeable) to obtain the desired beam deflection such that the output beam projected toward the scene is directed at the desired location of the scene. By changing the steering commands and thus altering the operational modes of the optical components of the beam-steering engine 122, the light beam 150 can be progressively displaced and walked over the scene to produce a scan in the selected pattern.

More specifically, input light 150 is received by the polarization selector 146 that is configured to control the polarization state of the light beam. The input light 150 has a circular polarization. If the laser 130 does not input directly circularly polarized light, which is likely to be the case of most implementations, additional optical elements may be used to impart to the light beam a circular polarization. Thus, the circularly polarized light that is input has either Left-hand Circular Polarization (LCP) or Right-hand Circular Polarization (RCP). The purpose of the polarization selector 146 is to alter the polarization of the light passing through the selector. For example, the polarization selector 146 may be a switchable liquid crystal layer that can be switched between two operational modes, in the first operational mode the polarization selector does not affect the polarization state of the input light 150 while in the second operational mode the polarization selector alters the polarization state, such as for example reversing the handedness. Accordingly, assuming the input light 150 is LCP polarized, in the first operational mode that does not affect the polarization state the output light will still be LCP polarized. However, if polarization selector 146 is switched in the second operational mode, the LCP polarized input light 150 will be RCP polarized at the output of the polarization selector.

The polarization selector 146 may be switched between the first operational mode and the second operational mode by applying a voltage to the polarization selector, for example.

The PG 148 that receives the polarized light according to the selected handedness is configured to re-direct the light to an angle in relation to the incident light direction. The PG 148 has a director pattern that diffracts the polarized light into one of two directions, either a positive angle or a negative angle, depending on the polarization handedness. In an "active" configuration, the PG 148 is also switchable between two operational modes. In the first operational mode the director pattern is intact such as to be able to perform the light diffraction. In the second operational mode the director pattern is distorted and acquires a structure where it no longer diffracts light, such that the output light is not deflected relative to the incident light, rather it exits along the same direction as the incident light.

In a first example, consider the situation where the input light 150 is LCP light. The polarization selector 146 is in an operational mode where the light it outputs is LCP light, in other words, the handedness of the original polarization is maintained. The LCP outgoing light enters the PG 148 that is in an operational mode where the director pattern is intact, hence it diffracts the incoming light. Assume that the director pattern is configured such that the diffraction produces a positive deflection angle when the incoming light is LCP light. Accordingly, the light output by the PG 148 will follow the direction 152. Note that the in addition to re-directing the light, the PG 148 changes the handedness of the polarization accordingly the light output at 152 is now RCP light.

In a second example, assume that the polarization selector 146 is now switched to a different operational mode where the handedness of the incoming light 150 is altered. This means that the light input into the PG 148 is RCP light. The director pattern will now diffract the light according to a negative deflection angle, as per direction 154. Also, the handedness of the polarization will be flipped such that the outgoing light will be LCP light.

In a third example, assume now that the PG 148 is switched such that it acquires the second operational mode by applying a voltage to it in order to re-arrange the director pattern in a different structure where the director pattern no longer diffracts the incoming light. In that example, the PG 148 basically becomes a pass-through optical structure that does not change the direction of propagation of the light. In that operational mode, the PG 148 no longer alters the handedness of the polarization. For instance, LCP light that enters the PG 148 will be released as LCP light and RCP light will be released as RCP light along the direction 156.

Figure 7B:
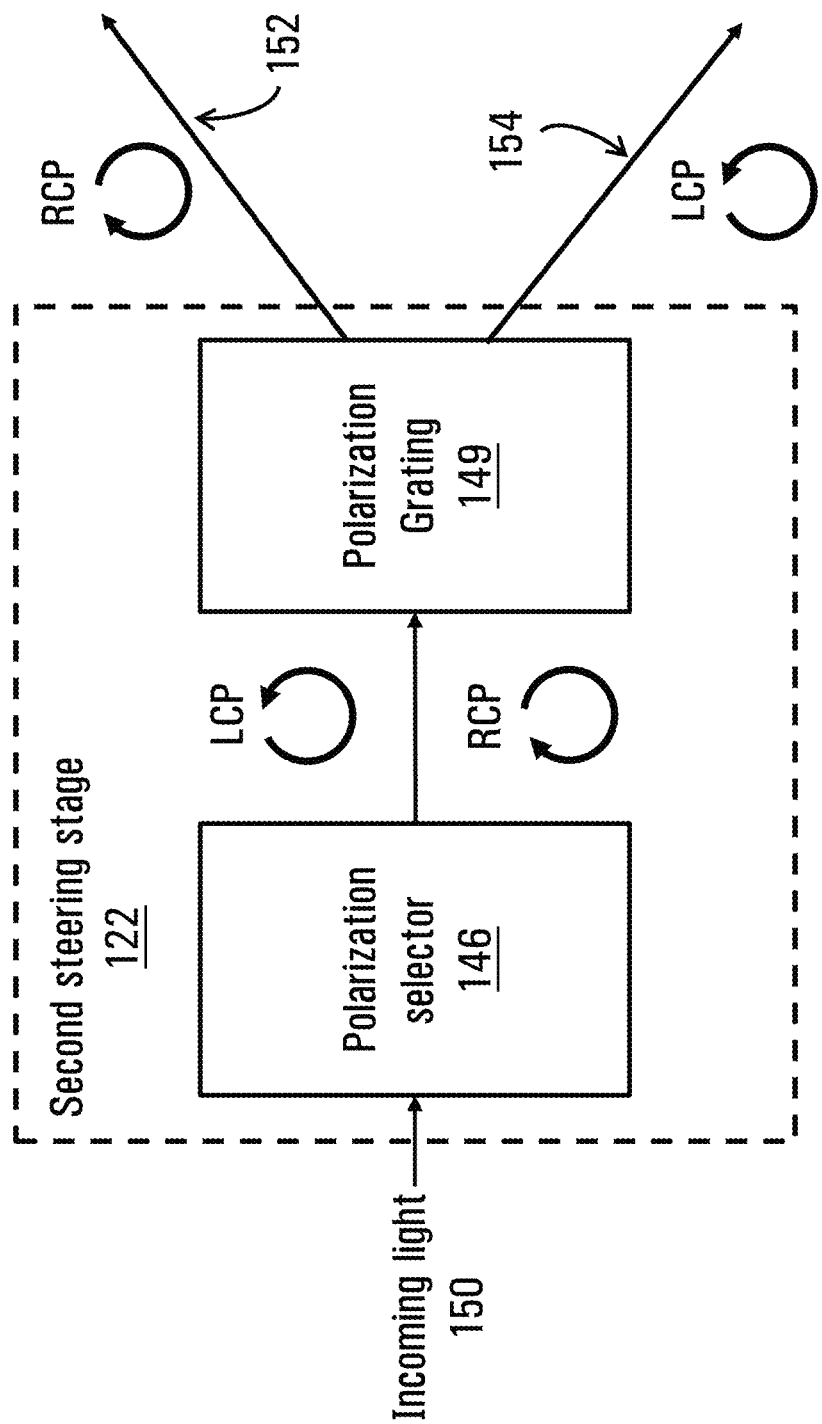
FIG. 7B is a block diagram illustrating a range of light propagation pathways of a variant of the second steering stage, using a polarization grating having a passive configuration.

In a variant, the PG is passive, and it is not switchable. That is to say no signal is applied to it. An example of this variant with a passive (i.e., non-switchable) PG 149 is shown in FIG. 7B. In this form of construction, the director pattern which diffracts the incoming light beam is static. As a result, the PG 149 provides two angular deflection steps, one being a deflection with a positive deflection angle and the other a deflection with a negative deflection angle. Accordingly, the steering range provided by the PG 149 is defined by two light deflection directions that are angularly spaced apart from each other by an angle corresponding to the entire angular steering range. When the incident light beam has an LCP polarization the PG 149 deflects the light beam in one of the deflection directions (e.g., in the direction 152) and when the incident light beam has an RCP polarization the PG 149 deflects the light beam in the other deflection direction (e.g., in the direction 154).

More specifically, FIG. 7B shows the light propagation directions achievable with the PG 149 in the passive configuration. Essentially, the light propagation directions are the same as those described in connection with FIG. 7A, the difference being that the light propagation direction 156 is missing and only two directions are possible, namely 152 and 154. In contrast the switchable (active) PG 148 provides an additional propagation direction in which the light beam is not deflected. In the active case, the steering range is defined by three discrete steps, the advantage being there is increased light beam-steering granularity relative to the passive example above.

Figure 7C:
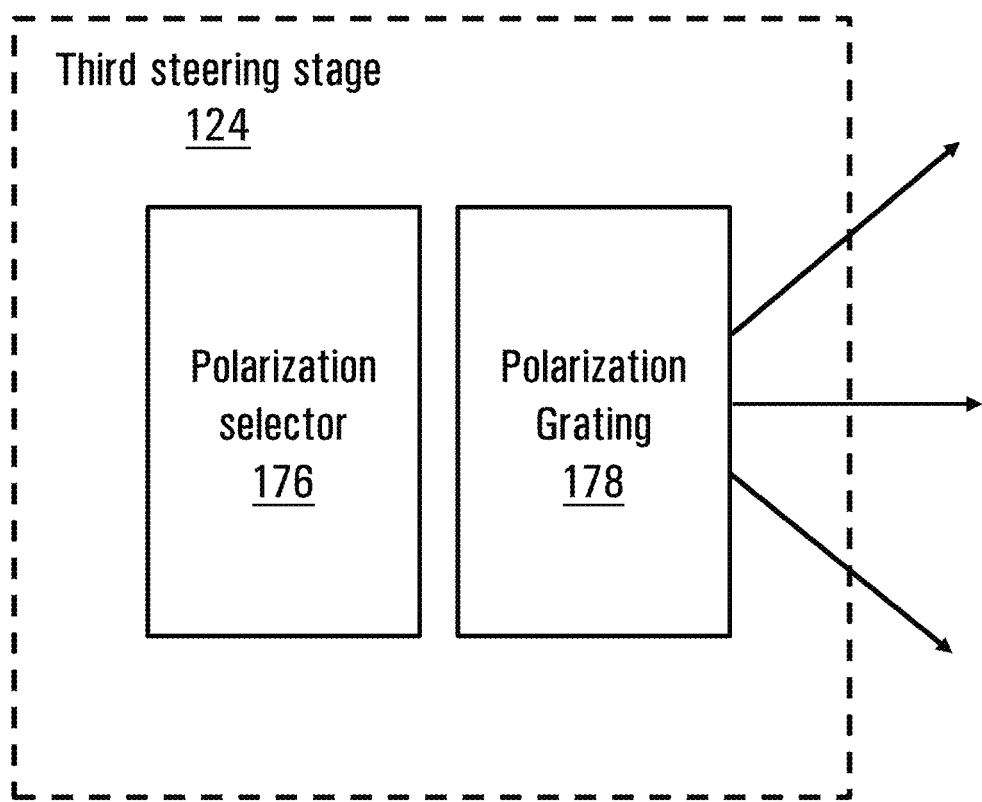
FIG. 7C is a block diagram showing the light propagation pathways of the third steering stage of the solid-state steering engine shown in FIG. 6.

As discussed earlier, the third steering stage 124 may be identical to the second steering stage 122 and multiplies the number of discrete directions along which the light may be projected from the LIDAR apparatus 110, including increasing the angular deflection range since the light input into the second stage 124 is already deflected by the first stage 122. For example, FIG. 7C shows an example structure of the third steering stage 22 that includes a polarization selector 176 and a polarization grating 178. The polarization selector 176 and the polarization grating 178 may implemented with the same or similar structure as the polarization selector 146 and the active polarization grating 148 or the passive polarization grating 149 of the second steering stage 122.

Additional solid-state steering stages will increase the selectable steps and the overall angular beam-steering range. Note, the third steering stage 124 can use an active PG or a passive PG. The switching from one operational mode to another of the PG 148 or the polarization selector 146 is not an instantaneous event. When voltage is applied to the liquid crystal material the re-arranging of the director pattern in a new structure that does not diffract light is characterized by a switching on time. The director pattern will remain in that state as long as the voltage is maintained. When the voltage is removed, the director pattern will naturally return to its original configuration in which it diffracts light. This process is characterized by a relaxation time. The relaxation time is significantly longer than the switching on time. In a specific example of implementation, the switching on time is in the range of 100 microseconds to 25 microseconds. The relaxation time can vary in the range of 1.8 milliseconds to less than 600 microseconds.

Figure 13A:
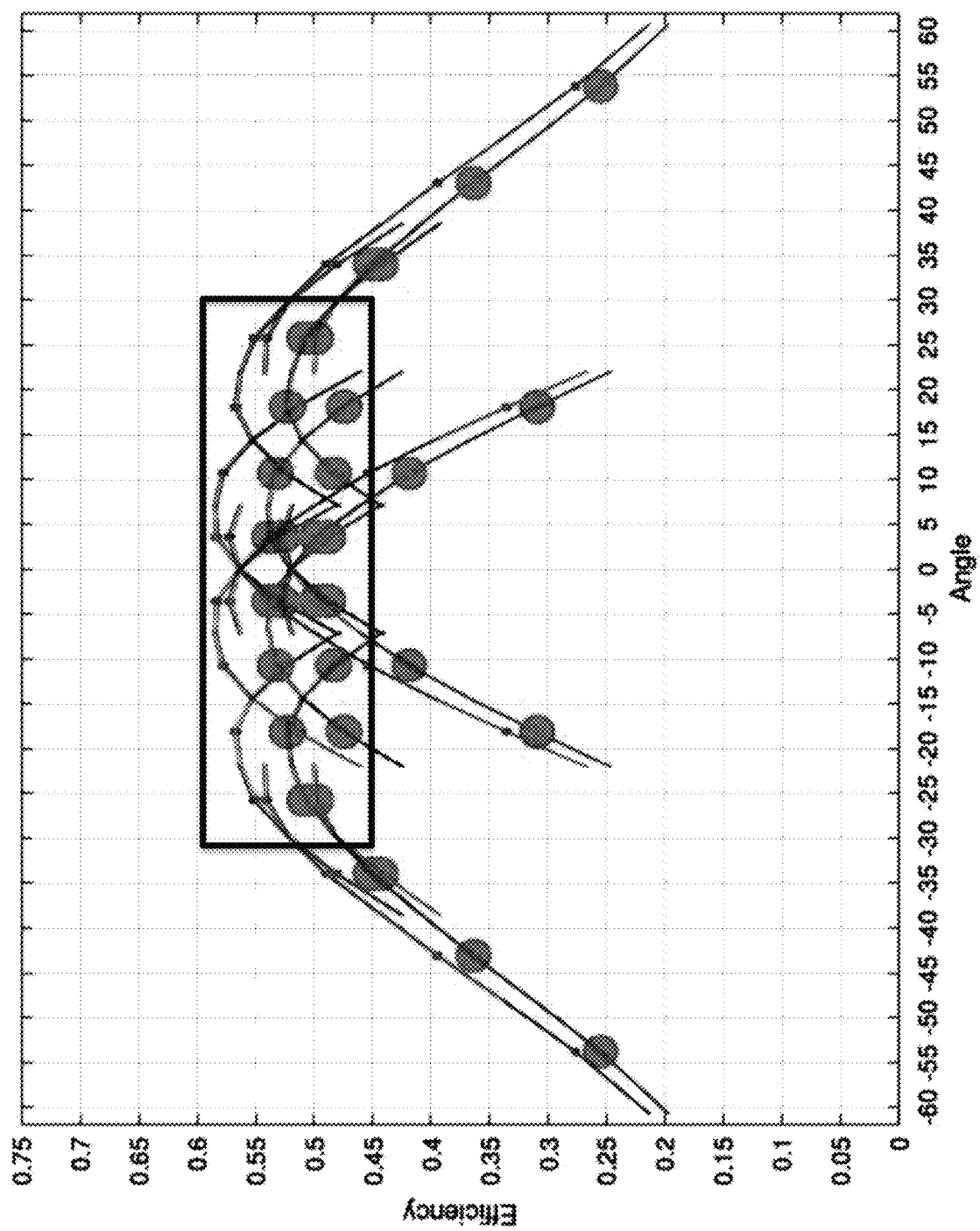
FIG. 13A shows an example plot of transmission and reception efficiencies vs. steering angle for the LCPG beam steering element of FIG. 10.
Figure 13B:
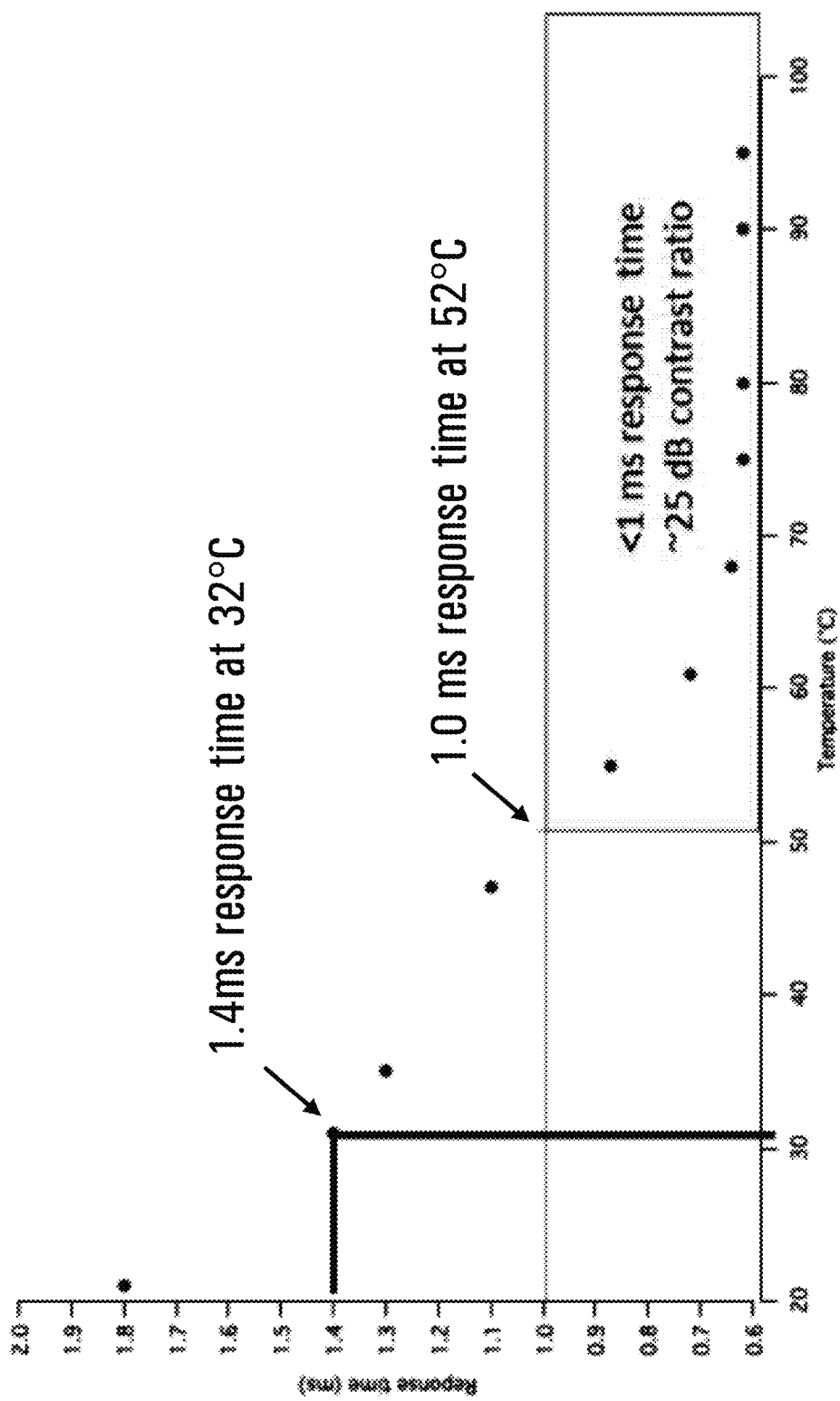
FIG. 13B is a graph illustrating the relaxation time for the LCPG beam steering element of FIG. 10 with relation to temperature.

The relaxation time is generally temperature dependent. As discussed in further detail later, the graph in FIG. 13B shows that, in general, as the temperature of an LCPG drops, the relaxation time increases. For example, in the passive configuration in which the PG is not switchable, the increasing relaxation time with decreasing temperature is due to the temperature dependent transition time of the LC cell(s) used to implement the polarization selector(s). In the active configuration, in which the PG is also switchable between different modes, the temperature dependence of the transition times of the PG may also impact the overall transition times of the beam steering engine. In both cases, this increase in relaxation time is undesirable because an increase of the relaxation time would reduce the speed at which a beam can be switched, for example a switch from direction 152 to 154 in the passive configuration, or a switch from direction 156 to 152 or from 156 to 154 in the active configuration. That, in turn, would affect the scanning speed of the LIDAR apparatus 110, which is the time necessary for the LIDAR apparatus 110 to scan the scene. Ultimately, the scanning speed affects the frame rate, which is the rate at which data frames of a point cloud are generated.

Several approaches can be considered to manage the transition times of the polarization selector and/or the polarization grating, namely the switching on times and particularly the relaxation times and their effect on the overall performance of the LIDAR apparatus 110.

A first solution is to manage the temperature of the steering stages such that they remain in a temperature range where the transition times remain comparatively low. In a specific example, the shaded box in the graph of FIG. 13B, identifies an operational range where the transition times, in particular the relaxation time is less than 1 millisecond. For the particular PG 48, PS 46 used in this example, this translates to a temperature threshold that is above 52 degrees Celsius, preferably above 75 degrees Celsius, it being understood that different PG or PS constructions can have different temperature thresholds and ranges associated with them.

FIG. 8 illustrates an example of implementation where the steering stage 122 (the same would also be true for the steering stage 124) is provided with a heating element to manage the operational temperature of the steering stage. The heating element is in the form of a transparent or substantially transparent film 147 that is electrically conductive and has a sufficient resistance to be able to produce the thermal energy necessary to maintain the steering stage 122 at a temperature that is above 52 degrees Celsius and preferably substantially above that threshold. Electrodes, not shown in the drawings may be provided at the exposed edges of the film 147 to create the current flow into the film. The film 147 can be made of Indium Tin Oxide (ITO), for example. The specific composition of the ITO film 147 is selected to provide the desired light transmission properties and desired electrical conductivity in order to be able to heat the steering engine 122 at the desired temperature. It is preferred to use a film 147 that has elevated heat generation capacity to bring the steering engine up to the desired temperature relatively fast. This is useful at start-up, especially in cold climates where the temperature of the steering stage 122 may be at the sub-zero level and it is desirable to quickly heat up the steering stage 22 such as to be able to achieve a minimal operational data frame rate of the point cloud.

Figure 9:
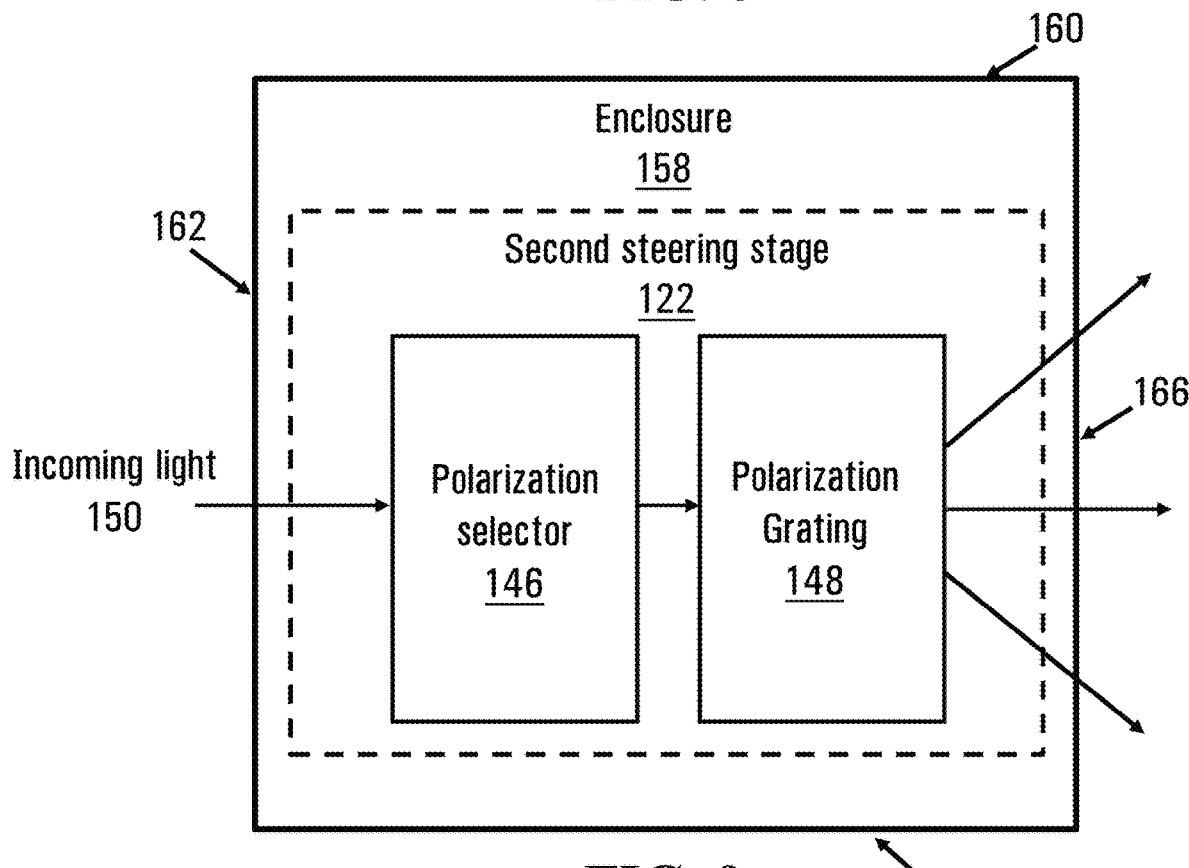
FIG. 9 is a block diagram of the second steering stage mounted in a heated enclosure to manage the operational temperature of the second steering stage.

In a possible variant shown in FIG. 9, the steering engine 122 is placed in an enclosure 158 which is thermally controlled. The enclosure 158 has sides and defines a chamber in which a temperature can be maintained substantially higher than the ambient temperature. In the example shown in the drawings the enclosure 158 has walls 160, 162, 164 and 166. Wall 162 is a system-side wall in that its outer surface faces inward into the LIDAR apparatus 110. Wall 166 is a scene-side wall in that its outer surface faces outward towards the scene. Walls 160 and 164 are side walls. The enclosure 158 also includes top and bottom walls (not shown) that enclose the internal space of the enclosure 158. The scene-side wall 166 includes a transparent window to allow the light to pass through such that the LIDAR apparatus 110 can scan the scene and receive reflected or back-scattered light from the scene. If the light transmitting stage and the light receiving stage reside outside the enclosure 158, at least a portion of the wall 162 will also be transparent. The temperature control in the enclosure 158 can be achieved by one or more heating elements placed at any suitable location(s) in the enclosure 158. For instance, the transparent window can be heated to control the temperature of the enclosure and dissipate any fog or condensation that may form on the external surface of the window in applications where the external surface is exposed to elements that can induce formation of such fog or condensation.

Another approach to manage the transition times, which can be used in addition to the temperature control is the synchronization between the switching of multiple steering stages. If transition times are necessary, it would be desirable for such transition times to occur concurrently between stages instead of sequentially. In this fashion, the overall transition time, which is the time for all the stages to transition to the desired operational state would be reduced.

Note that the above description was made in the context of beam-steering in the horizontal plane, but it can also be made in the vertical plane. To achieve steering in both horizontal and vertical directions additional steering stages can be provided to manage the vertical beam-steering. For example, to provide horizontal/azimuth beam-steering the polarization selector of a horizontal/azimuth steering stage may be aligned with horizontal/azimuth, whereas to provide vertical/elevation beam-steering the polarization selector of a vertical/elevation steering stage may be rotated 90 degrees relative to horizontal/azimuth.

Figure 10:
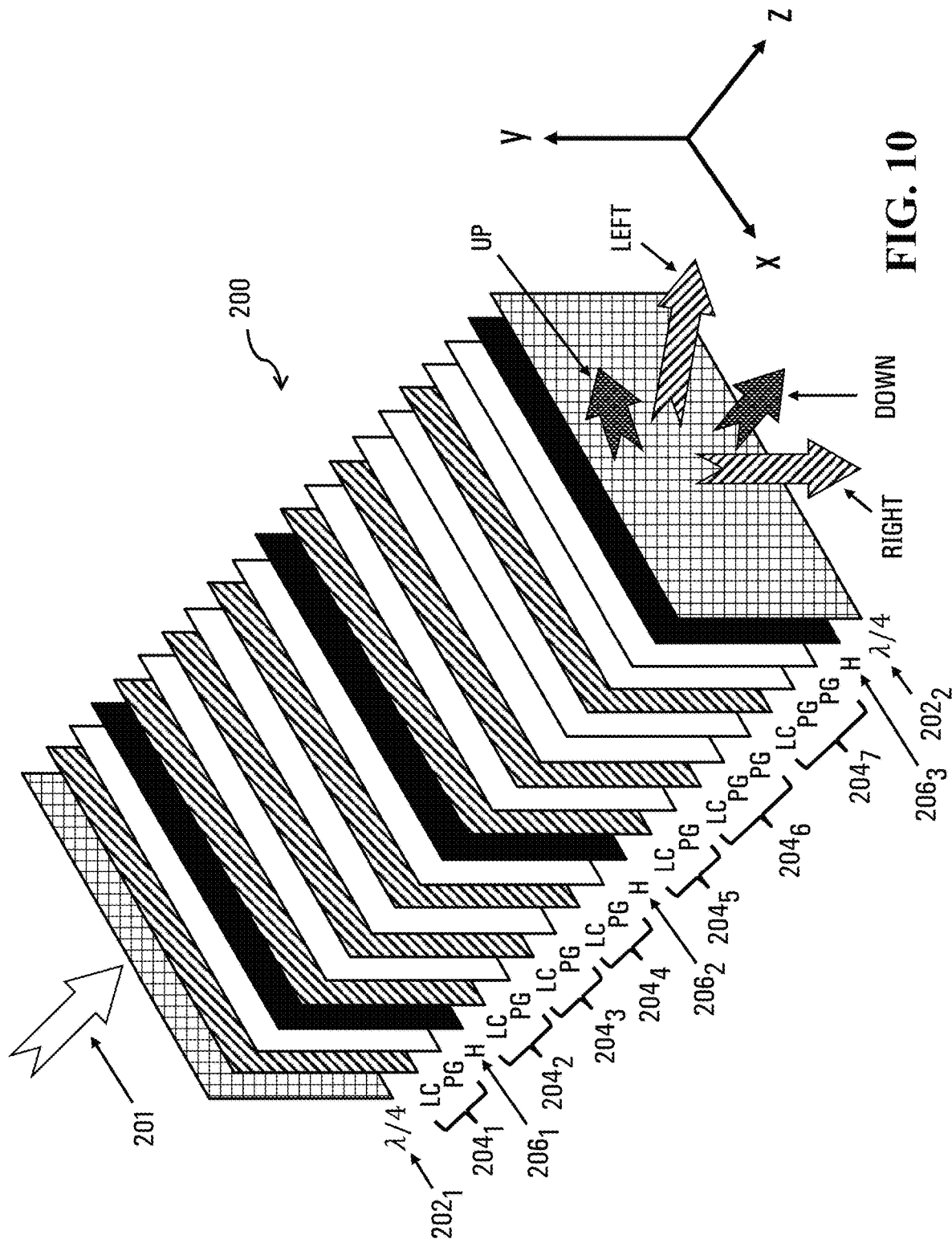
FIG. 10 shows an example of a digital beam steering component implemented using a liquid crystal polarization grating (LCPG) in accordance with an embodiment of the present disclosure.

FIG. 10 shows an example of a solid-state discrete beam steering engine implemented using a multi-stage LCPG 200 in accordance with an embodiment of the present disclosure. In this example, the LCPG 200 includes seven steering stages $204_1$, $204_2$, $204_3$, $204_4$, $204_5$, $204_6$ and $204_7$ and is configured for use with a laser source 130 that has linear polarisation. The LCPG 200 also includes two quarter waveplates $202_1$ and $202_2$ and three heating layers $206_1$, $206_2$ and $206_3$. The first quarter wave plate $202_1$ is located before the first steering stage $204_1$ and is configured to turn linearly polarized light 201 from the laser source 130 into circularly polarized light that can be steered by the subsequent steering stages. The three heating layers $206_1$, $206_2$ and $206_3$ are located between the first steering stage $204_1$ and the second steering stage $204_2$, between the fourth steering stage $204_4$ and the fifth steering stage $204_5$, and after the seventh steering stage $204_7$, respectively. The second quarter waveplate $202_2$ is located after the third heating layer $206_3$ to tailor the output polarization for some specific targets which have polarization dependency. In this example, each of the first five steering stages $204_1$-$204_5$ includes a liquid crystal (LC) polarization selector and a polarization grating (PG). The last two steering stages $204_6$ and $204_7$ each include an LC polarization selector and two PGs. Including multiple PGs in a steering stage can increase the total possible steering range for that stage. For example, if the two PGs in the seventh steering stage have the same individual steering range, e.g, approximately 3.75 degrees each, then the combined steering range of the two PGs would result in twice the effective steering range for that stage, e.g., approximately 7.5 degrees.

The first two steering stages $204_1$ and $204_2$ provide vertical/elevation steering angles (e.g., in the y direction according to the x-y-z coordinate system shown in FIG. 10) and the last five steering stages $204_3$, $204_4$, $204_5$, $204_6$ and $204_7$ provide horizontal steering angles (e.g., in the x direction according to the x-y-z coordinate system shown in FIG. 10).

Figure 11:
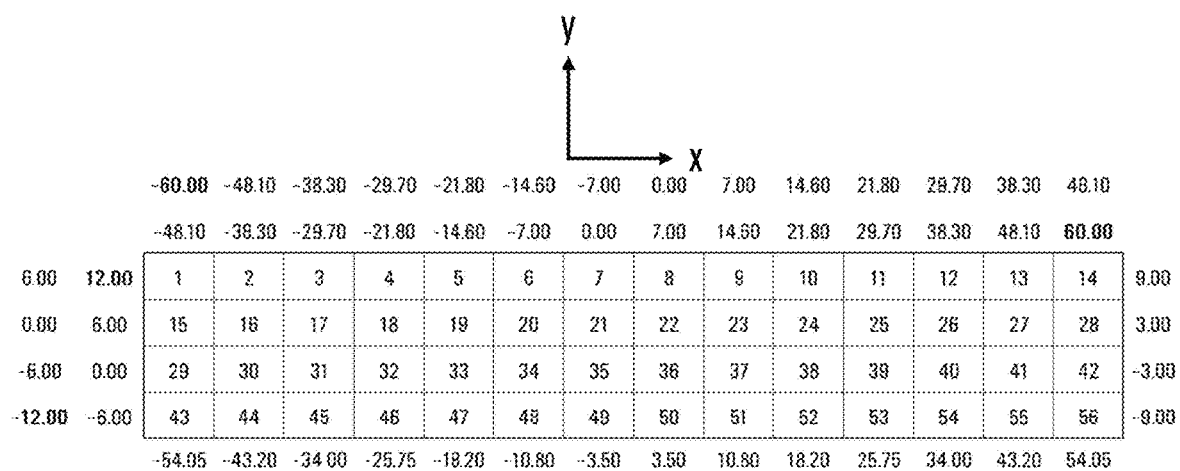
FIG. 11 shows an example of two-dimensional (2D) beam steering angles that are possible using the LCPG beam steering element of FIG. 10.

FIG. 11 shows an example of two-dimensional (2D) beam steering angles that are possible using the multi-stage LCPG beam steering element 200 of FIG. 10. It is noted that the PGs of the first two steering stages $204_1$ and $204_2$ are configured such that the LCPG beam steering element 200 is capable of steering in 4 vertical directions and the PGs of the last five steering stages $204_3$-$204_7$ are configured such that the LCPG beam steering element is capable of steering in 14 different horizontal directions. For example, the PG of the first steering stage $204_1$ is configured to provide approximately 3 degrees steering in air and the PG of the second steering stage $204_2$ is configured to provide approximately 9 degrees steering in air, which means that, in the PGs are operated passively, the first two steering stages can be combined to selectively steer/deflect a light beam in the vertical/elevation direction by −9°, −3°, +3° or +9° relative to the incident angle of propagation of the light beam on the LCPG in the vertical/elevation direction.

Each pair of a horizontal direction and a vertical direction in which the LCPG 200 is capable of steering may be referred to as a "tile" in the full FoV of the LCPG. In this case, the LCPG 200 is capable of steering in any one of 14×4 tiles, each with a nominal optical field of view of 7.5°×6.0° (Horizontal×Vertical), thereby providing a full FoV of 120°×24°. In FIG. 11, minimum and maximum angles of each tile's Horizontal FoV is shown above the addresses of the tiles, and the minimum and maximum angles of each tile's Vertical FoV is shown at the left of the tiles addresses. For example, tile 6 has minimum and maximum angles of Horizontal FoV equal to −14.6° and −7°, respectively, and minimum and maximum angles of Vertical FoV equal to 6° and 12°, respectively. Similarly, the nominal Horizontal steering angle of each tile is shown below the addresses of the tiles, and the nominal Vertical steering angle of each tile shown at the right of the tile addresses. For example, tile 6 has a nominal Horizontal steering angle equal to −10.8° and a nominal Vertical steering angle equal to +9°.

However, the emission and reception efficiencies of the LCPG 200 are not constant with steering angle. FIG. 13A shows an example plot of emission and reception efficiencies vs. horizontal steering angle for the LCPG beam steering element 200 of FIG. 10. Emitter efficiency is the top curve (small dots) and receiver efficiency is the bottom curve (large dots). The difference between the emission and reception efficiencies is due to polarizer transmission, which may be 90% efficient.

Figure 12A:
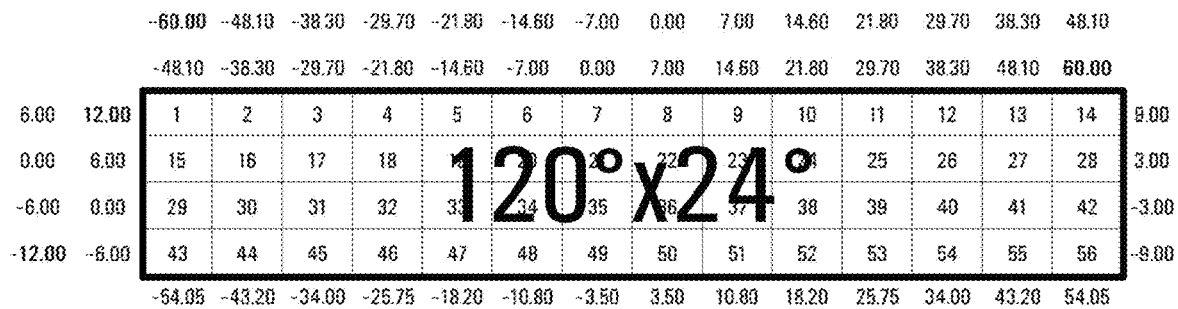
FIGS. 12A, 12B, 12C, 12D and 12E show examples of various steering angle configurations that are possible within the 2D beam steering angles of FIG. 11.
Figure 12B:
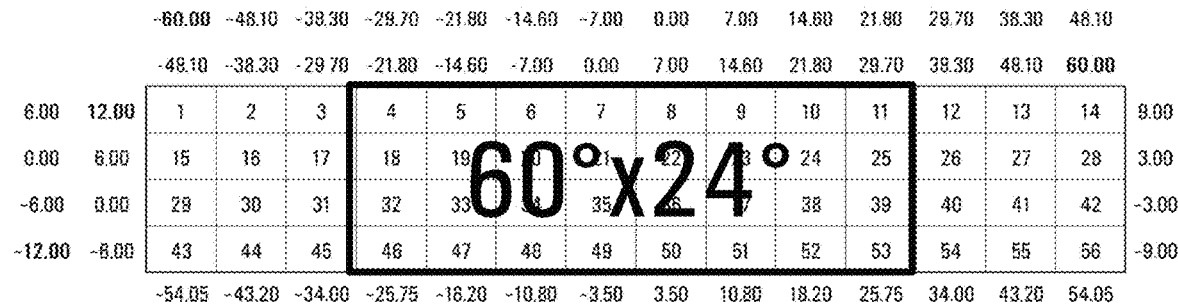
Figure 12C:
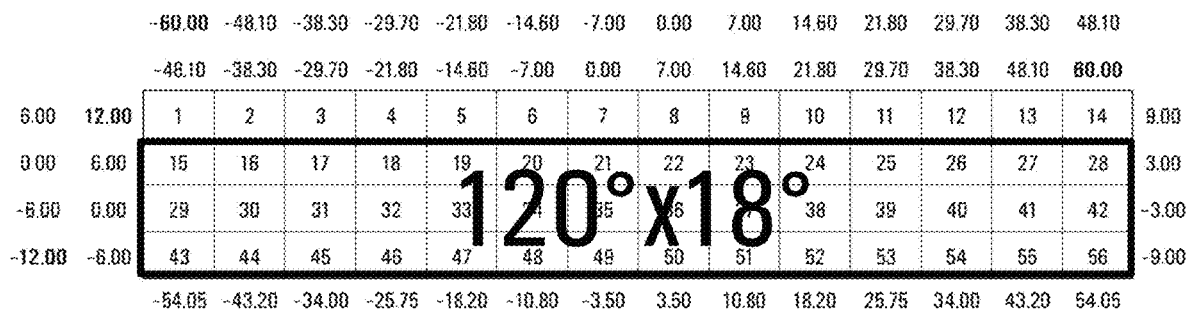
Figure 12D:
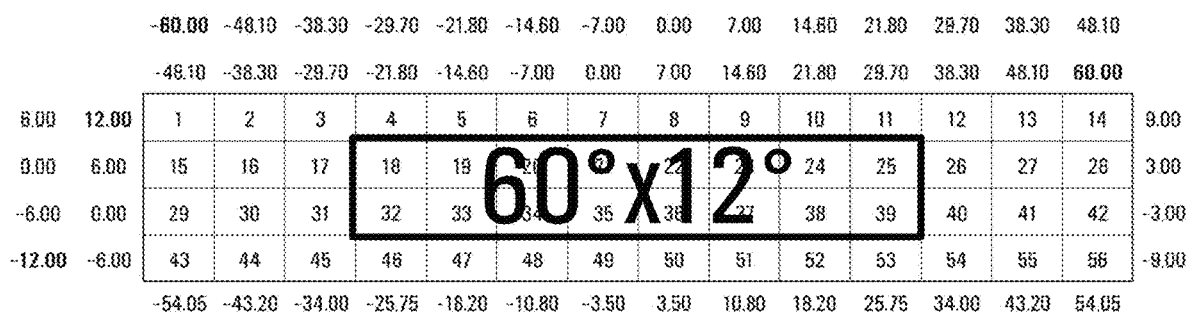
Figure 12E:
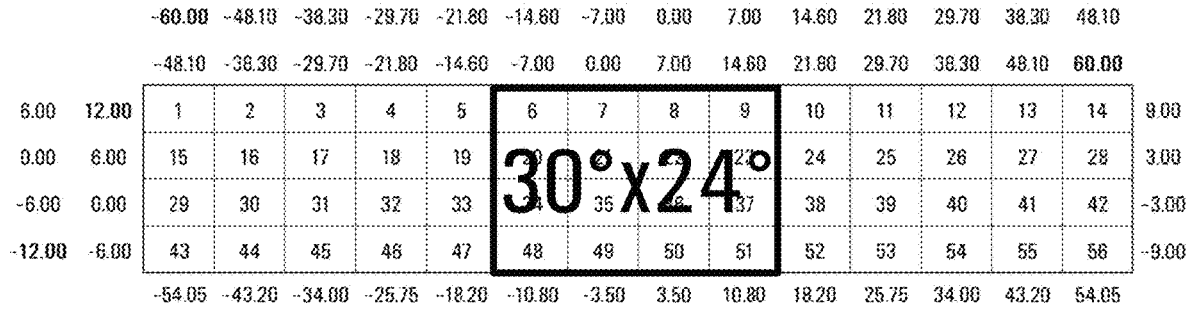

Since emission and reception efficiencies drop off at higher horizontal steering angles, rather than using all 14×4 tiles of the LCPG 200 to provide steering over the full FoV of 120°×24° as shown in FIG. 12A, in some cases only a subset of the tiles may be used to scan within a subregion of the full FoV. For example, FIGS. 12B to 12E show alternative steering angle configurations that are possible within different subregions of the full FoV over which the LCPG 200 is capable of steering. In particular, in FIG. 12B shows an example in which only the center 8×4 tiles of the LCPG 200 are utilized for horizontal and vertical steering over a 60°×24° central subregion of the full FoV. In other implementations, more or fewer tiles may be used for steering to provide a wider or narrower horizontal and/or vertical steering range. For example, FIG. 12C shows an example in which the lower 14×3 tiles are utilized for horizontal and vertical steering over a 120°×18° subregion, FIG. 12D shows an example in which the center 8×2 tiles are utilized for horizontal and vertical steering over a 60°×12° subregion, and FIG. 12E shows an example in which the center 4×4 tiles are utilized for horizontal and vertical steering over a 30°×24° subregion. As noted above, the examples shown in FIGS. 12A-12E utilize the center tiles of the LCPG 200 to take advantage of their higher transmission/reception efficiency. However, other examples may also or instead utilize non-central and/or non-contiguous subsets of the tiles of the LCPG.

Figure 13C:
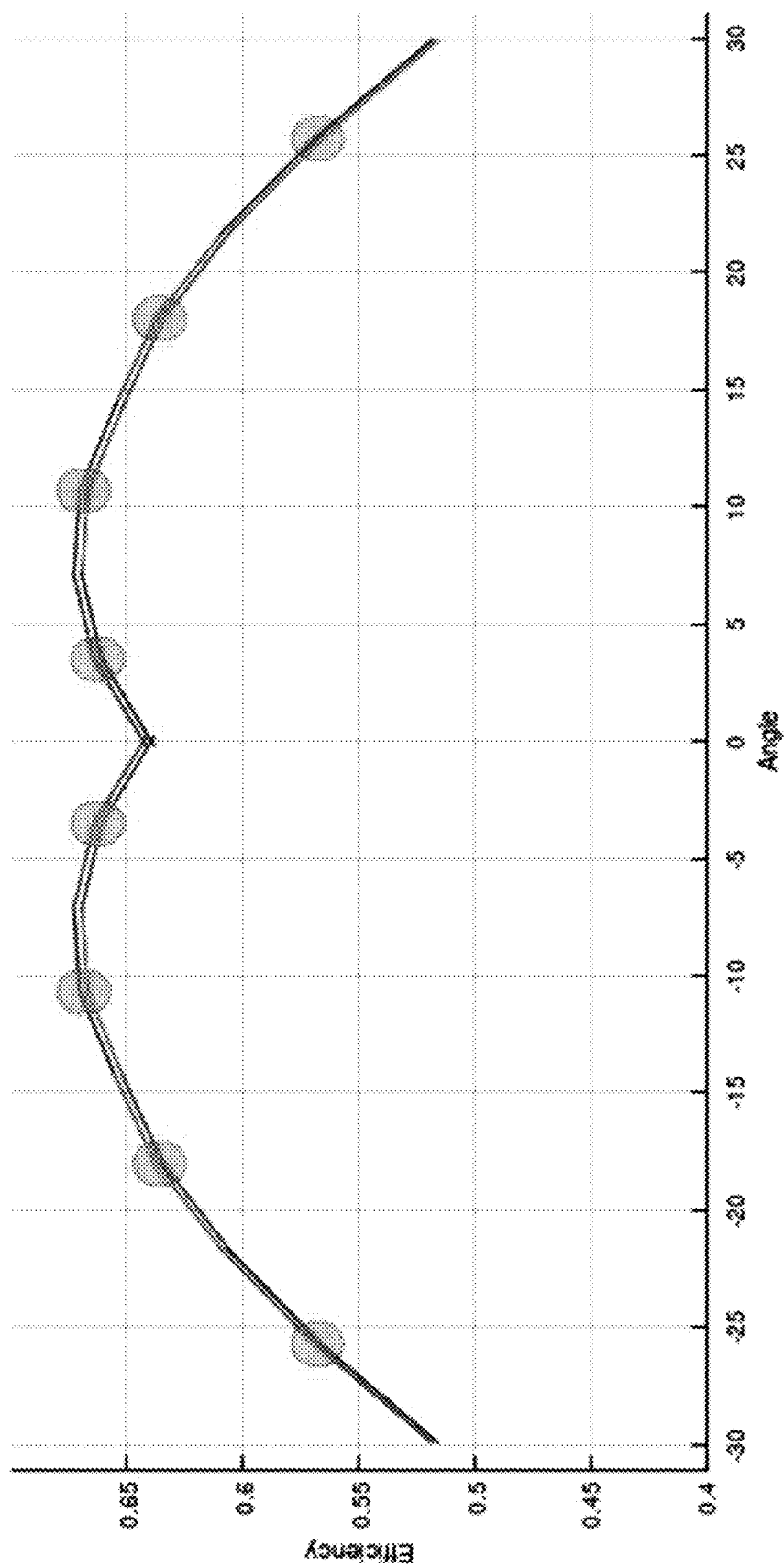
FIG. 13C shows an example plot of transmission and reception efficiencies vs. steering angle for an LCPG beam steering element with two fewer steering stages than the LCPG beam steering element of FIG. 10.

It is also noted that, if not all tiles of the LCPG 200 are required for a given implementation, an LCPG with fewer horizontal steering stages may be utilized, which could potentially reduce cost and provide a gain in efficiency, and therefore in range. For example, the LCPG 200 includes seven steering stages $204_1$-$204_7$, two of which are configured for vertical/elevation steering ($204_1$ and $204_2$) and five of which are configured for horizontal/azimuth steering ($204_3$-$204_7$). The two vertical/elevation steering stages $204_1$ and $204_2$ collectively include two LC polarization selectors and two PGs, and the five horizontal/azimuth steering stages $204_3$-$204_7$ collectively include five LC polarization selectors and seven PGs. However, if only 8×4 tiles are required for horizontal and vertical steering over a 60°×24° central region of a FoV, then rather than utilizing the central 8×4 tiles of the LCPG 200, the same range of horizontal and vertical steering over a 60°×24° region could be realized using an LCPG with only five steering stages (two vertical/elevation steering stages and three horizontal/azimuth steering stages) that each include one LC polarization selector and one PG. This would represent essentially omitting the sixth and seventh steering stages $204_6$ and $204_7$ from the LCPG beam steering element 200, which would result in two fewer LC polarization selectors and four fewer PGs than the seven steering stages of the LCPG 200. In addition, the third heating layer element $206_3$ could also potentially be omitted. FIG. 13C shows an example plot of emission and reception efficiencies vs. horizontal steering angle for an LCPG beam steering element with five steering stages that provide horizontal and vertical steering over 8×4 tiles covering substantially the same 60°×24° region as the central 8×4 tiles of the LCPG beam steering element 200 and higher emission and reception efficiencies.

Figure 14:
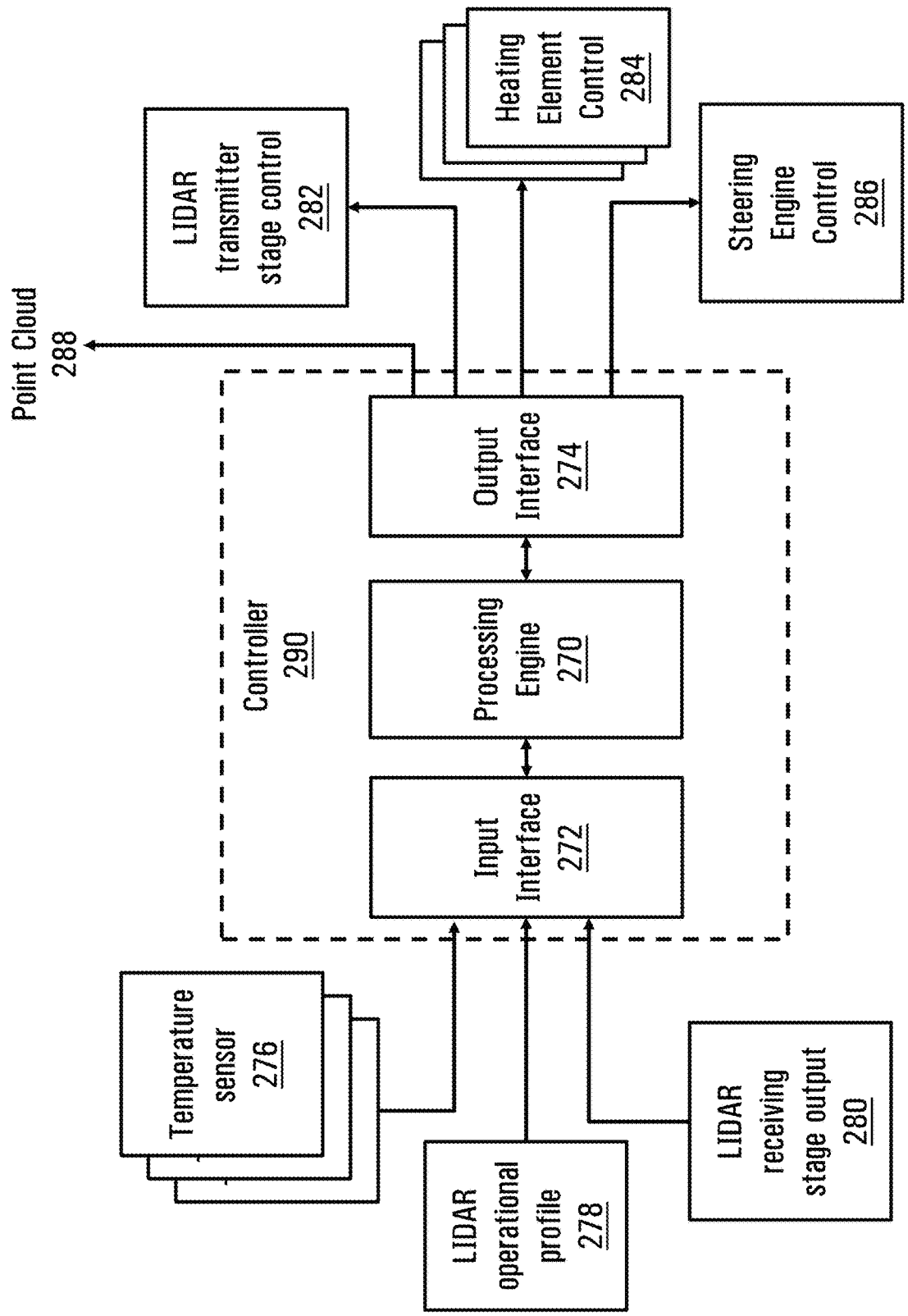
FIG. 14 is a block diagram of a controller of the LIDAR apparatus shown in FIG. 3.

Referring again to FIG. 3, the control of the LIDAR apparatus 110 in general and the switching of the various steering stages in particular may be controlled by a controller 290. A block diagram of an example of the controller 290 is shown in FIG. 14. The controller 290 has a processing engine 270 which includes one or more CPUs executing software in the form of machine instructions encoded on a non-transitory machine-readable medium. The instructions define the overall functionality of the processing engine 270.

The controller 290 has an input interface 272 that receives inputs from external entities. These inputs are in the form of signals which the processing engine 270 processes and generates outputs via an output interface 274. The outputs would typically be control signals to drive components of the LIDAR apparatus 110. Also, the output interface 274 outputs the point cloud 288 sensed by the LIDAR apparatus 110 and which is the 3D representation of the scene 126.

In some implementations, one or more temperature sensors 276 may provide information about one or more temperatures of the steering engine 128. The temperature sensor(s) can be placed at any suitable location on the steering engine such as to sense the temperature. As the block diagram at FIG. 14 shows, there may be multiple temperature sensors 276, e.g., one per steering stage. If the LIDAR apparatus 110 has the capability to control the temperature of multiple heating elements, one per steering stage for example, the independent temperature sensing per steering stage allows to tailor the temperature to each stage independently. This may be useful in instances where the steering stages are not identical, and each may have different operational temperature thresholds.

The LIDAR operational profile 278 is a configuration setting that conveys a number of parameters of the LIDAR apparatus 110 that can be varied to tailor the operation of the LIDAR apparatus 110 to a range of different operational conditions. For example, the LIDAR apparatus can be adjusted such as to focus the sensing in one area of the scene 126 at the expense of other areas of the scene. This would be the case in instances where objects of interest are identified in some portion of the scene and it would be desirable to focus the LIDAR apparatus in that area to get more resolution on the objects of interest. The LIDAR apparatus can also or instead be configured such as to increase the amplitude of the optical scanning beam and/or increase the number of laser pulses and reception accumulations for a longer-range scanning where objects of interest reside at a longer distance from the LIDAR apparatus 110. Conversely, the intensity of the light beam may be reduced in instances where objects of interest, in particular objects that have strong reflections, such as road signs, are close. In that situation an optical beam of strong intensity would produce optical returns that are of high intensity also, making it more difficult for the sensitive surface 134 to handle. In fact, it is possible that such strong returns may saturate the APDs.

In a specific mode of implementation, the LIDAR operational profile 278 conveys one or more of the following controllable parameters of the LIDAR apparatus 110:

1. Intensity of the light beam generated by the laser source 130. For example, the profile can specify a setting among N possible power settings.
2. Area of the scene that is to be scanned. This setting can be characterized in numerous ways. One possibility is to define a window in the overall field of view in which the light beam is to be directed. In a specific example, the field of view can be divided in virtual tiles and the setting can specify which tile or set of tiles are to be scanned. For example, as described earlier, FIG. 11 illustrates an example of a field of view divided in tiles corresponding to the 2D steering angles that are possible using the LCPG beam steering element 200. In the example shown in FIG. 11, the arrangement is such that there are four rows of fourteen tiles each, for a total of fifty-six tiles. The setting can specify a subset of tiles that are to be scanned. For instance, the setting may convey the coordinates of the selected sub-set of tiles, such that the optical beam excursions will be restricted to the requested sub-set of tiles. For example, the sub-set may correspond to any of the examples of sub-regions shown FIGS. 12A-12E. For example, if the sub-set of tiles corresponds to the 60°×12° subregion shown in FIG. 12D, the highlighted set of sixteen tiles (tiles 18 to 25 and 32 to 39) may be stated in the profile and the optical beam will be controlled such that it scans the area defined by the sixteen tiles only. Note, the set of tiles do not need to be contiguous. Once the definition of the tiles is provided to the controller 290, the logic of the controller can determine the operational setting of the steering engine 128 in order to obtain the desired beam scan.

3. More generally, the profile can specify more or less resolution in certain areas, whether in the X and Y plane or in the X, Y and Z space and let the controller 290 determine the actual LIDAR apparatus 110 settings to achieve the desired resolution in the desired area. Assuming the field of view is characterized as a series of tiles, the setting can provide an indication of the subset of tiles and the degree of resolution that is desired. The controller 290 would automatically set the various parameters of the LIDAR apparatus 110 such as the beam intensity and steering engine operation parameters, among others.

In a specific example of implementation, the controller 290 may have a library of LIDAR operational profiles. For example, each entry in this library may correspond to a different set of operational settings and the controller 290 may be configured to dynamically switch between operational profiles. The LIDAR operational profile input 278 may therefore only convey the index in the library such that the controller 290, upon receipt of the index can identify the requested profile, read the settings in that profile and adjust the operation of the LIDAR apparatus 110 accordingly. The controller 290 may switch between profiles as requested by a path planning controller, when the LIDAR apparatus 110 is used in autonomous or semi-autonomous automotive applications, for example. That is to say, the path planning controller determines which LIDAR operational mode is best suited for path planning purposes and issues a request to that effect, which can be the index in the library of profiles.

The LIDAR receiving stage output 280 also feeds into the controller 290 which essentially reads the output of the receiving stage 112, e.g., the output of the APDs 134, applies algorithms to detect distances for various points in the scene and generates a point cloud 288, which is a 3D representation of the scene 126. Optionally, the controller 290 can perform detection in the point cloud to identify objects. The detected objects and the point cloud are output at 288 through the output interface 274. The point cloud may be output as a succession of data frames, for example.

The output interface 274 releases the point cloud at 288 and optionally detected objects information. In addition, it releases control signals at 282 to control the laser source 130, control signals 286 to operate the steering engine 128, and optionally control signals 284 to control one or more heating elements.

The steering engine control signals 286 to operate the steering engine 128 include steering commands such as switching signals for each steering stage. For example, referring again to FIG. 7A, the switching signals for the second steering stage 122 may include polarization switching signals for the polarization selector 146 and switching signals for the PG 148. As another example, referring again to FIG. 10, the switching signals for the LCPG 200 operated in the passive mode may include polarization switching signals for the LC polarization selector of each of the seven steering stages $204_1$-$204_7$.

The heating element control signals 284 may include heating control signals for one or more heating elements of the beam steering engine 128. For example, referring again to FIG. 10, the heating element control signals 284 may include heating control signals for the three heating layers $206_1$, $206_2$ and $206_3$.

Figure 15:
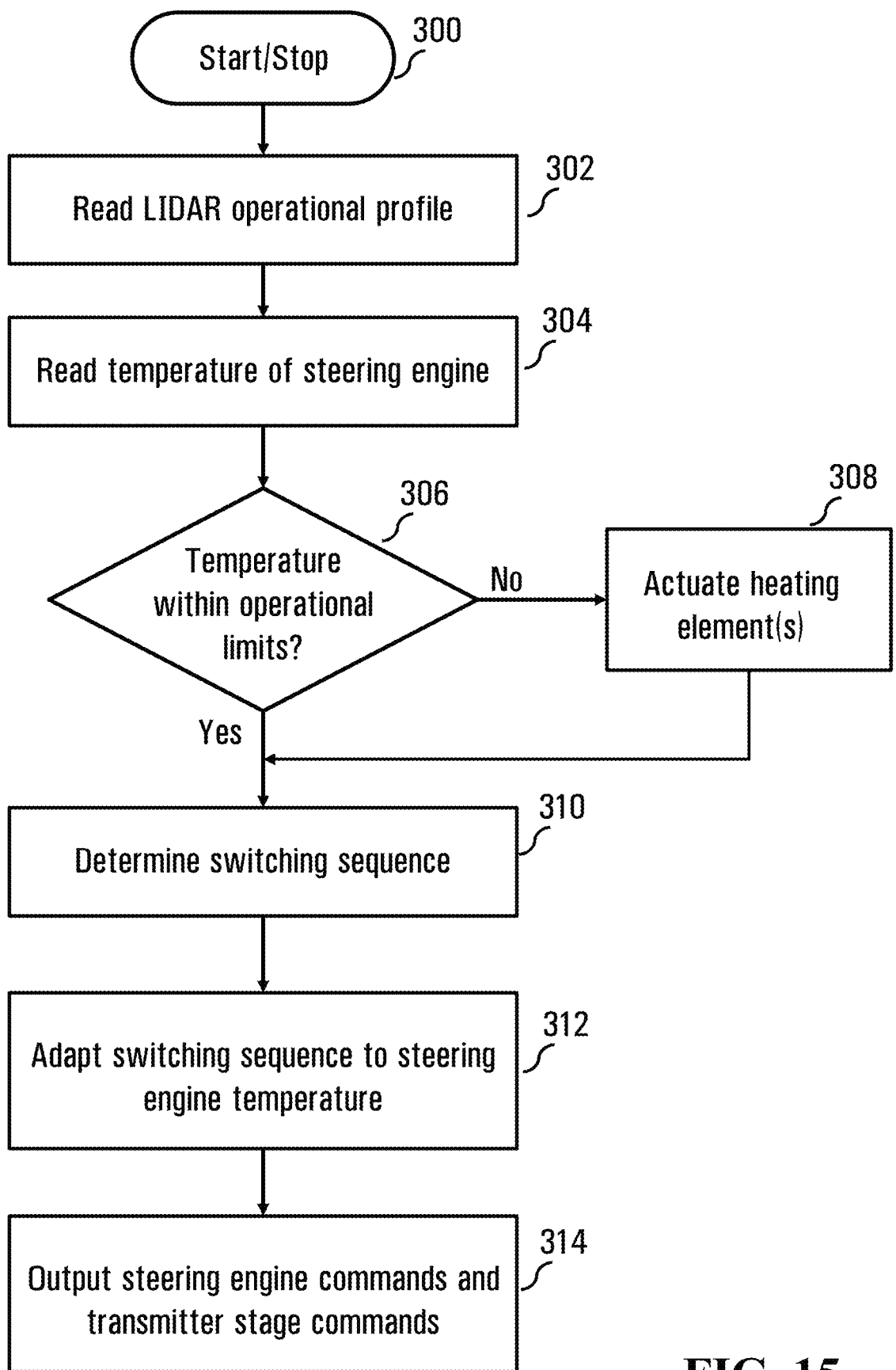
FIG. 15 is a flowchart of a process implemented by the controller shown in FIG. 14.

FIG. 15 is a flowchart of an example of a mode of operation of the controller 290. The process starts at 300. At step 302 the controller 290 reads the requested LIDAR operational profile from the library. Optionally, at step 304, the controller 290 may read temperature sensor(s) 276 of the steering engine. For multiple sensors, they are read separately. Optionally, at step 306, the controller 290 may determine if the temperature of the steering engine is in an established operational window. For example, that window can be the boxed area in the graph of FIG. 13B in which the response time is 1.0 millisecond or less. Here, the controller 290 considers that as long as the temperature of the steering engine is above 52 degrees Celsius, the steering engine is in an operational state that meets minimal performance requirements.

Outside this temperature range, the controller 290 may output an error message or a "wait" message to the path planning controller to indicate that for the moment no reliable LIDAR data is available. Alternatively, the controller 290 may switch to a LIDAR operational profile that does not require repeated switching operations, in particular transitions that require relaxion transitions. For example, the controller 290 may set the operational state to one where the steering engine acts as a pass through where light beam is projected along the incident direction without deflection. In another example, the controller 290 may instead set the operational state to one in which the steering engine scans over a smaller subregion of the field of view within a given data acquisition frame (thereby requiring fewer switching operations in each frame at a given frame rate). The controller 290 may also or instead decrease the scanning frame rate (thereby increasing the frame period) so that more time is provided to complete the required number of switching operations to scan over the field of view or designated subregion thereof. In this fashion it is possible to obtain some initial read of the scene that may be usable by the path planning controller to initiate the movement of the vehicle. The controller 290 also notifies the path planning controller that the LIDAR operational mode that is being implemented is different from the one requested to make sure the point cloud data is interpreted correctly.

Optionally, at step 308 one or more heating elements may be actuated to raise the temperature of the steering stage(s) of the steering engine. It should be noted that the heating operation can be effected to merely bring the temperature of the steering stages within the operational window or at a higher degree that will provide better switching performance. That is to say, for the example shown in FIG. 13B the heating may continue beyond the 52 degrees Celsius limit to a higher set point where the relaxation time is near an optimal point. For example, by heating the steering engine to a temperature of 75 degrees Celsius or above, the relaxation time in the example shown in FIG. 13B drops to 600 microseconds, while at 52 degrees Celsius it is around 1 millisecond. Accordingly, it may be preferred that the heating step 98 is performed in a way to quickly bring the steering engine within the broad operational range and then the heating may be managed to keep the temperature of the steering engine within a tighter window where the switching times are improved such that they remain below 1 millisecond, preferably below 800 microseconds and even more preferably below 600 microseconds.

At step 310 the controller 290 determines the switching sequence for the various steering stages of the LIDAR apparatus 110 on the basis of the requested operational profile. This step may assume that since the temperature of the steering engine is now in the correct operational range the default or start-up profile has been replaced with the initially requested profile from the path planning controller, for example.

The switching sequence is the state of the various signals driving the polarization selector and the PG (if the PG is operated in the active mode) of each steering stage. The switching sequence determines the angular deflection of the beam projected by the LIDAR apparatus 110 into the scene. For a horizontal and a vertical steering LIDAR apparatus, the angular deflection would be characterized by a horizontal deflection angle and by a vertical deflection angle.

In a specific mode of operation, the switching sequence is determined by the active tiles specified in the operational profile of the LIDAR apparatus 110. That is to say, a particular sub-set of tiles is mapped to a corresponding set of switching commands that are selected such as to restrict the light beam motion to the active tiles only. The switching commands set the state of the polarization selectors and the state of the PGs of the various steering stages to produce beam deflection angles maintaining the beam within the active tiles. In terms of implementation, the correspondence between the active tiles and the switching commands can be encoded in a look-up table. The entry in the table is the combination of active tiles and the table outputs the sequence of switching commands. An example of a high-level structure of such a look up table 320 is shown in FIG. 16.

Figure 16:
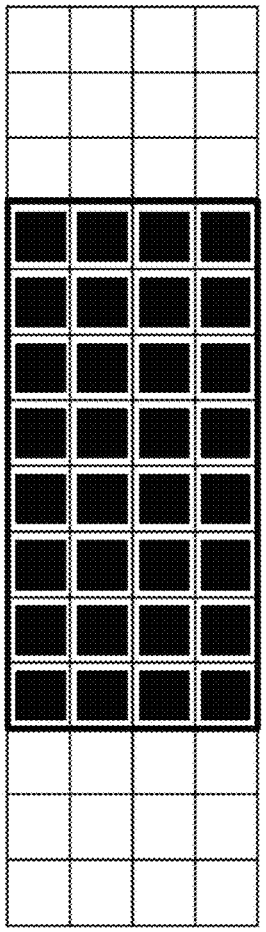
FIG. 16 shows an example of a high-level structure of a look-up table that provides a correspondence between active tiles and switching commands.

The table 320 shown in FIG. 16 holds the list of all the possible sequences of active tiles that may exist in a profile. The first column in the table shows three exemplary sequences, where each sequence identifies active tiles in the grid of the field of view and corresponds to a specific area of the field of view to be scanned. In this example, the three exemplary sequences correspond to the highlighted subregions of tiles shown in FIGS. 12B, 12C and 12D, respectively. For each sequence of active tiles, a corresponding switching commands sequence is pre-calculated. A typical switching command sequence would include a set of polarization selector and/or PG settings for each steering stage. An example of a switching command sequence is shown in the table. That example assumes that the steering engine has two stages (e.g., steering stages 122 and 124 shown in FIG. 3). Also note that the values provided in the cells are arbitrary and they do not produce in practice any particular active tile sequence. The values are merely provided to show the kind of information that may be stored in the table.

| Command # | Steering stage # 2 | | Steering stage # 3 | | Dwell time |
| | Polarization selector (voltage) | PG (voltage) | Polarization selector (voltage) | PG (voltage) | |
| --- | --- | --- | --- | --- | --- |
| 1 | ON | OFF | ON | ON | 50 microseconds |
| 2 | ON | OFF | OFF | OFF | 600 microseconds |
| 3 | OFF | ON | ON | ON | 50 microseconds |

The sequence includes a series of commands, three in the above example, where each command defines the voltages applied to the polarization selector and the voltage applied to the PG of each steering stage, thus defining the deflection imparted to the light beam by that particular steering stage. By cycling the steering engine from one command to the other, the beam walks, step by step over at least a sub-region of the scene. Accordingly, the commands define the motion of the beam such that the beam remains generally in the active tiles. The commands also define the order of the beam steps within the active tiles, namely the scanning pattern within the active tiles.

Note that the switching of the beam from one tile to the other may be done at a constant frequency, that is to say the beam spends the same time in each tile during an FOV scan. Alternatively, the switching can be asynchronous, such that the beam spends more time in selected tiles. The latter approach has the advantage allowing collecting more reflected light from the selected tiles, hence increasing the SNR ratio of the measurements made in that area of the FOV.

When the last command is executed, it may be followed by the first command and so on. In other words, the commands may form an endless loop and run continuously, until a new sequence of tiles is requested.

The dwell time is the time delay between the implementation of each command, in other words it is the time the controller 290 maintains the steering engine 128 in the operational mode determined by the active command before changing the control signals (e.g., voltages) to implement the subsequent command. From the perspective of scanning speed, it would be desirable to cycle through the commands as quickly as possible, however, the transition times of the steering stages need to be taken into account in order to let the PS and/or PG stabilize before switching them again. It should be noted that the dwell times are not always the same from one command to the other. For instance, if the switch to the next command from the current command of the steering engine involves switch on time, the cycling can be faster. However, if the current command involves relaxion time, the dwell time will generally be longer.

Optionally, at step 312 the dwell times for the selected switching sequence may be adapted according to the current temperature of the steering stages of the steering engine. Assume for instance that the LIDAR apparatus 110 is not yet at the optimal temperature, but within the minimal performance temperature window. The dwell times can be adjusted to take into account the increased relaxation times by adding more delay for commands that involve PS and/or PG relaxation. However, as the temperature progressively increases, the dwell time is dynamically adapted to pull delay as the relaxation time of the PS and/or PG decreases. Accordingly, as the temperature increases, the scan speed may also increase up to a point where it stabilizes when the steering engine temperature reaches an optimal temperature.

Figure 17:
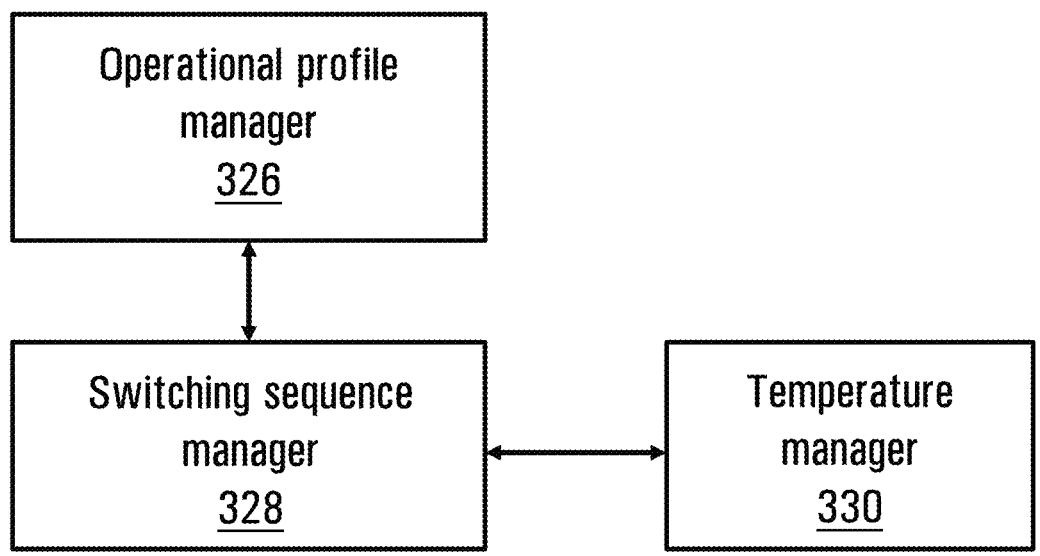
FIG. 17 is a block diagram of the software implementing the functionalities of the controller shown at FIG. 14.

For further clarity, FIG. 17 is a block diagram illustrating an example of functional blocks of the software that may be executed by the controller 290 and which may implement the above functionality. The software has an operational profile manger functional block 326, a switching sequence manager functional block 328 and a temperature manager 330. The operational profile manager 326 may be configured to interpret the specified operational profile of the LIDAR apparatus 110 and may extract the relevant settings such as laser power, and active tiles in the field of view, for example. The switching sequence manger 328 may be configured to determine the switching sequence on the basis of the active tiles and other relevant settings that obtained from the operational profile manager 326. As to the temperature manager 330, it may be configured to control the temperature of the various steering stages of the steering engine and may modulate the switching commands as described above. It should be noted that the logic for performing the above functions, as described above uses look-up tables, but this is not a strict requirement as different implementations are possible. For example, a software model of the steering engine may be provided which takes as an input the active tiles or any other form of characterization of the desired operation of the LIDAR apparatus 110 and outputs switching commands to achieve that operation.

Referring back to the flowchart of FIG. 16, at step 314 the controller 290 thus outputs the steering engine commands as described earlier which may be temperature compensated and also commands to operate the transmitter stage 114, e.g., commands to modulate the light intensity and/or timing of the firing of the laser source 130, and, in some cases, commands to operate the receiver stage 112, e.g., commands to modulate the gain of amplifiers used to amplify outputs of the APDs 134.

Note that for applications that use a first steering stage with a continuous motion optical element, additional settings may be included in the operational profile 278 to control the motion of the optical element.

Figure 18A:
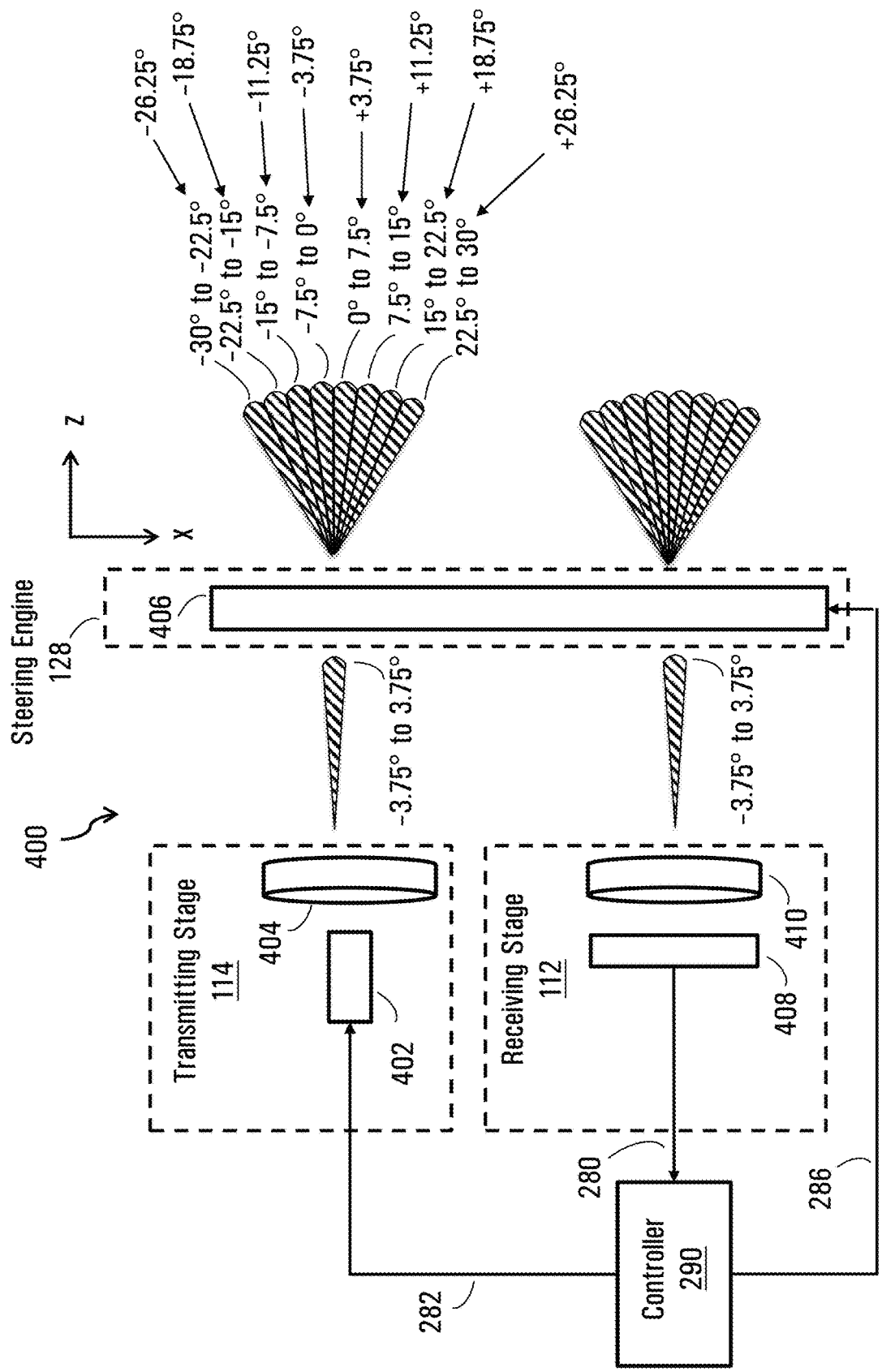
FIG. 18A shows a top down view of an example of a LIDAR apparatus that may be used to implement a segmented FoV represented by the steering angle configurations of FIG. 12B.

FIG. 18A shows a top down view of an example of another LIDAR apparatus 400 with a 2D beam steering engine 128 that may be used to implement a field of view divided in tiles similar to the segmented field of view shown in FIG. 11. A number of components of the LIDAR apparatus 400 have been omitted from the illustration in the interest of clarity. As shown in FIG. 18A, the LIDAR apparatus 400 includes a transmitting stage 114, the beam steering engine 128, a receiving stage 112 and a controller 290. The transmitting stage 114 includes a laser source 402 and associated optics 404, which may be implemented and function similar to the laser source 130 and optics 132 of the transmitting stage 114 of the LIDAR apparatus 110 described earlier. The receiving stage 112 includes an optical receiver 408 and associated optics 410, which may be implemented and function similar to the optical receiver 134 and optics 134 of the receiving stage 114 of the LIDAR apparatus 110 described earlier. For example, the optical receiver 408 may be one using APDs. As shown in FIG. 18A, electrical output 280 of the receiver 408 is directed at the controller 290. The controller 290 also controls the operation of the transmitting stage 114 and the operation of the steering engine 128 such as to synchronize all these components.

The 2D beam steering engine 128 of the LIDAR apparatus 400 includes a multi-stage LCPG beam steering element 406 and the tiles of the segmented field of view implemented by the LIDAR apparatus correspond to the 2D steering angles that are possible using the LCPG beam steering element 406. In particular, in this example each tile of the multi-stage LCPG beam steering element 406 has a nominal FoV of 7.5°×6.0° (Horizontal×Vertical) for a given steering direction or tile and a full FoV of 60°×24° that includes four rows of eight tiles each, for a total of thirty-two 7.5°×6.0° tiles.

As shown in FIG. 18A, the LCPG beam steering element 406 is capable of steering an optical beam from the light source 402 in any of eight horizontal directions that are generally uniformly distributed between −26.25° and +26.25° in 7.5° increments. For example, if, as shown in FIG. 18A, the optical beam from the light source 402 is incident on the LCPG beam steering element 406 at a normal angle relative to the horizontal axis (the x-axis in this example) and has a horizontal extent of 7.5°, then the LCPG beam steering element 406 is capable of steering the optical beam over any of eight segments that are generally uniformly distributed between −30° and 30°. In the corresponding reception path for light reflected off object(s) in the FoV back to the LIDAR apparatus 400, the LCPG beam steering element 406 essentially acts in reverse. In particular, the LCPG beam steering element 406, via the reception optics 410, directs reflected light beams onto optical receiver 408.

Figure 18B:
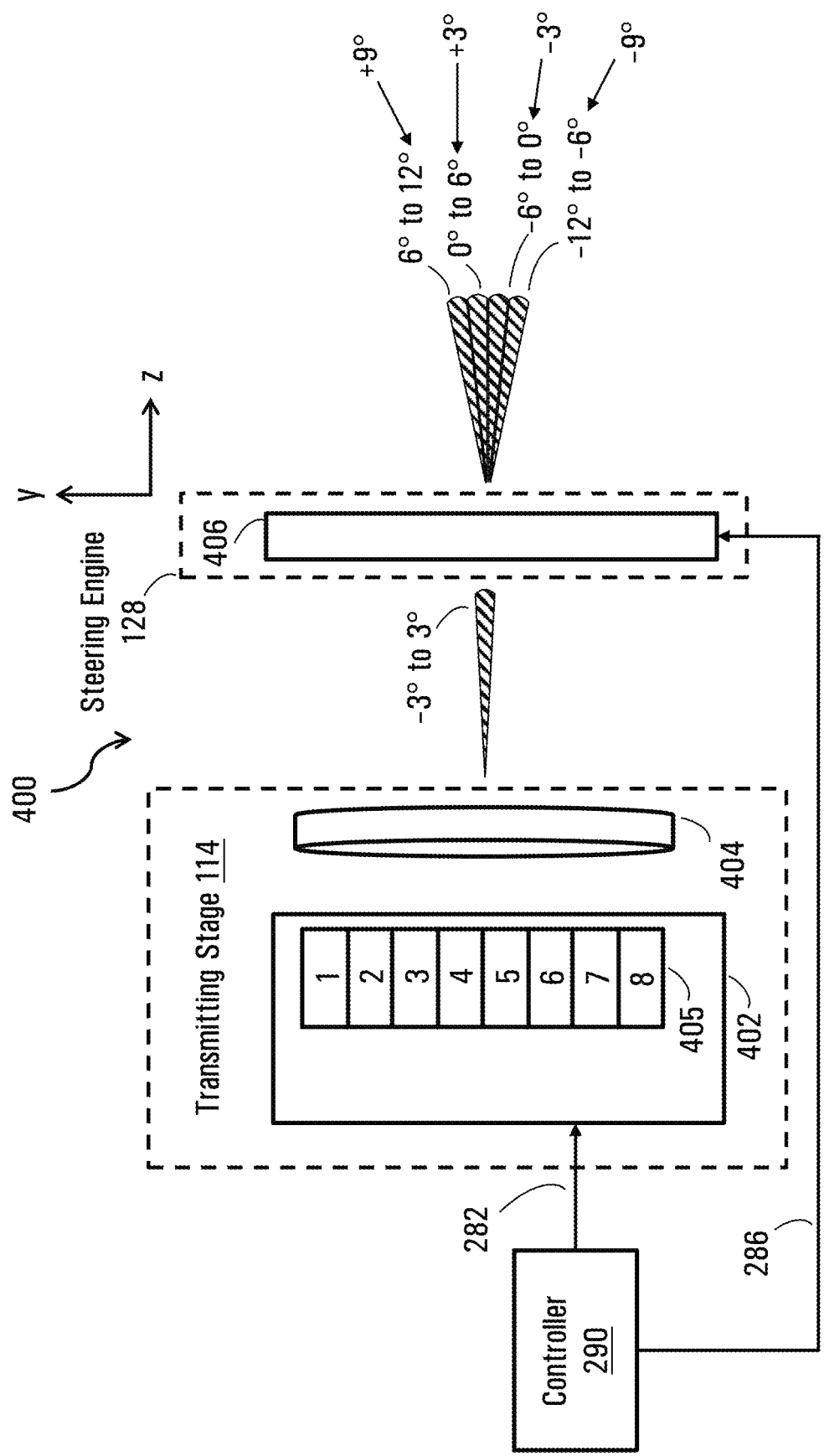
FIG. 18B shows a side on view of the LIDAR apparatus of FIG. 14 showing the vertical steering angles of the segmented FoV represented by the steering angle configurations of FIG. 12B.

FIG. 18B shows a side view of the LIDAR apparatus 400 showing the vertical steering angles that are possible using the LCPG beam steering element 406 to steer light beams in the vertical direction. In this example, the light source 402 includes an 8-channel laser light source 405. The eight channels of the 8-channel laser light source 405 may be fired in pairs, as discussed in further detail below with reference to FIG. 19. In FIG. 18B, the vertical distribution of the vertical steering angles imparted by the LCPG beam steering element 1806 in the vertical direction is shown for one of the eight channels of the eight-channel laser light source 405. In this example, the light beam from the eight-channel laser light source 405 is incident on the LCPG beam steering element 406 at a normal angle relative to the vertical axis (the y-axis in this example) and has a vertical extent of 6°. As shown in FIG. 18B, the LCPG beam steering element 406 is capable of steering the optical beam over any of four segments that are generally uniformly vertically distributed between −12° and 12° at steering angles corresponding to −9°, −3°, +3° and +9° relative to the incoming light beam's direction of propagation in the vertical direction. It is noted that in this example, the light beam's incoming direction of propagation in the vertical direction is 0° because the light beam is incident on LCPG beam steering element at a normal angle.

Figure 19:
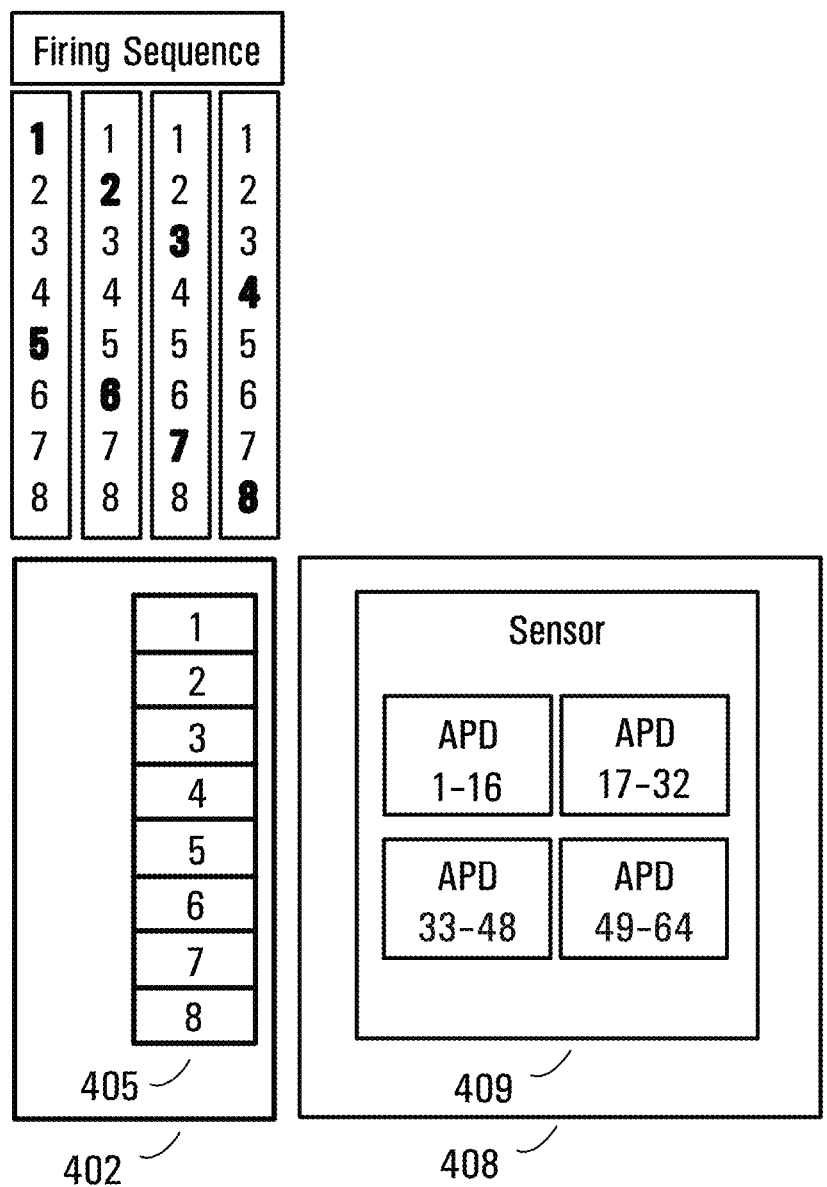
FIG. 19 shows an example of the firing sequence for the light source and the configuration of the sensor unit of the LIDAR system of FIGS. 18A and 18B.

In the LIDAR apparatus 400 two of the laser channels may be activated or "fired" at the same time, such that optical impulses from alternating pairs of laser channels are transmitted according to a particular firing sequence. In such embodiments, the optical receiver 408 may be implemented by an array of APDs arranged in a 2×32 array configuration, whereby each of the two sets of 1×32 APDs measures one horizontal segment of the segmented FoV for one of the two lasers fired at a given time. FIG. 19 shows an example of such a firing sequence for the 8-channel laser light source 405 and the corresponding configuration of a sensor unit 409 of the optical receiver 408. In particular, in this example, the firing sequence is such that the following pairs of laser channels are fired together: 1 and 5, 2 and 6, 3 and 7, 4 and 8. Other variations are possible and are contemplated within the scope of the present disclosure. In this configuration, laser channels 1-4 optically correspond to the top 1×32

APDs of the sensor unit 409 and laser channels 5-8 optically correspond to the bottom 1×32 APDs of the sensor unit 409. Here it is noted that by utilizing 32 APDs to measure each of eight generally uniform horizontal segments across a horizontal FoV that spans substantially 60°, the resulting generally uniform horizontal resolution is approximately 0.23°.

FIGS. 20A, 20B and 20C show a field of view of the LIDAR apparatus 400 divided into selectable tiles resulting from the 2D beam steering angles that are possible using the multi-stage LCPG beam steering element 406. In particular, FIGS. 20A, 20B and 20C show examples of a light beam being steered to different selectable tiles within the segmented field of view of the LIDAR apparatus 400. In FIG. 20A, the LCPG beam steering element 406 is controlled by controller 290 to steer the light beam from laser source 402 to tile 3 within the field of view, which in this case corresponds to a deflection of +9° vertically and −11.25° horizontally relative to the original direction of propagation of the light beam. In contrast, FIGS. 20B and 20C show two other steering angle configurations of the LCPG beam steering element 406 in which the controller 290 has configured the LCPG beam steering element 406 to steer the light beam from laser source 402 to tile 5 and tile 31, respectively. In this example tile 5 corresponds to a deflection of +9° vertically and +3.75° horizontally and tile 31 corresponds to a deflection of −9° vertically and +18.75° horizontally.

As noted above, in this example the LCPG beam steering element 406 has a nominal FoV of 7.5°×6.0° (Horizontal× Vertical) for a given steering direction or tile and a full FoV of 60°×24° that includes four rows of eight tiles each, for a total of thirty-two 7.5°×6.0° tiles. It is further noted that these dimensions generally correspond to the center 8×4 tiles of the LCPG 200 shown in FIG. 10. As such, in one implementation the LCPG 200 shown in FIG. 10 may be used to implement the LCPG beam steering element 406 and the controller 290 may control the LCPG 200 according to the steering angle configuration shown in FIG. 12E in order to utilize the center 8×4 tiles for horizontal and vertical steering over the 60°×24° central subregion of the full 120°×24° FoV.

Figure 21A:
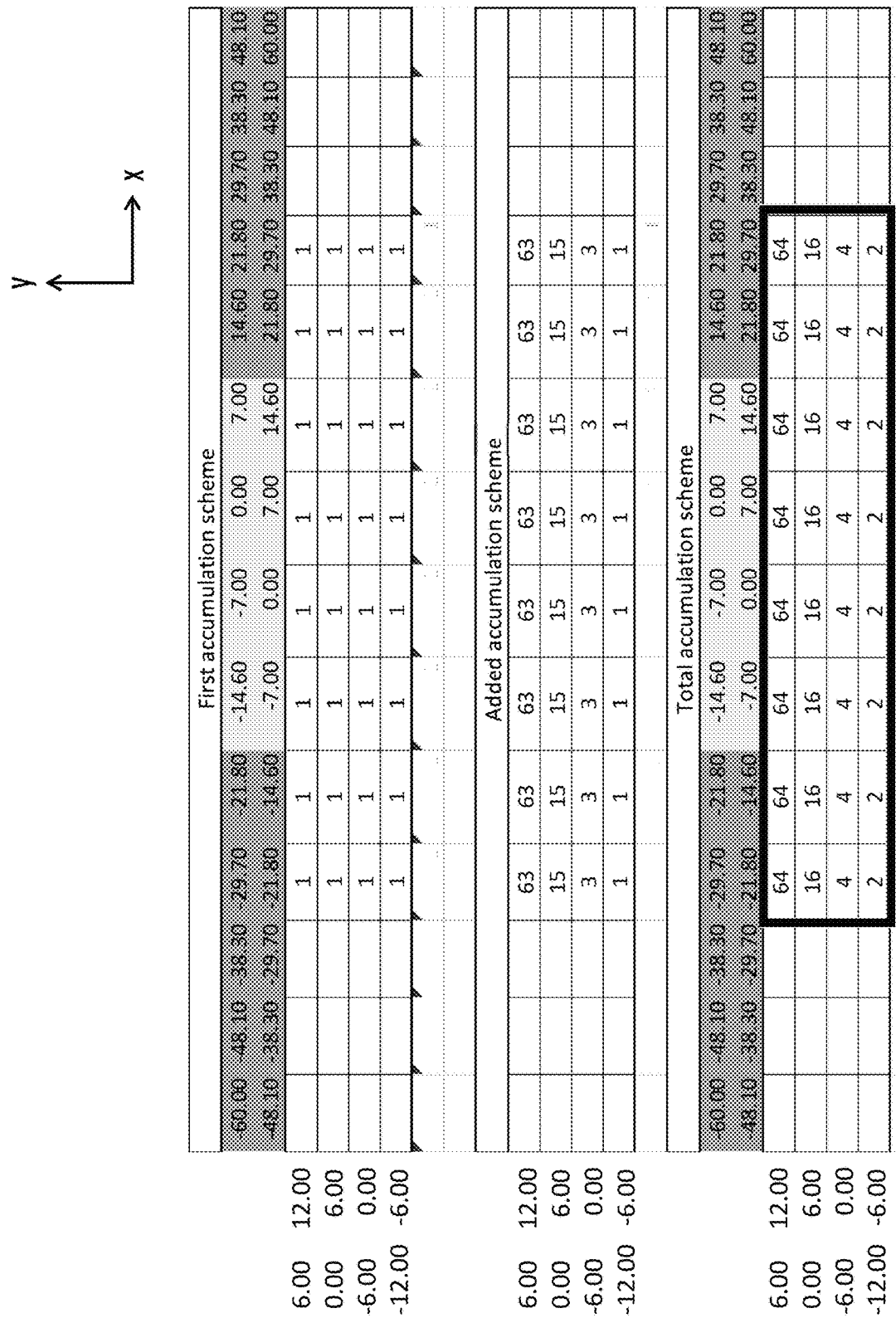
FIG. 21A shows an example of an accumulation strategy for the segments of the segmented FoV represented by the steering angle configurations of FIG. 10B.

FIG. 21A shows an example of an accumulation strategy for the segments of the segmented 60°×24° FoV represented by the steering angle configurations of the LCPG beam steering device 406 of the LIDAR apparatus 400 for a scenario in which the LCPG beam steering device 406 is implemented by the multi-stage LCPG element 200 shown in FIG. 10 and operated according to the steering angle configuration shown in FIG. 12E. In this example, the analysis starts with a single accumulation in each active tile. Additional acquisitions may then be done in active tiles with potentially more accumulations being done in tiles within specific regions of interest. In this example, more accumulations are performed in the top row of tiles, with progressively fewer accumulations in each subsequent row of tiles. The accumulation strategy shown in FIG. 21A takes into account the fast turn-on transitions and slow relaxation transitions of the LCPG element 200. In particular, the exemplary accumulation strategy is based on the parameters shown in the following table.

|  | Units |  |
| --- | --- | --- |
| Acquisition frequency, 8 lasers, 64 APD channels | kHz | 100 |
| Acquisition period duration | msec | 0.01 |
| LIDAR framerate | Hz | 20 |

|  | Units |  |
| --- | --- | --- |
| LIDAR period | msec | 50 |
| Number of acquisition periods in LIDAR period | # | 5000 |
| LCPG Number of tiles, Horizontal | # | 8 |
| LCPG Number of tiles, Vertical | # | 4 |
| LCPG Number of tiles, Total | # | 32 |
| Fast cycles, first accumulation | # | 20 |
| Slow cycles, first accumulation | # | 12 |
| Fast cycles, transition duration | msec | 0.1 |
| Slow cycles, relaxation transition duration | msec | 1.4 |
| Fast cycles, skipped acquisitions for first accumulation | # | 200 |
| Slow cycles, skipped acquisitions for first accumulation | # | 1680 |
| Total number of acquisition periods skipped | # | 1880 |
| Remaining number of available acquisition periods | # | 3120 |
| Oversampling | # | 4 |
| Total accumulations, sum of all active tiles | # | 780 |
| Accumulations in base configuration | # | 32 |
| Extra accumulations to be added in tiles | # | 748 |
| Accumulations added in tiles 5-10 | # | 504 |
| Accumulations added in tiles 19-24 | # | 120 |
| Accumulations added in tiles 33-38 | # | 24 |
| Accumulations added in tiles 47-52 | # | 8 |
| Number of added accumulations (sum of central tile box) | # | 656 |
| Remaining cycles, for framerate | # | 92 |
| Total acquisition duration | msec | 46.32 |
| Maximum framerate | Hz | 21.59 |

As noted in the above table, in this example the acquisition frequency at which the controller 290 acquires measurements from the optical receiver 408 is 100 kHz, which corresponds to an acquisition period duration of 0.01 millisecond. In this example, the LIDAR frame rate, i.e., the rate at which the controller 290 generates a frame of point cloud data for a scene, is 20 Hz, which corresponds to a LIDAR frame period duration of 50 milliseconds. As such, in this example there are 5000 acquisition periods in each LIDAR frame period. To steer to each of the 32 tiles in the 8×4 tile configuration requires 32 transitions. In this example, 20 of the transitions are fast turn-on transitions and 12 of the transitions are slow relaxation transitions. In this example, it is assumed that the LCPG element 200 is operated at a temperature of 32 degrees Celsius. As shown in FIG. 13B, at an operating temperature of 32 degrees Celsius the relaxation time of the LCPG element 200 is 1.4 millisecond. The fast turn-on transitions duration of the LCPG element 200 is 0.1 millisecond. Thus, a total of 2 milliseconds is required for the 20 fast turn-on transitions during the first accumulation for each of the 32 tiles, which corresponds to a total of 200 acquisition periods that must be skipped during the 20 fast turn-on transitions for the first accumulation. The 12 slow relaxation transitions that each last 1.4 millisecond require a total of 16.8 milliseconds, which corresponds to a total of 1680 acquisition periods that must be skipped during the 12 slow relaxation transitions for the first accumulation of the 32 tiles. This means that in each LIDAR frame period there are 1880 acquisition periods that must be skipped to accommodate the transition periods required to steer across the 32 tiles, which leaves 3120 acquisition periods remaining for acquisitions within the LIDAR frame period. In this example the accumulations are done at 4 times oversampling, which means that the 3120 acquisition periods corresponds to 780 accumulations. The first accumulation across the 32 tiles utilizes 32 of the 780 available accumulations, which leaves 748 accumulations available to be allocated across the 32 active tiles.

As noted earlier, in this example the 748 remaining accumulations are allocated such that more accumulations are performed in the top row of tiles, with progressively fewer accumulations in each subsequent row of tiles. In particular, as shown in FIG. 21A, 656 of the 748 remaining accumulations are allocated across the 32 active tiles such that 63 additional accumulations are allocated to each of the active tiles in the top row, 15 additional accumulation are allocated to each of the eight active tiles in the second row, 3 additional accumulation are allocated to each of the eight active tiles in the third row, and 1 additional accumulation is allocated to each of the eight active tiles in the fourth row. The leaves 92 accumulation periods remaining, which collectively have a total duration of 3.68 milliseconds, which means the total acquisition duration occupies 46.32 milliseconds of the 50 millisecond LIDAR frame period at a LIDAR frame rate of 20 Hz. As such, the LIDAR frame rate could potentially be raised to a maximum of 21.59 Hz so that the LIDAR frame period is reduced to equal the 46.32 millisecond acquisition duration.

Figure 21B:
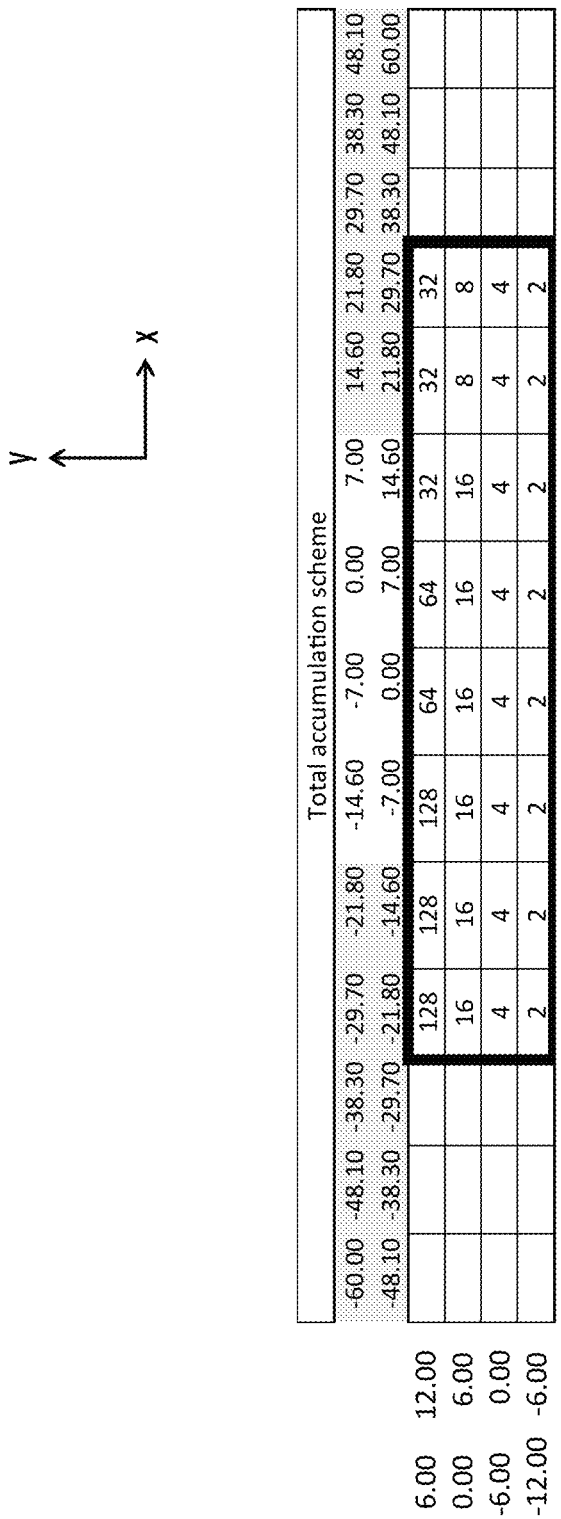
FIG. 21B shows an example of another accumulation strategy for the segments of the segmented FoV with unequal accumulations along the horizontal direction.

In the example shown in FIG. 21A, there are an equal number of accumulations in the horizontal direction of each row of tiles. However, in some cases, accumulations across the horizontal axis could be changed, e.g., to favor the front direction of a vehicle if the LIDAR apparatus faces outward from one side of the vehicle, by performing more accumulations in the horizontal direction towards the front of the vehicle. For example, FIG. 21B shows an example of another accumulation strategy for the segments of the segmented FoV with unequal accumulations along the horizontal direction.

The uneven accumulation scheme across the FOV has the effect of varying the SNR ratio across the FOV. An increase in the number of accumulations has the effect of reducing noise since distance measurements made based on a larger number of accumulations have a higher SNR ratio, hence they tend to be more precise. A high SNR ratio is useful for long distance measurements. Accordingly, by attributing non-uniformly the available accumulations in a LIDAR frame, it is possible to tailor the SNR ratio to the scene topology. For instance, by attributing more accumulations to the tiles that are located at the upper end of the FOV, which is the area of the FOV where the LIDAR sees the horizon (longer distances), those distance measurements can be more precise. In contrast, the lower tiles that tend to see objects on the road that are nearer, do not require a higher SNR since the optical returns tend to be stronger and are more immune to noise. Note that the accumulation attribution scheme does not need to be static but can dynamically vary depending on what the LIDAR sees and the objects of interest in the scene. For example, it is possible to dynamically adapt the accumulation scheme to track an object that is at a certain distance and where a high SNR would be desirable to obtain a reliable and precise distance measurement to the object. Such an arrangement could work in the following fashion. Once object detection is performed on the LIDAR frame alone or in combination with the output of another sensor, such as an image sensor, a relevant object in the scene is identified. That relevant object may be a car, a pedestrian, a cyclist, etc. If a distance to the object is significant, which is such that the SNR ratio is below an optimal threshold, a dynamic re-allocation of the accumulations is performed which includes identifying the tile or more generally the area of the scene where the object resides and allocating more accumulations in that area of the scene at the expense of other areas of the scene, where no relevant objects are detected or the objects are nearer and inherently the SNR ratio of the signal is high. In terms of implementation, when the system logic designates an area in the scene where a higher SNR ration measurements are required, the accumulation scheme is re-computed to allocate more accumulations in that area of the scene but reduce the number of accumulations in other areas such that the total number of available accumulations in not exceeded.

In the example LIDAR apparatus 400 shown in FIGS. 18A and 18B, emission and reception functions utilize the same LCPG beam steering device 406. However, other configurations of the optical emission and reception paths are possible and are contemplated within the scope of the present disclosure.

Figure 22A:
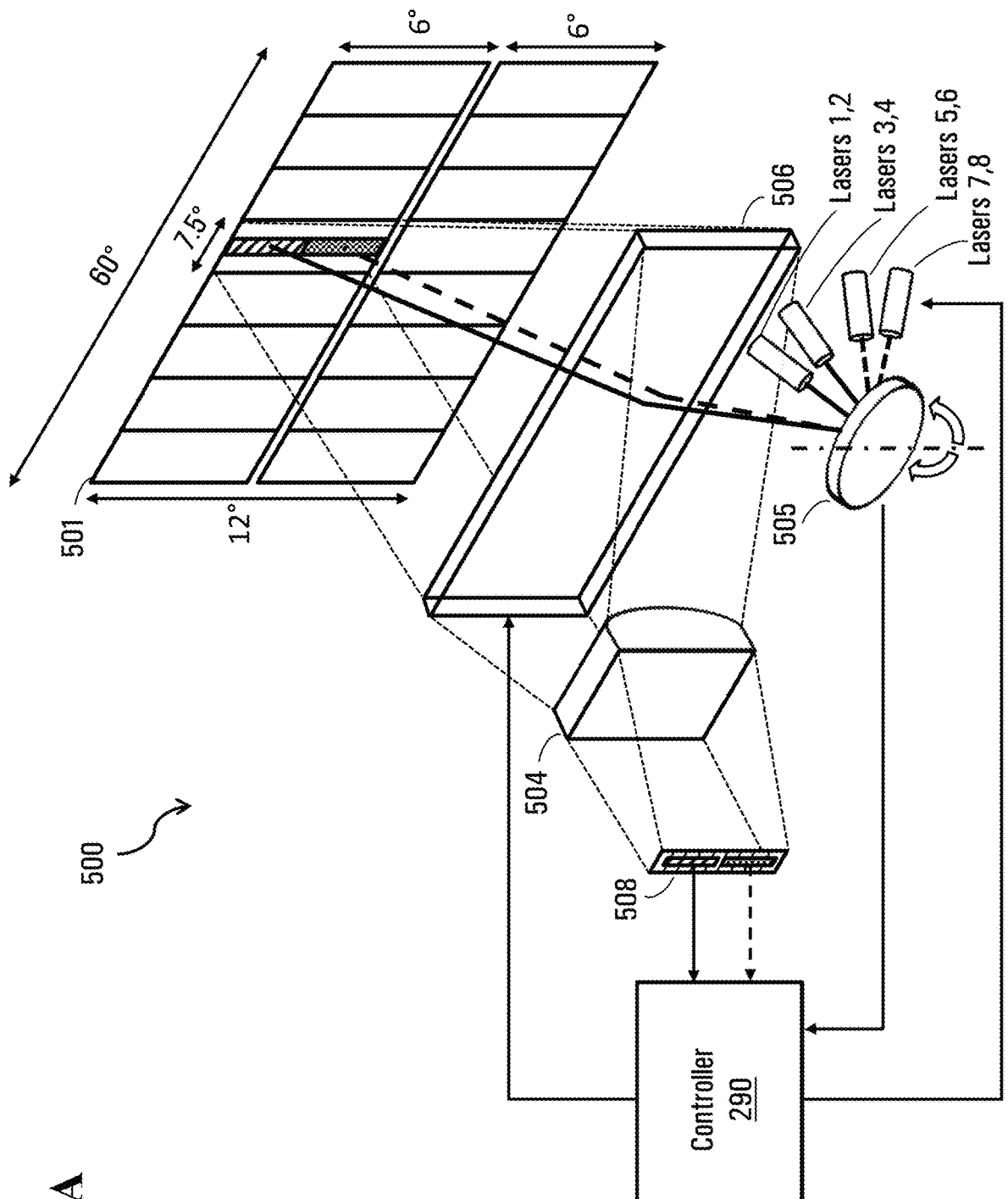
FIG. 22A shows a more detailed example implementation of the LIDAR apparatus shown in FIG. 5B.

FIG. 22A shows another example of a LIDAR apparatus 500 with a 2D beam steering engine that may be used to implement a field of view 501 divided in tiles similar to the segmented field of view shown in FIG. 11. A number of components of the LIDAR apparatus 500 have been omitted from the illustration in the interest of clarity. As shown in FIG. 22A, the LIDAR apparatus 500 includes a controller 290, a transmitting stage that includes eight lasers, a multistage beam steering engine that includes a one-dimensional (1D) resonant MEMS mirror 505 and a 2D LCPG beam steering element 506, and a receiving stage that includes an optical receiver 508 and associated optics 504. The optical receiver 508 may be one using APDs. As shown in FIG. 22A, electrical outputs of the receiver 508 are directed at the controller 290. The controller 290 also controls the operation of the eight lasers of the transmitting stage and the operation of the 1D resonant MEMS mirror 505 and the 2D beam steering LCPG element 506 such as to synchronize all these components.

It is noted that the LIDAR apparatus 500 has a structure similar to that of the LIDAR apparatus shown in FIG. 5C in which the transmitting stage 114 and the receiving stage 112 utilize a multi-stage beam steering engine 128 includes a first steering stage 120 for the transmitting stage 114 that is implemented with a continuous motion optical element.

The tiles of the segmented field of view implemented by the LIDAR apparatus 500 correspond to the 2D steering angles that are possible using the 2D LCPG beam steering element 506. In particular, in this example each tile of the multi-stage LCPG beam steering element 506 has a nominal FoV of 7.5°×6.0° (Horizontal×Vertical) for a given steering direction or tile and a full FoV of 60°×12° that includes two rows of eight tiles each, for a total of sixteen 7.5°×6.0° tiles.

As noted above, the optical receiver 508 may be implemented with APDs. For example, the optical receiver 508 may include an 2×32 APD sensor unit that is used as a pair of 1×32 APD sensor blocks. In this example, the 6° vertical dimension of each tile in the field of emission is separated into two areas, each 3° and the eight lasers, the 1D resonant MEMS mirror 505 and 2D LCPG beam steering element 506 are arranged such that laser light from lasers 1-4 optically correspond to the top 1×32 APDs of the optical receiver 508 and laser light from lasers 5-8 optically correspond to the bottom 1×32 APDs of the optical receiver 508.

In the LIDAR apparatus 500, four of the eight lasers 1-8 may be fired at the same time. For example, the firing sequence may be such that lasers 1, 3, 5 and 7 are fired together and lasers 2, 4, 6 and 8 are fired together. In such embodiments, if the optical receiver 508 is implemented by an array of APDs arranged in a 2×32 array configuration as described above, then each of the two sets of 1×32 APDs measures one horizontal segment of the segmented FoV for one pair of the four lasers fired at a given time. Other variations are possible and are contemplated within the scope of the present disclosure. In this configuration, lasers 1-4 optically correspond to the top 1×32 APDs of the optical receiver 508 and lasers 5-8 optically correspond to the bottom 1×32 APDs of the optical receiver 508.

The 1D resonant MEMS mirror 505 is configured to oscillate about an axis. The 1D resonant MEMS mirror 505, the eight lasers and the 2D LCPG beam steering element 506 are positioned and controlled via the controller 290 such that laser light from the eight lasers that is incident upon and reflected by the oscillating 1D resonant MEMS mirror 505 is swept back and forth over a horizontal range such that, when the 2D LCPG beam steering element 506 is steered to any given tile in the FoV, the motion of the 1D resonant MEMS mirror about its axis sweeps the reflected laser light back and forth over the 7.5° horizontal width of the tile in the FoV. In this way, coarse-scanning over the FoV is done using the 2D LCPG beam steering element 506 and horizontal fine-scanning within a given tile is done using the sweeping movement of the 1D resonant MEMS mirror 505.

Figure 23A:
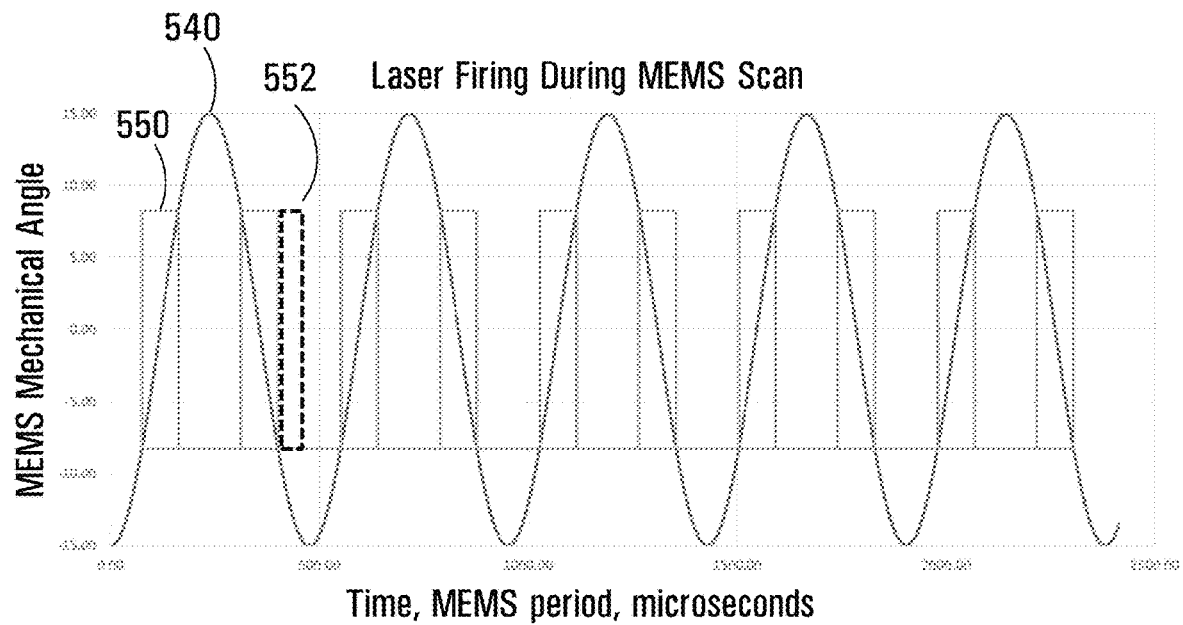
FIG. 23A is a timing diagram for the apparatuses of FIGS. 22A and 22B, showing acquisition times, MEMS mechanical angles and a fast up-voltage transition time of the LCPG beam steering element(s).
Figure 23B:
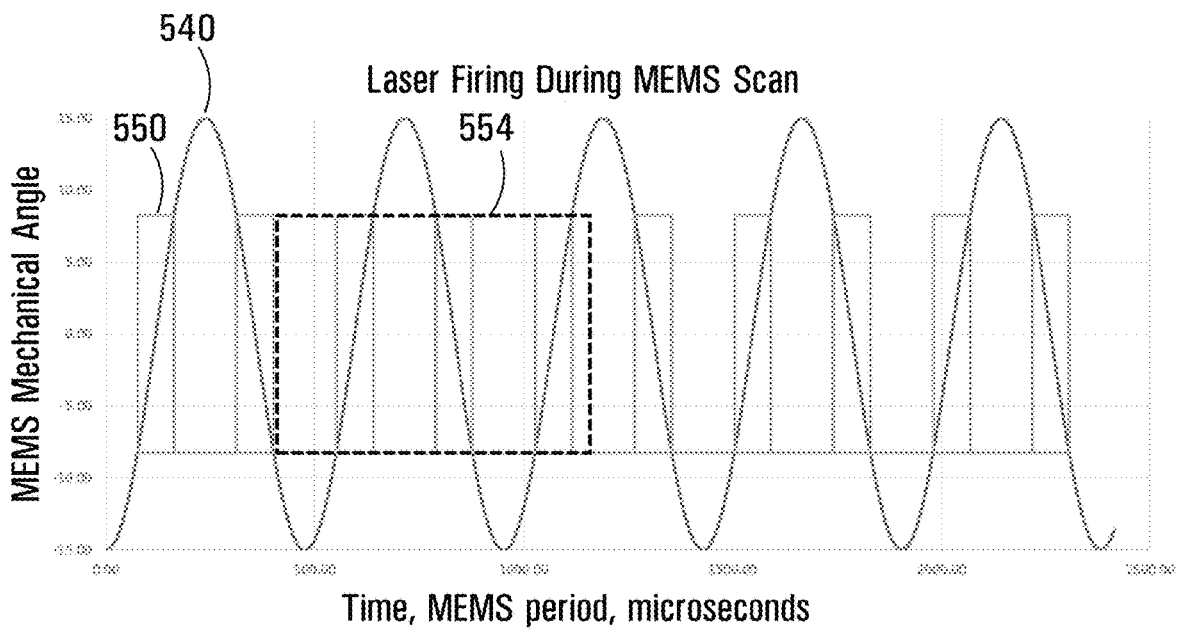
FIG. 23B is a timing diagram for the apparatuses of FIGS. 22A and 22B, showing acquisition times, MEMS mechanical angles and a slow relaxation transition time of the LCPG beam steering element(s).
Figure 23C:
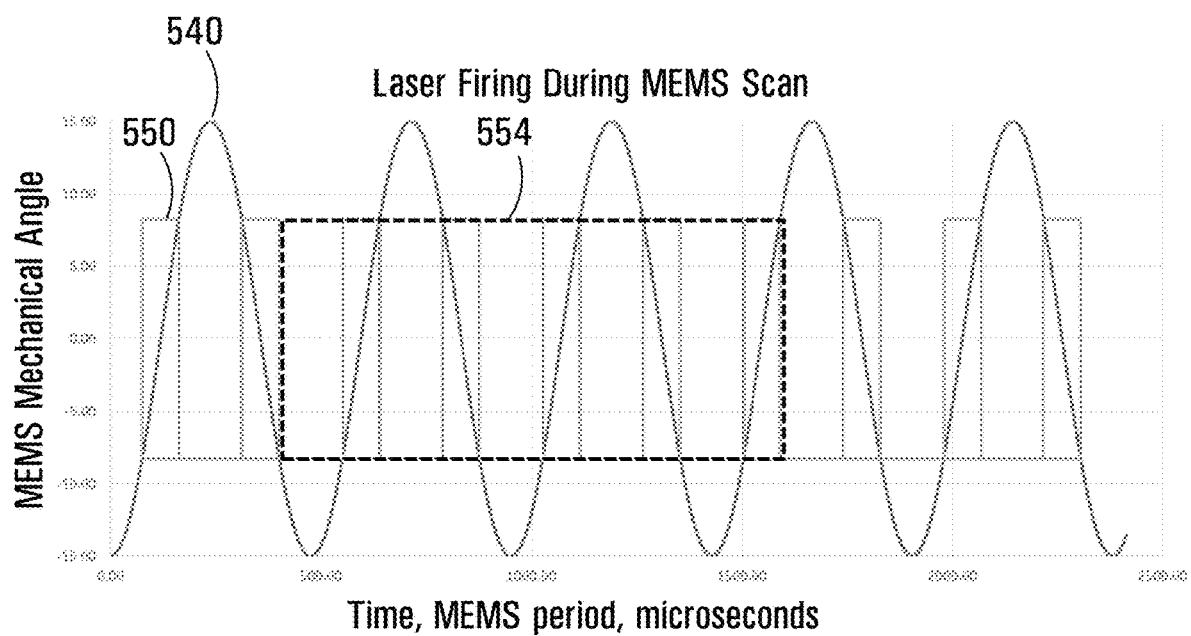
FIG. 23C is a timing diagram for the apparatuses of FIGS. 22A and 22B, showing acquisition times, MEMS mechanical angles and an even slower relaxation transition time of the LCPG beam steering element(s).

FIGS. 23A-23C are timing diagrams showing the relative timing of the changing mechanical angle 540 of the 1D resonant MEMS mirror 505 and the time intervals 550 in which the lasers 1-8 are fired. It is noted that in this example the 1D resonant MEMS mirror 505 is resonant with ±15° mechanical tilt and the beam steering engine is configured with a 0.22× reduction factor, which means that the lasers are fired during the period in which the 1D resonant MEMS mirror 505 is between ±8.3° of its mechanical tilt range. In this example, it is assumed that the 2D LCPG beam steering element 506 is operated in a temperature range in which it has a fast up-voltage transition time of 50 microseconds, which is indicated by the dashed box outline identified at 552 in FIG. 23A, and a slow relaxation transition time of 750 microseconds. With reference to the plot of relaxation time vs temperature shown in FIG. 13B, in order to have a relaxation transition time of 750 microseconds or less, the 2D LCPG beam steering element 506 may be operated at a temperature of 60°±5° Celsius. The fast up-voltage transition time of 50 microseconds is short enough to occur entirely between the laser firing periods indicated by the boxes 550 in FIG. 23A, which means that a change in the steering angle of the 2D LCPG beam steering element 506 that involves a fast up-voltage transition does not delay the next acquisition period of the LIDAR apparatus 500. However, as shown in FIG. 23B, a slow relaxation transition time of 750 microseconds, which is indicated at 554 in FIG. 23B, delays the next acquisition by 1.5 MEMS cycles, because valid acquisitions cannot be made during the transition time of the 2D LCPG beam steering element 506. As discussed earlier with reference to FIG. 13B, in general as the temperature of an LCPG drops, the relaxation time increases. For example, if the 2D LCPG beam steering element 506 is operated at a lower temperature, e.g., 32° Celsius, such that its relaxation transition time increase to 1.4 milliseconds, which is indicated at 554 in FIG. 23C, the longer relaxation transition time would delay the next acquisition by 2.5 MEMS cycles. The delays between acquisitions caused by the slow relaxation times of the 2D LCPG beam steering element 506 limit the number of acquisitions that are possible within a LIDAR frame period at a given frame rate.

As noted above, in this example the LCPG beam steering element 506 has a nominal FoV of 7.5°×6.0° (Horizontal× Vertical) for a given steering direction or tile and a full FoV of 60°×12° that includes two rows of eight tiles each, for a total of sixteen 7.5°×6.0° tiles. It is further noted that these dimensions generally correspond to the center 8×2 tiles of the LCPG 200 shown in FIG. 10. As such, in one implementation the 2D LCPG 200 shown in FIG. 10 may be used to implement the LCPG beam steering element 506 and the controller 290 may control the LCPG 200 according to the steering angle configuration shown in FIG. 12D in order to utilize the center 8×2 tiles for horizontal and vertical steering over the 60°×12° central subregion of the full 120°×24° FoV.

Figure 24A:
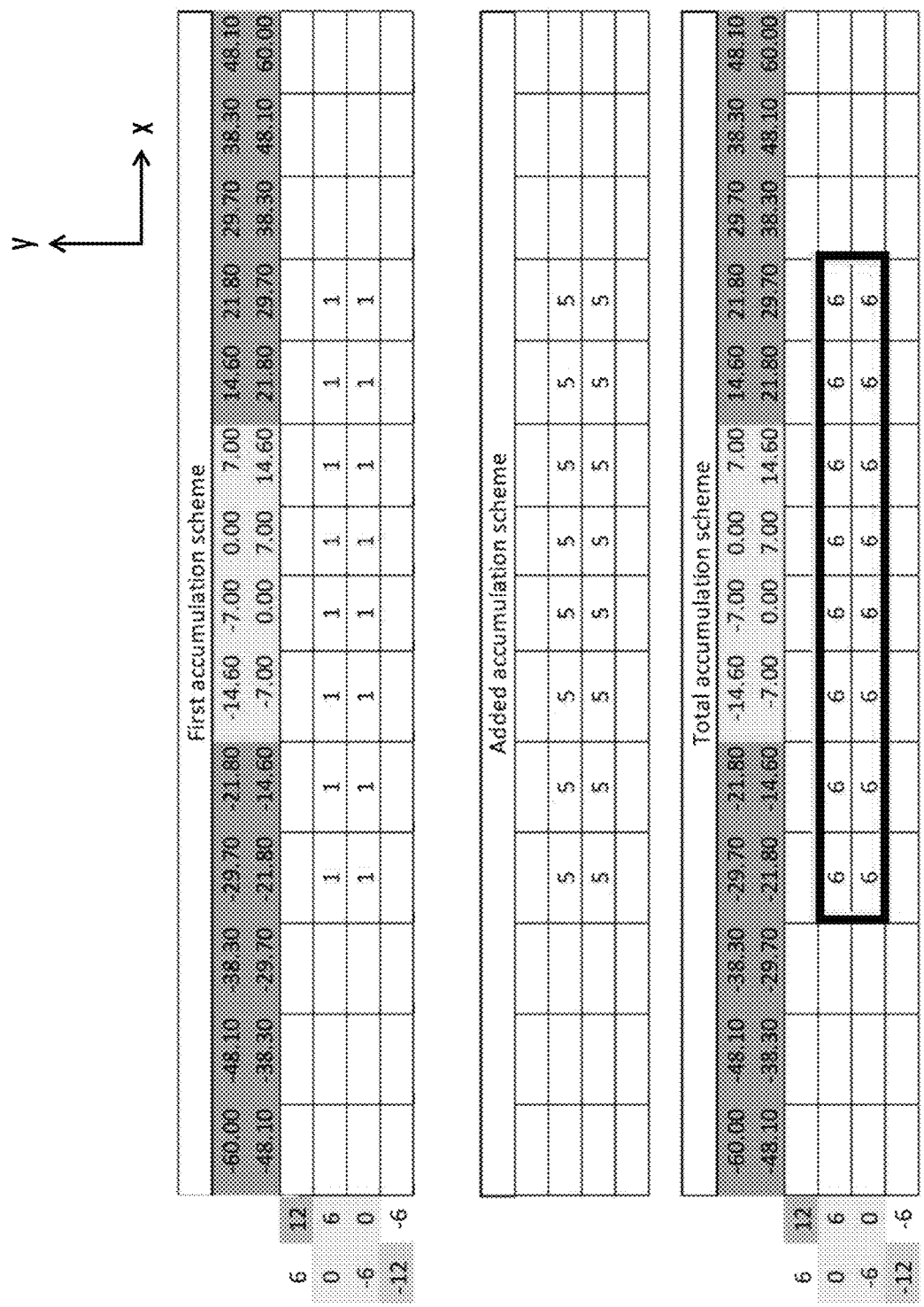
FIG. 24A shows an example of an accumulation strategy for the segments of the segmented FoV implemented by the LIDAR apparatus of FIGS. 22A and 22B.

FIG. 24A shows an example of an accumulation strategy for the segments of the segmented 60°×12° FoV represented by the steering angle configurations of the LCPG beam steering element 506 of the LIDAR apparatus 500 for a scenario in which the LCPG beam steering element 506 is implemented by the multi-stage LCPG element 200 shown in FIG. 10 and operated according to the steering angle configuration shown in FIG. 12D. In this example, the analysis starts with a single accumulation in each active tile. Additional acquisitions may then be done in active tiles with potentially more accumulations being done in tiles within specific regions of interest. The accumulation strategy shown in FIG. 24A takes into account the fast turn-on transitions and slow relaxation transitions of the LCPG element 506 shown in FIGS. 23A and 23B. In particular, the exemplary accumulation strategy is based on the parameters shown in the following table.

|  | Units |  |
| --- | --- | --- |
| MEMS frequency | Hz | 2100 |
| MEMS period | msec | 0.476 |
| LIDAR framerate | Hz | 20 |
| LIDAR period | msec | 50 |
| MEMS Cycles in LIDAR period | # | 105 |
| LCPG Number of tiles, Horizontal | # | 8 |
| LCPG Number of tiles, Vertical | # | 2 |
| LCPG Number of tiles, Total | # | 16 |
| Fast cycles, first accumulation | # | 10 |
| Slow cycles, first accumulation | # | 6 |
| Fast cycles, skipped MEMS cycles for first accumulation | # | 0 |
| Slow cycles, skipped MEMS cycles for first accumulation | # | 1.5 |
| Total number of MEMS cycles, for 1 accumulation | # | 25 |
| Remaining available MEMS cycles in LIDAR period | # | 80 |
| Average of additional accumulations per tile | # | 5 |
| Total number of added accumulations | # | 80 |
| Remaining cycles, for framerate | # | 0 |
| Effective number of MEMS cycles used | # | 105 |
| Maximum framerate, MEMS only | Hz | 20.00 |

As noted in the above table, in this example the frequency at which the 1D resonant MEMS mirror oscillates is 2100 Hz, which corresponds to a MEMS period duration of 0.476 millisecond. In this example, the LIDAR frame rate, i.e., the rate at which the controller 290 generates a frame of point cloud data for a scene, is 20 Hz, which corresponds to a LIDAR frame period duration of 50 milliseconds. As such, in this example there are 105 MEMS cycles in each LIDAR frame period. To steer to each of the 16 tiles in the 8×2 tile configuration requires 16 transitions. In this example, 10 of the transitions are fast turn-on transitions and 6 of the transitions are slow relaxation transitions. In this example, it is assumed that the LCPG element 506 is operated at a temperature, e.g., 60 degrees Celsius, at which it has fast up-voltage transition time of 50 microseconds and a slow relaxation transition time of 750 microseconds, which means that acquisitions during 1.5 MEMS cycles are skipped at each of the six slow relaxation transitions required for the first accumulation over the 16 active tiles. Thus, a total of 25 MEMS cycles are required for the first accumulation, which leaves 80 available MEMS cycles for additional accumulations within the LIDAR frame period. In this example the 80 remaining available accumulations are allocated equally among the 16 active tiles such that 5 additional accumulations are allocated to each of the 16 active tiles.

If the slow relaxation transition time of the LCPG element 506 is longer, e.g., if the LCPG element 506 is operated at 32 degrees Celsius rather than 60 degrees Celsius, the number of additional accumulations after the first accumulation in each of the 16 tiles may decrease. For example, the following table indicates that, if the slow relaxation time is increased to 1.4 milliseconds from 750 microseconds, the remaining available MEMS cycles for accumulations after the first accumulation decreases from 80 to 64. For example, if the 64 remaining additional accumulations are allocated equally among the 16 active tiles, that would represent a decrease of one additional accumulation in each active tile (i.e., a decrease from 5 additional accumulations in each of the 16 active tiles to 4 additional accumulations in each of the 16 active tiles).

|  | | Units | |
|---|---|---|---|
| MEMS frequency | | Hz | 2100 |
| MEMS period | | msec | 0.476 |
| LIDAR framerate | | Hz | 20 |
| LIDAR period | | msec | 50 |
| MEMS Cycles in LIDAR period | | # | 105 |
| LCPG Number of tiles, Horizontal | | # | 8 |
| LCPG Number of tiles, Vertical | | # | 2 |
| LCPG Number of tiles, Total | | # | 16 |
| Fast cycles, first accumulation | | # | 10 |
| Slow cycles, first accumulation | | # | 6 |
| Fast cycles, skipped MEMS cycles for first accumulation | | # | 0 |
| Slow cycles, skipped MEMS cycles for first accumulation | | # | 2.5 |
| Total number of MEMS cycles, for 1 accumulation | | # | 41 |
| Remaining available MEMS cycles in LIDAR period | | # | 64 |
| Average of additional accumulations per tile | | # | 4 |
| Total number of added accumulations | | # | 64 |
| Remaining cycles, for framerate | | # | 0 |
| Effective number of MEMS cycles used | | # | 105 |
| Maximum framerate, MEMS only | | Hz | 20.00 |

In some cases, if the controller 290 determines that the LCPG beam steering element 506 is initially operating at 32 degrees Celsius, the controller 290 may initially configure the LIDAR apparatus 500 to operate in accordance with the accumulation strategy indicated in the above table, and may also initiate one or more heating elements to heat the LCPG beam steering element 506 to a more optimal temperature range, e.g., to 60 degrees Celsius or higher. Once the controller determines that the target optimal temperature range of the LCPG beam steering element 506 has been achieved, it may adapt the LIDAR apparatus 500 to operate in accordance with the accumulation strategy shown in FIG. 24A, for example, in which the effective detection range of the LIDAR apparatus 500 may be increased due to the additional accumulation in each active tile.

Figure 24B:
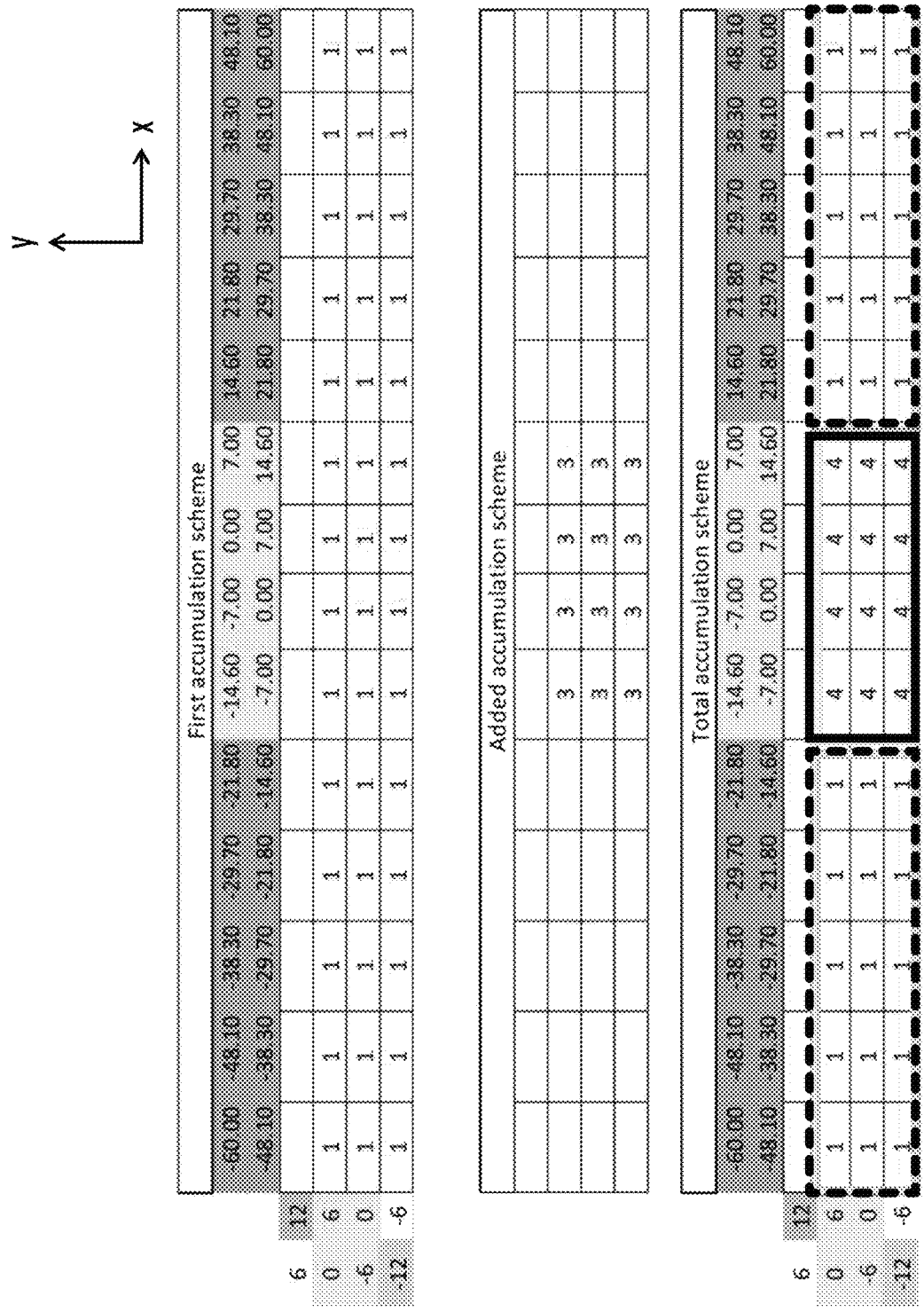
FIG. 24B shows an example of an accumulation strategy for segments of a segmented FoV represented by the steering angle configuration of FIG. 12C.
Figure 24C:
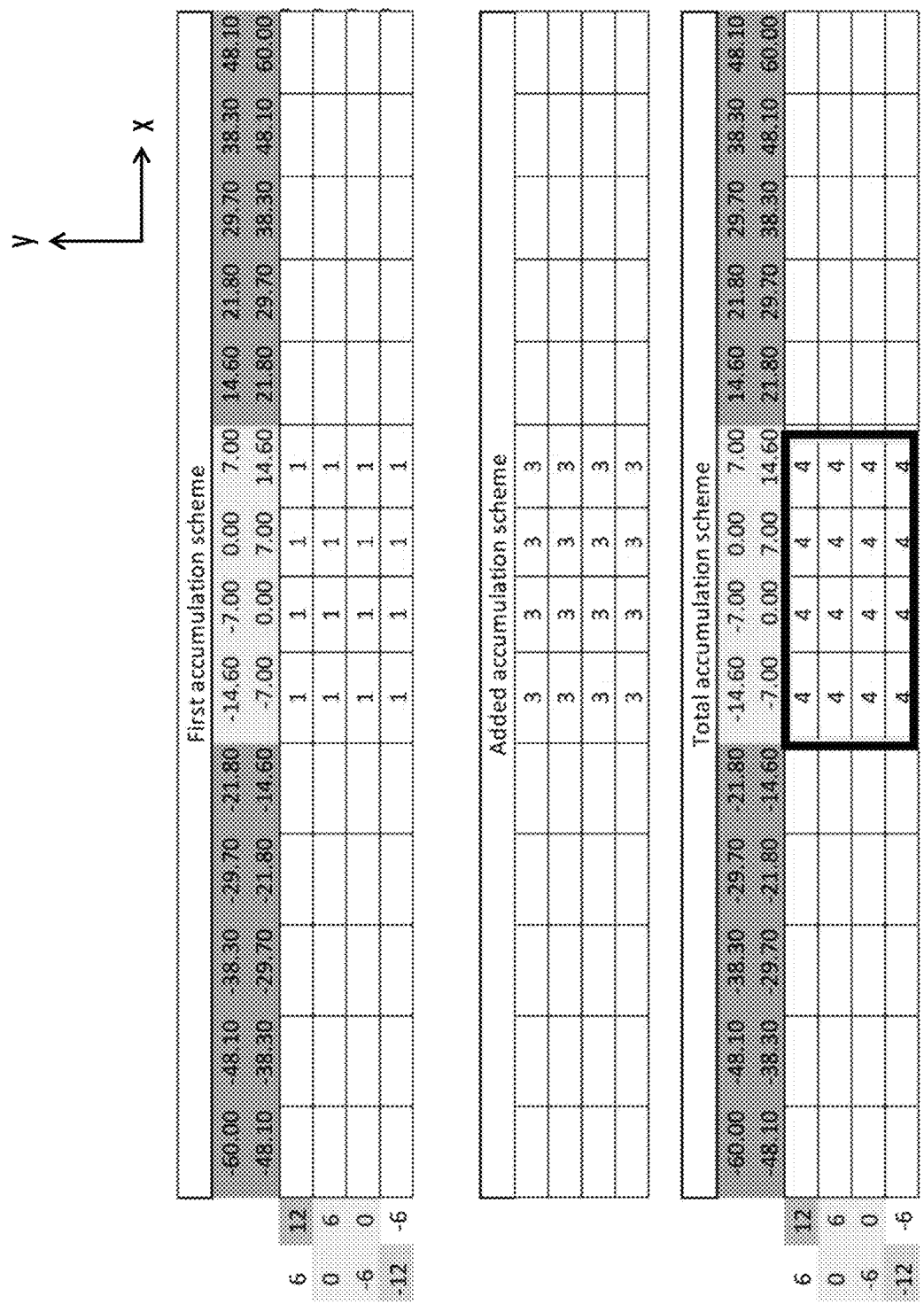
FIG. 24C shows an example of an accumulation strategy for segments of a segmented FoV represented by the steering angle configuration of FIG. 12E.
Figure 24D:
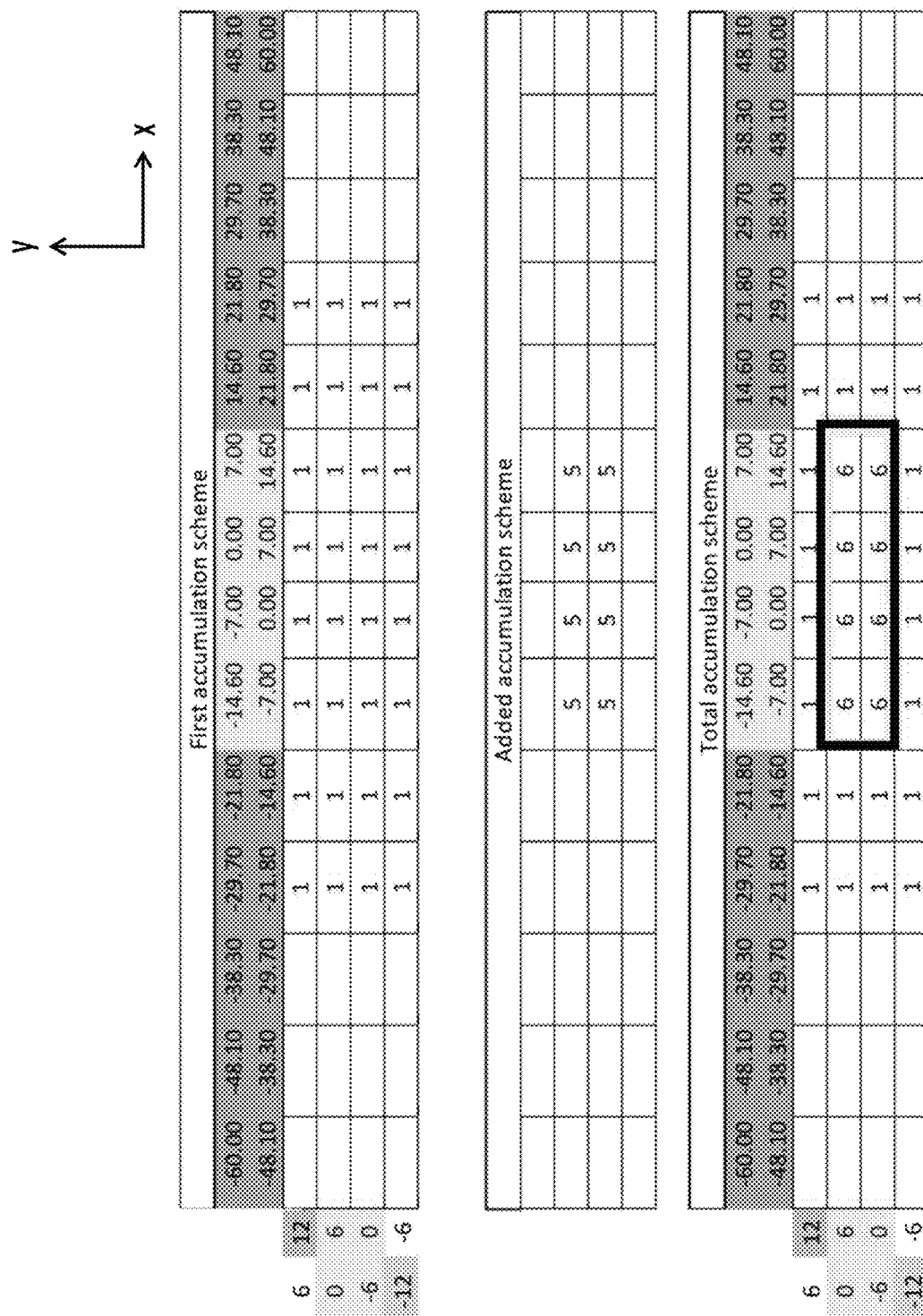
FIG. 24D shows an example of an accumulation strategy for segments of a segmented FoV represented by the steering angle configuration of FIG. 12D.

FIGS. 24B to 24D show examples of accumulation strategies for implementations in which the LCPG beam steering element 506 is implemented by the multi-stage LCPG element 200 shown in FIG. 10 and operated according to the various steering angle configuration shown in FIGS. 12C-12E.

With reference to FIG. 24B, it is noted that this Figure shows an example of an accumulation strategy for the segments of the segmented 120°×18° FoV represented by the steering angle configurations of the LCPG beam steering element 506 of the LIDAR apparatus 500 for a scenario in which the LCPG beam steering element 506 is implemented by the multi-stage LCPG element 200 shown in FIG. 10 and operated according to the steering angle configuration shown in FIG. 12C. In this example, the analysis starts with a single accumulation in each of the 42 (14×3) active tiles and additional acquisitions are then done in active tiles within a region of interest that includes the central 12 (3×4) active tiles. The exemplary accumulation strategy shown in FIG. 24B is based on the parameters shown in the following table.

|  | | Units | |
|---|---|---|---|
| MEMS frequency | | Hz | 2100 |
| MEMS period | | msec | 0.476 |
| LIDAR framerate | | Hz | 20 |
| LIDAR period | | msec | 50 |
| MEMS Cycles in LIDAR period | | # | 105 |
| LCPG Number of tiles, Horizontal | | # | 14 |
| LCPG Number of tiles, Vertical | | # | 3 |
| LCPG Number of tiles, Total | | # | 42 |
| Fast cycles, first accumulation | | # | 27 |
| Slow cycles, first accumulation | | # | 15 |
| Fast cycles, skipped MEMS cycles for first accumulation | | # | 0 |
| Slow cycles, skipped MEMS cycles for first accumulation | | # | 1.5 |
| Total number of MEMS cycles, for 1 accumulation | | # | 64.5 |
| Remaining available MEMS cycles in LIDAR period | | # | 40.5 |
| Average of additional accumulations per tile | | # | 3 |
| Total number of added accumulations (sum of additional accumulations in central ROI) | | # | 36 |
| Remaining cycles, for framerate | | # | 4.5 |
| Effective number of MEMS cycles used | | # | 100.5 |
| Maximum framerate, MEMS only | | Hz | 20.9 |

Here it is noted that if the additional accumulations in the central 4×3 tile ROI are not made, such that only one accumulation is obtained in each of the 42 active tiles in the 120°×18° FoV, the LIDAR frame rate can be increased to 32.56 Hz such that the LIDAR frame period duration is shortened to 30.7 milliseconds, which is the time required for the 64.5 MEMS cycles required for one accumulation across the 42 active tiles.

With reference to FIG. 24C, it is noted that this Figure shows an example of an accumulation strategy for the segments of the segmented 30°×24° FoV represented by the steering angle configurations of the LPG beam steering element 506 of the LIDAR apparatus 500 for a scenario in which the LCPG beam steering element 506 is implemented by the multi-stage LPG element 200 shown in FIG. 10 and operated according to the steering angle configuration shown in FIG. 12E. In this example, the analysis starts with a single accumulation in each of the 16 (44) active tiles and additional acquisitions are then done in each of the 16 active tiles. The exemplary accumulation strategy shown in FIG. 24C is based on the parameters shown in the following table. It is noted that in the previous two examples the LIDAR frame rate was assumed to be 20 Hz, while in this example a higher LIDAR frame rate of 25 Hz is assumed.

|  | | Units | |
|---|---|---|---|
| MEMS frequency | | Hz | 2100 |
| MEMS period | | msec | 0.476 |
| LIDAR framerate | | Hz | 25 |
| LIDAR period | | msec | 40 |
| MEMS Cycles in LIDAR period | | # | 84 |
| LCPG Number of tiles, Horizontal | | # | 4 |
| LCPG Number of tiles, Vertical | | # | 4 |

-continued

|  | Units |  |
|---|---|---|
| LCPG Number of tiles, Total | # | 16 |
| Fast cycles, first accumulation | # | 10 |
| Slow cycles, first accumulation | # | 6 |
| Fast cycles, skipped MEMS cycles for first accumulation | # | 0 |
| Slow cycles, skipped MEMS cycles for first accumulation | # | 1.5 |
| Total number of MEMS cycles, for 1 accumulation | # | 25 |
| Remaining available MEMS cycles in LIDAR period | # | 59 |
| Average of additional accumulations per tile | # | 3 |
| Total number of added accumulations (sum of additional accumulations in central ROI) | # | 48 |
| Remaining cycles, for framerate | # | 11 |
| Effective number of MEMS cycles used | # | 73 |
| Maximum framerate, MEMS only | Hz | 28.77 |

Here it is noted that if the three additional accumulations in each of the 16 active tiles are not made, such that only one accumulation is obtained in each of the 16 active tiles, the LIDAR frame rate could be increased to 84.03 Hz such that the LIDAR frame period duration is shortened to 11.9 milliseconds, which is the time required for the 25 MEMS cycles required for one accumulation across the 16 active tiles.

With reference to FIG. 24D, it is noted that this Figure shows an example of an accumulation strategy for the segments of the segmented 60°×24° FoV represented by the steering angle configurations of the LCPG beam steering element 506 of the LIDAR apparatus 500 for a scenario in which the LCPG beam steering element 506 is implemented by the multi-stage LCPG element 200 shown in FIG. 10 and operated according to the steering angle configuration shown in FIG. 12D. In this example, the analysis starts with a single accumulation in each of the 32 (8×4) active tiles and additional acquisitions are then done in active tiles within a region of interest that in this example includes the central 8 (2×4) active tiles. The exemplary accumulation strategy shown in FIG. 24D is based on the parameters shown in the following table.

|  | Units |  |
|---|---|---|
| MEMS frequency | Hz | 2100 |
| MEMS period | msec | 0.476 |
| LIDAR framerate | Hz | 20 |
| LIDAR period | msec | 50 |
| MEMS Cycles in LIDAR period | # | 105 |
| LCPG Number of tiles, Horizontal | # | 8 |
| LCPG Number of tiles, Vertical | # | 4 |
| LCPG Number of tiles, Total | # | 32 |
| Fast cycles, first accumulation | # | 20 |
| Slow cycles, first accumulation | # | 12 |
| Fast cycles, skipped MEMS cycles for first accumulation | # | 0 |
| Slow cycles, skipped MEMS cycles for first accumulation | # | 1.5 |
| Total number of MEMS cycles, for 1 accumulation | # | 50 |
| Remaining available MEMS cycles in LIDAR period | # | 55 |
| Average of additional accumulations per tile in ROI | # | 5 |
| Total number of added accumulations (sum of additional accumulations in central ROI) | # | 40 |
| Remaining cycles, for framerate | # | 15 |
| Effective number of MEMS cycles used | # | 90 |
| Maximum framerate, MEMS only | Hz | 23.34 |

Here it is noted that if the five additional accumulations in each of the 8 active tiles in the region of interest are not made, such that only one accumulation is obtained in each of the 32 active tiles, the LIDAR frame rate could be increased to 42.01 Hz such that the LIDAR frame period duration is shortened to 23.8 milliseconds, which is the time required for the 50 MEMS cycles required for one accumulation across the 32 active tiles.

In some embodiments the scanning pattern of the LCPG beam steering element 506, which is determined by steering commands delivered to the LCPG beam steering element 506 by the controller 290, may be changed such that the size and/or location of the region of interest within the active tiles is/are changed. For example, such a change may be based on one or more external inputs that the controller 290 receives, such as perception information from a perception engine, path information from a path computation engine, camera image data from one or more cameras and/or radar data from one or more radar systems.

Figure 25A:
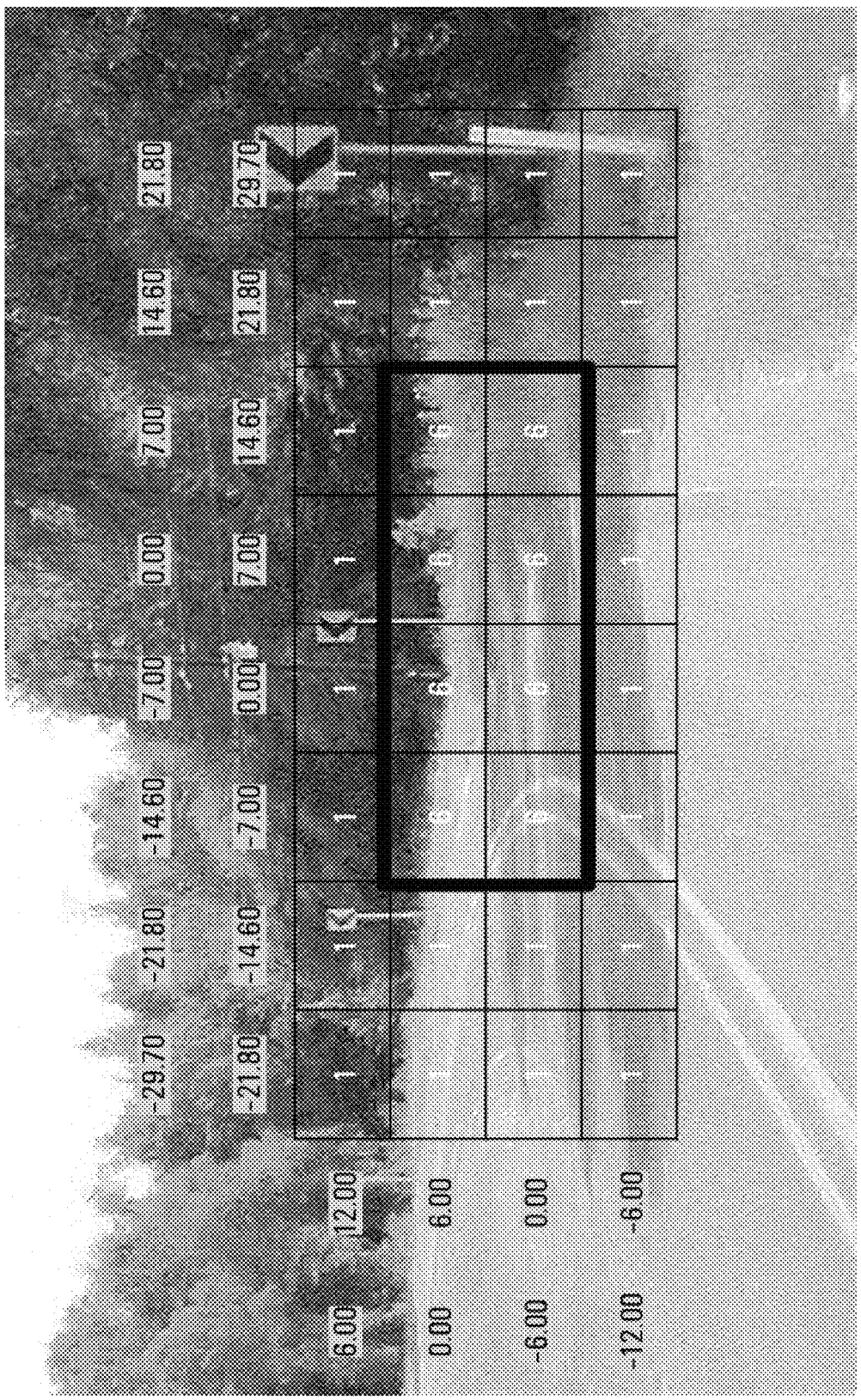
FIGS. 25A and 25B show an example of a change in a region of interest within a segmented FoV.
Figure 25B:
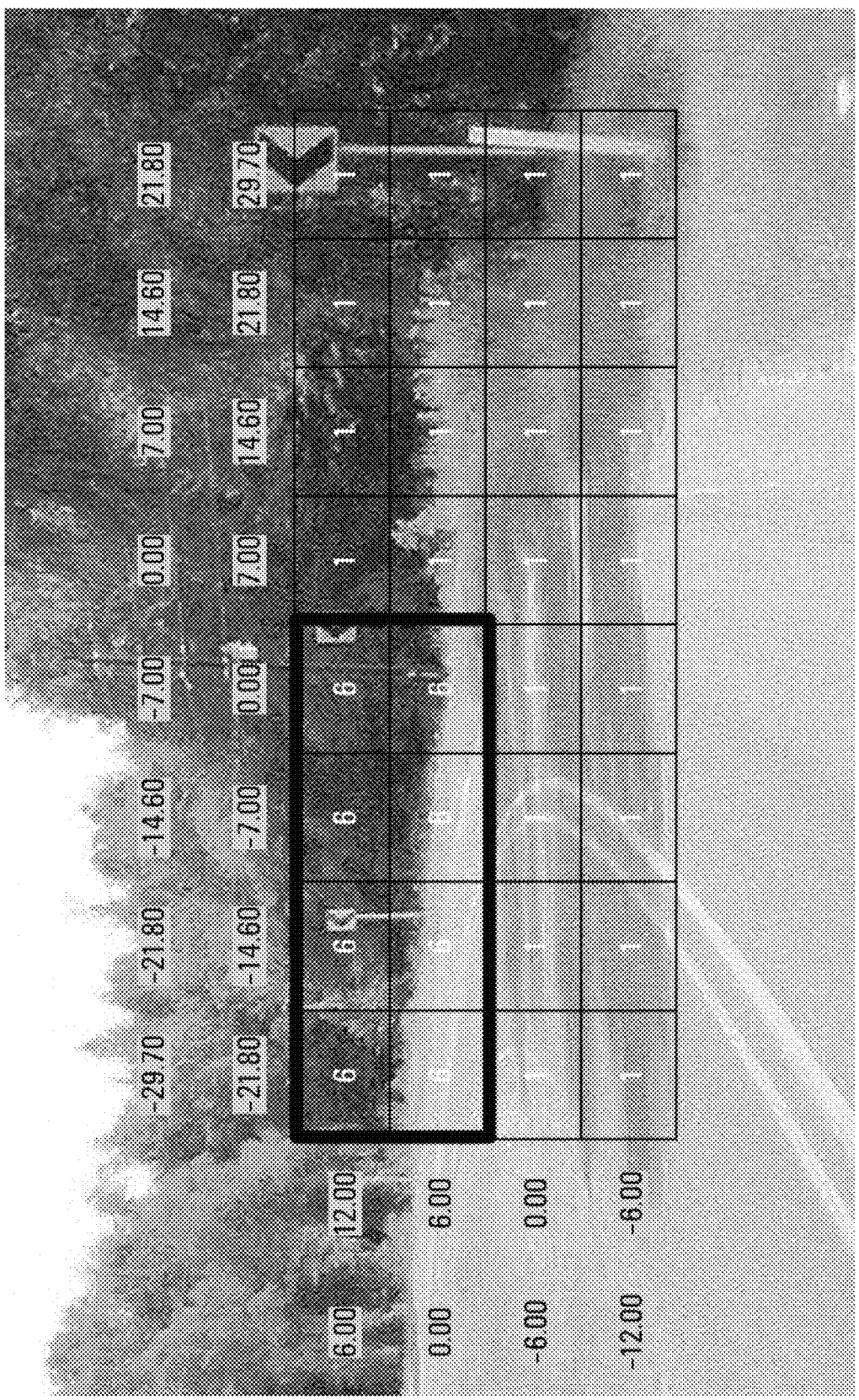

For example, FIGS. 25A and 25B show an example of a change in a region of interest within a segmented 60°×24° FoV represented by the steering angle configurations of the LCPG beam steering element 506 of the LIDAR apparatus 500 for a scenario in which the LCPG beam steering element 506 is implemented by the multi-stage LCPG element 200 shown in FIG. 10 and operated according to the steering angle configuration shown in FIG. 12D. In this example, the scene being scanned by the LIDAR apparatus 500 includes a curved roadway. It is noted that for illustrative purposes FIGS. 24A and 24B show the segmented 60°×24° FoV of the LIDAR apparatus 500 overlaid on an image of the curved roadway. In reality, when the tiles in the FoV are projected onto the surfaces of the scene, their shapes would be distorted by the shape(s) and orientation(s) of the surface(s) that they are projected onto within the scene. However, this distortion of the tiles in the FoV is not shown in the Figures for the sake of simplicity. In FIG. 25A, the segmented 60°×24° FoV includes a centrally located region of interest that includes 2×4 active tiles in which five additional accumulations are performed in each tile. As discussed previously, the additional accumulations within the region of interest may improve the signal to noise ratio within that region and therefore can potentially increase the detection range witching that region. In FIG. 25B, the region of interest has been changed to a different set of 2×4 active tiles within the segmented 60°×24° FoV. In particular, the region of interest now includes the 2×4 active tiles in the upper left quadrant of the segmented 60°×24° FoV, which in this case means the region of interest is now directed further down the curved roadway. For example, this change in the location of the region of interest may have been effected by the controller 290 based on perception information related to detection of the curve in the roadway and/or detection and classification of the roadway signs indicating that the roadway curves ahead. In addition, or instead, the change may have been triggered by path information indicating that the path computation engine has plotted a curved path for a vehicle carrying the LIDAR apparatus 500.

Figure 22B:
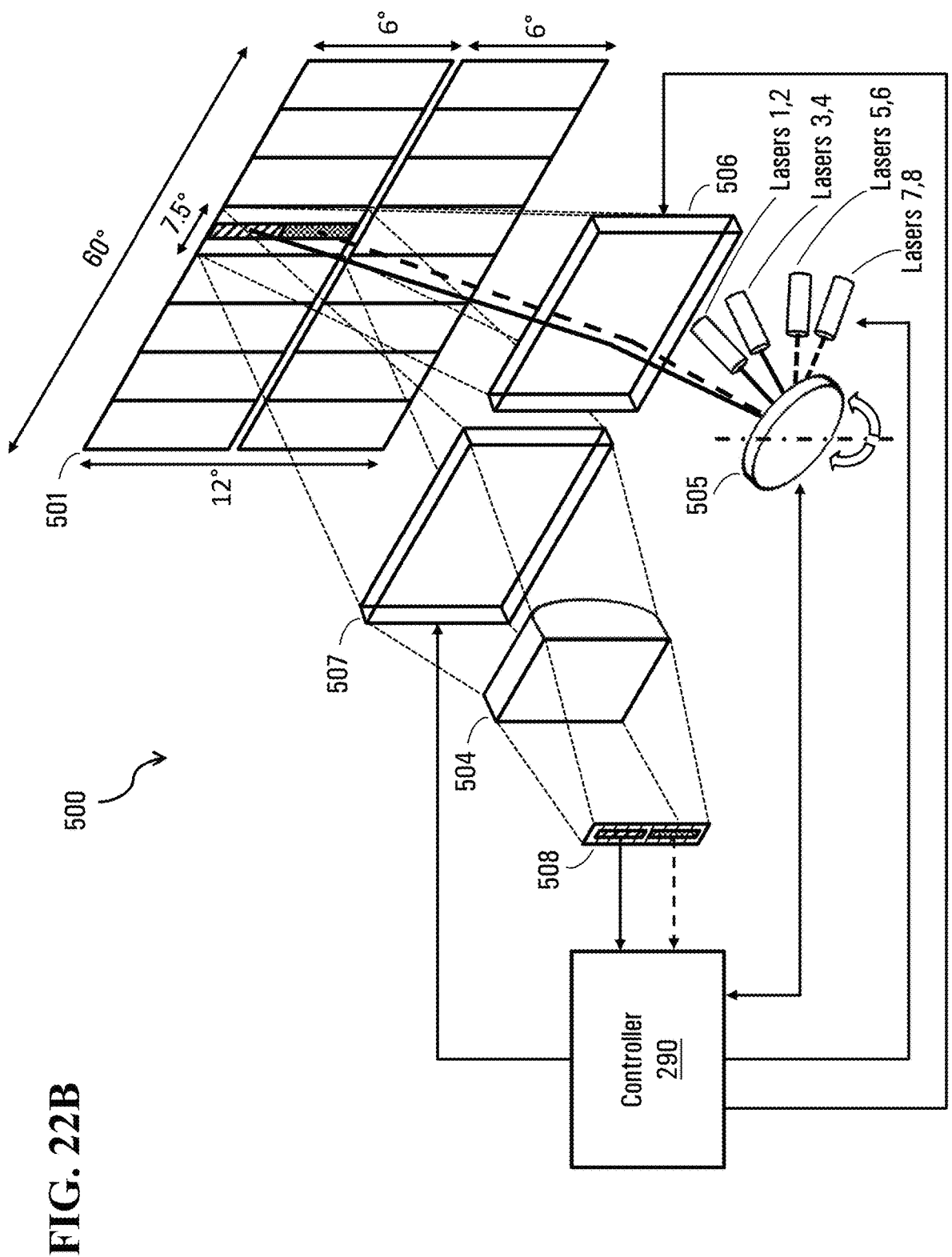
FIG. 22B shows a more detailed example implementation of the LIDAR apparatus shown in FIG. 5C.

In the example LIDAR apparatus 500 shown in FIG. 22A, emission and reception functions utilize the same 2D LCPG beam steering element 506. However, other configurations of the optical emission and reception paths are possible and are contemplated within the scope of the present disclosure. For example, FIG. 22B shows an alternative implementation of the LIDAR apparatus 500 in which coarse-scanning for the emission and reception functions is done using separate 2D LCPG beam steering elements 506 and 507 under the control of the controller 290. It is noted that the LIDAR apparatus 500 has a structure similar to that of the LIDAR apparatus shown in FIG. 5B in which the transmitting stage 114 and the receiving stage 112 have separate optical paths and utilize separate multi-stage beam steering engines 128 in which the multi-stage beam steering engine 128 for the transmitting stage 114 includes a first steering stage 120 with a continuous motion optical element.

Multi-Beam Scanning

In the LIDAR apparatuses 400 and 500 described earlier, the LIDAR apparatus is configured to use a discrete beam steering element, namely the LCPG beam steering elements 406 and 506, to selectively scan a light beam over a set of active tiles within a segmented FoV, such that only one tile of the segmented FoV is illuminated at any given steering angle of the discrete beam steering element. This requires the discrete beam steering stage to be steered, i.e., transitioned, at least once for each active tile in order to illuminate all of the active tiles. Examples of implementations in which multiple light beams are steered to different tiles within the segmented FoV by a common discrete beam steering element will now be described with reference to FIGS. 26 to 38.

Figure 26A:
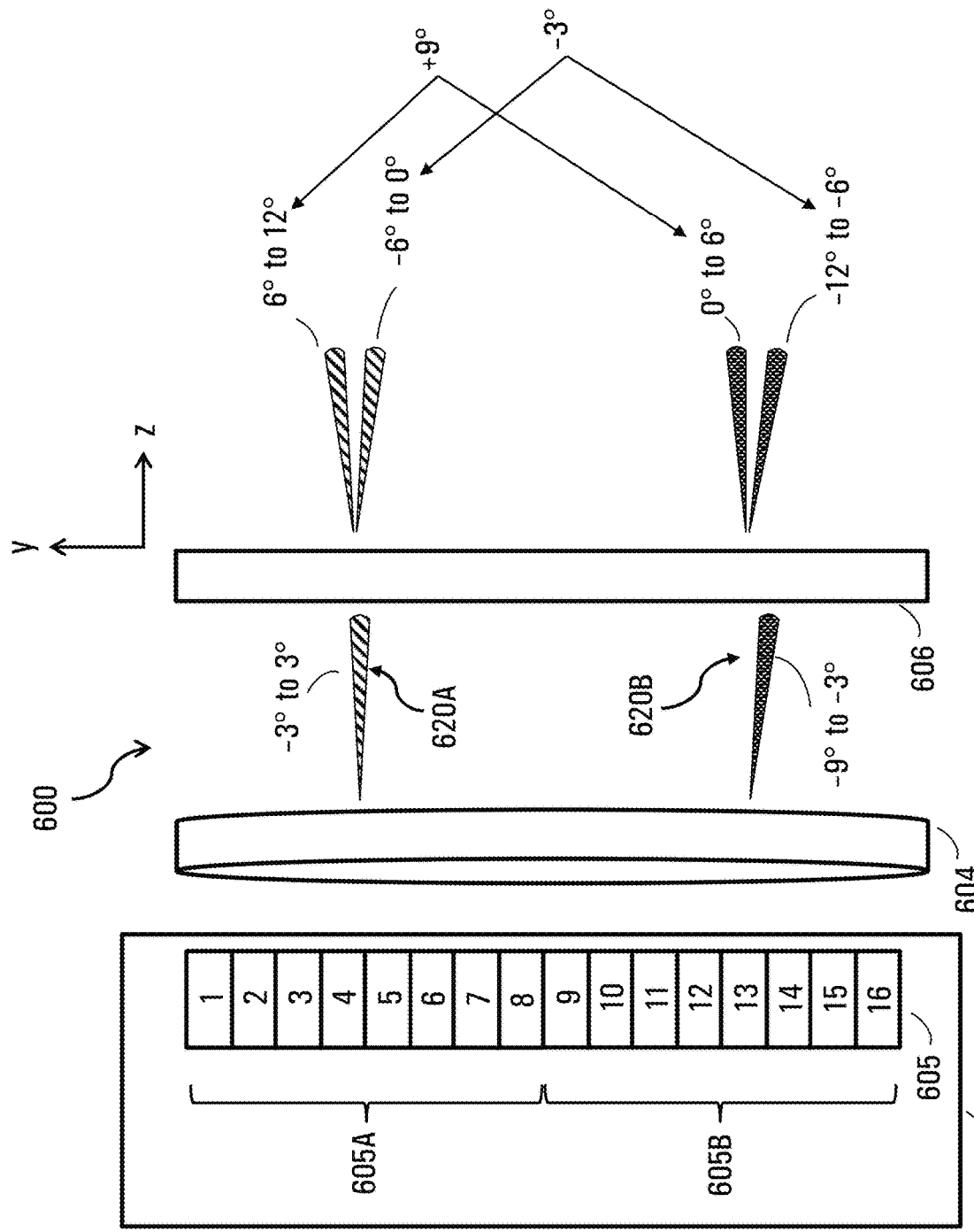
FIG. 26A shows a side on view of a LIDAR apparatus that includes a multi-beam transmitter configured to emit multiple light beams offset at different vertical angles and a discrete beam-steering engine for 2D multi-beam scanning of a segmented FoV.

For example, FIG. 26A shows a side on view of a LIDAR apparatus 600 that includes a multi-beam transmitting stage configured to emit multiple light beams offset at different vertical angles and a 2D beam steering engine for 2D multi-beam scanning of a segmented FoV divided in tiles similar to the segmented field of view shown in FIG. 11. A number of components of the LIDAR apparatus 500 have been omitted from the illustration in the interest of clarity.

As shown in FIG. 26A, the transmitting stage of the LIDAR apparatus 600 includes a laser source 602 and associated optics 604. The 2D beam steering engine of the LIDAR apparatus 600 includes a multi-stage LCPG beam steering element 606 and the tiles of the segmented field of view implemented by the LIDAR apparatus correspond to the 2D steering angles that are possible using the LCPG beam steering element 606. In particular, in this example each tile of the multi-stage LCPG beam steering element 606 has a nominal FoV of 7.5°×6.0° (Horizontal×Vertical) for a given steering direction or tile and a full FoV of 60°×24° that includes four rows of eight tiles each, for a total of thirty-two 7.5°×6.0° tiles.

In this example, the light source 602 includes a 16-channel laser light source 605. The first eight channels 605A and the second eight channels 605B of the 16-channel laser light source 605, in combination with the optics 604, are configured to emit light beams that are incident on the LCPG beam steering element 606 at different vertical angles, such that when the LCPG beam steering element 606 deflects the incident beams they are steered to different tiles within the segmented FoV. In particular, in the example implementation shown in FIG. 26A, a first light beam 620A emitted by one of the first eight laser channels 605A is incident on the LCPG beam steering element 606 at a substantially normal angle or at 0° in the vertical/elevation direction, whereas a second light beam 620B emitted by one of the second eight laser channels 605B is incident on the LCPG beam steering element 606 at −6° in the vertical/elevation direction. This means that there is a relative offset of 6° in the vertical/elevation direction between the directions of propagation of the two light beams. As such, when the two light beams 620A and 620B are subjected to deflection by the LCPG beam steering element 606 they are steered to different tiles within the segmented FoV implemented by the steering of the LCPG beam steering element 606 because the tiles are also offset from one another by 6°. As a result, as shown in FIG. 26A, by configuring the LCPG beam steering element 606 to deflect each of the two light beams 620A and 620B by +9° in the vertical direction it is possible to steer the first light beam 620A to a tile corresponding to 6° to 12° in the vertical direction and to steer the second light beam 620B to a tile corresponding to 0° to 6° in the vertical direction. Similarly, by configuring the LCPG beam steering element 606 to deflect each of the two light beams 620A and 620B by −3° in the vertical direction it is possible to steer the first light beam 620A to a tile corresponding to −6° to 0° in the vertical direction and to steer the second light beam 620B to a tile corresponding to −12° to −6° in the vertical direction. In this way, the LIDAR apparatus is able to illuminate the four vertical tiles in each of the eight columns of the 8×4 segmented FoV by only transitioning the LCPG beam steering element 606 between two different vertical steering angles rather than four.

Figure 26B:
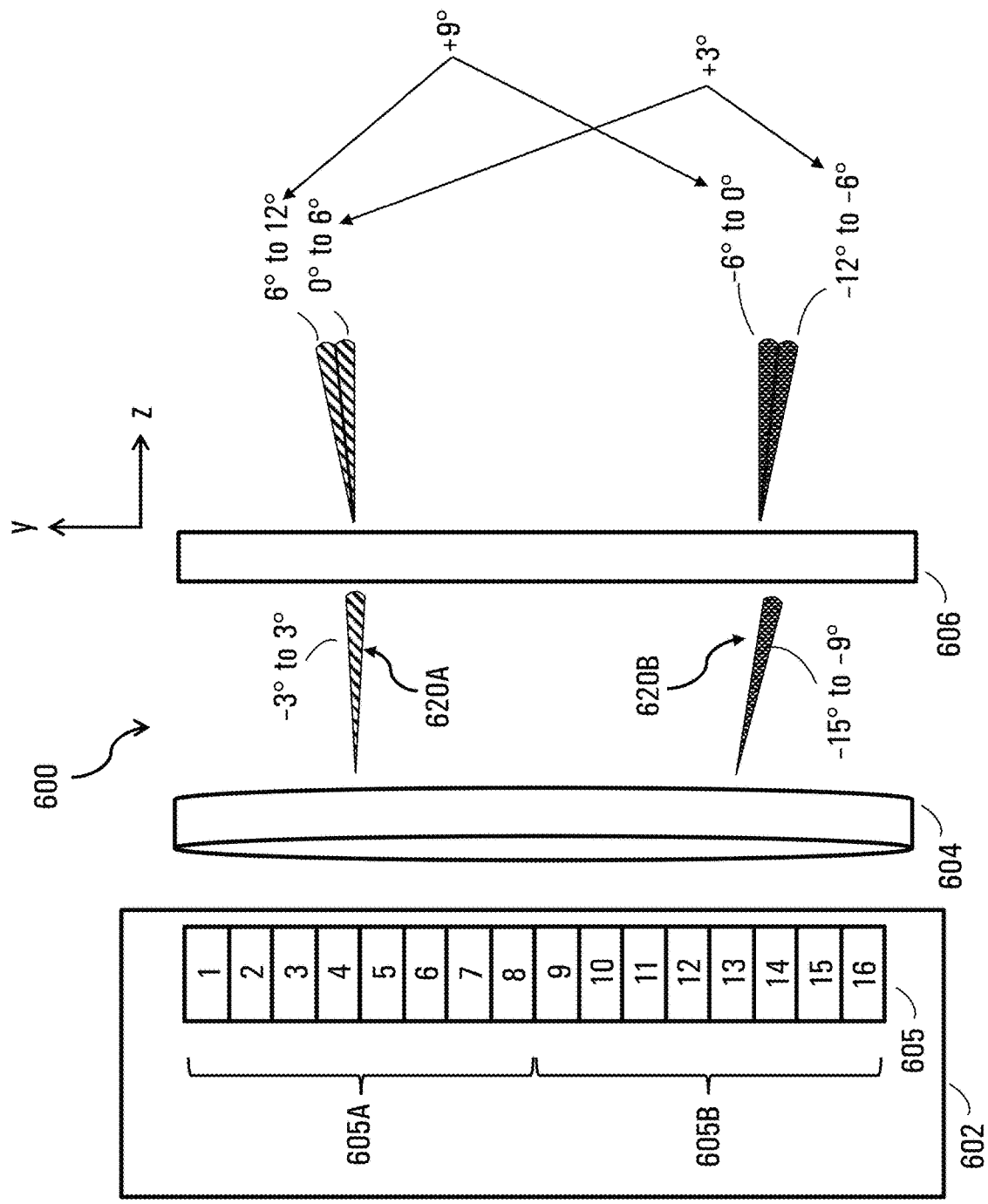
FIG. 26B shows an alternative configuration of the LIDAR apparatus of FIG. 22A, in which the multiple light beams emitted by the transmitter are offset by a different vertical angle than in FIG. 26A.

In the example shown in FIG. 26A, the directions of propagation of the two light beams 620A and 620B are offset by 6°, which is equal to the vertical steering angle offset between vertically adjacent tiles in the segmented FoV. FIG. 26B shows a second example of the LIDAR apparatus 600 in which the light source 602 and associated optics 604 are configured such that the directions of propagation of the two light beams 620A and 620B are offset in the vertical direction by a larger integer multiple of the 6° vertical steering angle between vertically adjacent tiles in the segmented FoV. In particular, in FIG. 26B, the directions of propagation of the two light beams 620A and 620B are offset by 12°. As a result, as shown in FIG. 26B, by configuring the LCPG beam steering element 606 to deflect each of the two light beams 620A and 620B by +9° in the vertical direction it is possible to steer the first light beam 620A to a tile corresponding to 6° to 12° in the vertical direction and to steer the second light beam 620B to a tile corresponding to −6° to 0° in the vertical direction. Similarly, by configuring the LCPG beam steering element 606 to deflect each of the two light beams 620A and 620B by +3° in the vertical direction it is possible to steer the first light beam 620A to a tile corresponding to 0° to 6° in the vertical direction and to steer the second light beam 620B to a tile corresponding to −12° to −6° in the vertical direction.

Here it is noted that, in the examples shown in FIGS. 26A and 26B, the light beam 620A is shown as being normally incident on LCPG beam steering element 606, while the light beam 620B is incident on LCPG beam steering element 606 at some offset equal to an integer multiple of the 6° vertical steering angle between vertically adjacent tiles in the segmented FoV. However, the transmission/reception efficiency of an LCPG beam steering element may be lower for lower angles of incidence. If so, there are several ways this effect may be mitigated. For example, the relative offset between the propagation directions of the two light beams 620A and 620B may be maintained, but the configuration of the LIDAR apparatus may be changed so that both beams are incident on the LCPG beam steering element 606 with approximately the same offset from normal. For example, in FIG. 26A, rather than having nominal directions of propagation of 0° and −6° in the vertical direction, the nominal directions of propagation of the light beam 620A and 620B in the vertical direction could be changed to +3° and −3°, respectively. Similarly, in FIG. 26B, the nominal directions of propagation of the light beam 620A and 620B in the vertical direction could be changed from 0° and −12° to +6° and −6°, respectively. Another potential option is to offset the decreased efficiency by increasing the amplitude of the second light beam 620B, for example.

Figure 27:
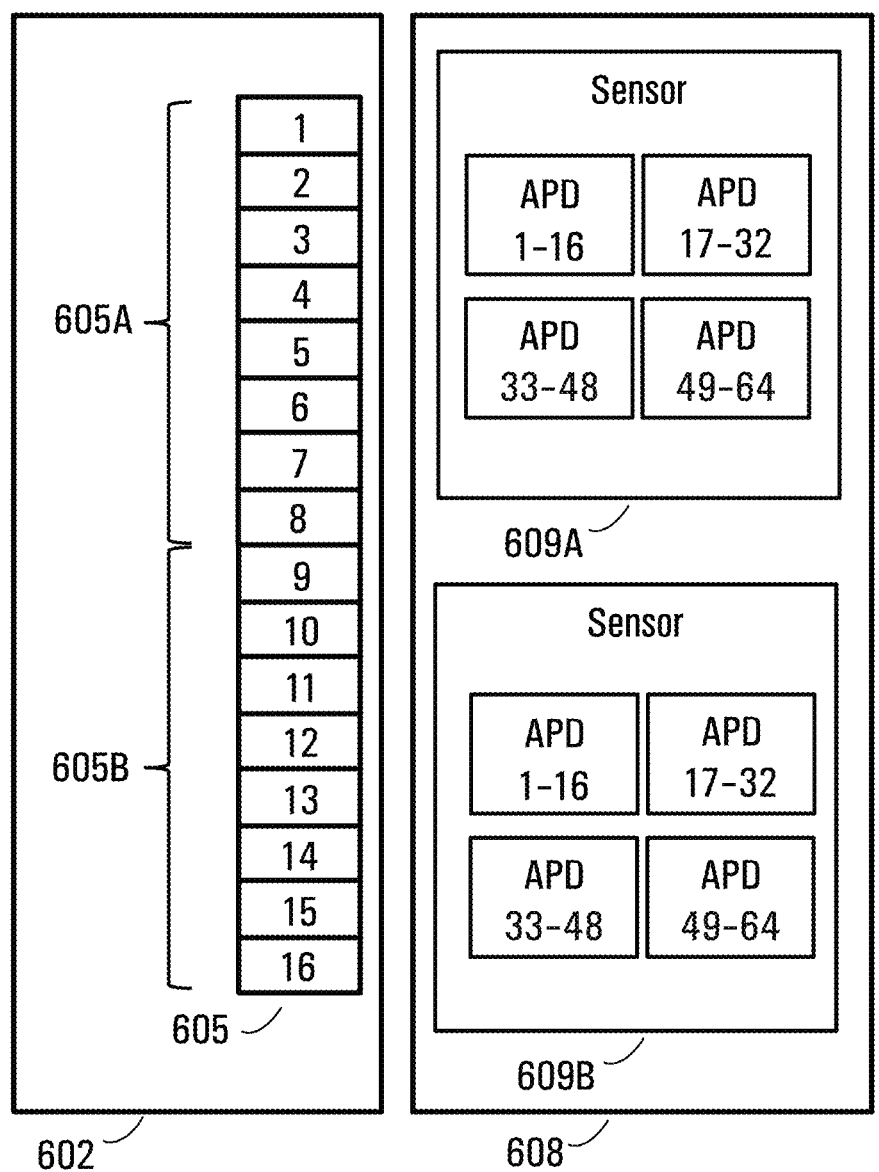
FIG. 27 shows an example of the configuration of the multi-beam light source of the transmitter stage and the sensor unit of the receiver stage of the LIDAR apparatus of FIGS. 26A and 26B.

In the LIDAR apparatus 600 two of the first eight laser channels 605A and two of the second eight laser channels 605B may be fired at the same time, such that optical impulses from alternating pairs of laser channels of the first eight laser channels 605A and alternating pairs of laser channels of the second eight laser channels 605B are transmitted according to a particular firing sequence. In such embodiments, an optical receiver 608 of the LIDAR apparatus 600 may be implemented by two arrays of APDs that are each arranged in a 2×32 array configuration. FIG. 27 shows an example of such a configuration of an optical receiver 608 that includes two sensor units 609A and 609B that each include a 2×32 APD array. In particular, in this example, the firing sequence is such that the following four laser channels are fired together: 1, 5, 9 and 13; 2, 6, 10 and 14; 3, 7, 11 and 15; and 4, 8, 12 and 16. Other variations are possible and are contemplated within the scope of the present disclosure. In this configuration, laser channels 1-4 optically correspond to the top 1×32 APDs of the sensor unit 609A, laser channels 5-8 optically correspond to the bottom 1×32 APDs of the sensor unit 609A, laser channels 9-12 correspond to the top 1×32 APDs of the sensor unit 609B and laser channels 13-16 optically correspond to the bottom 1×32 APDs of the sensor unit 609B.

Figure 28A:
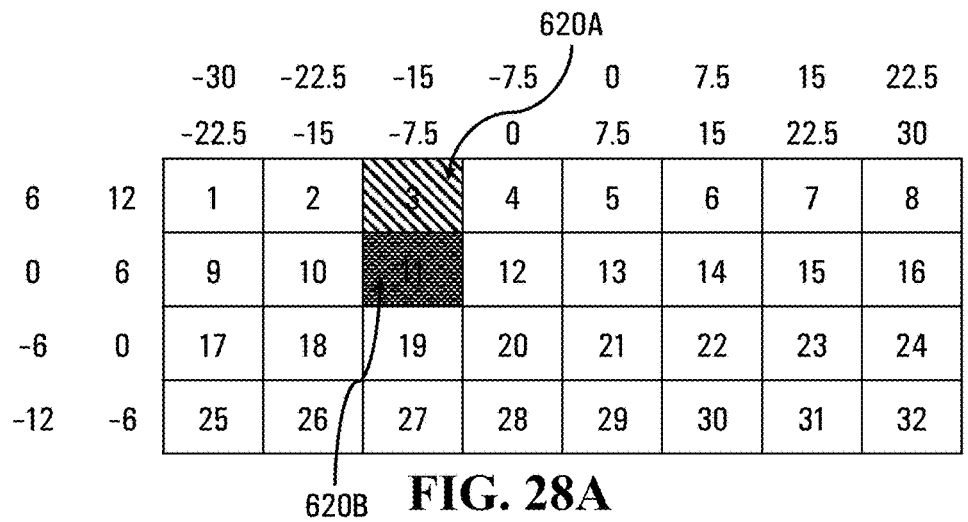
FIGS. 28A, 28B and 28C show examples of 2D multi-beam scanning that may be done by the LIDAR apparatus of FIG. 26A over a 60°×24° segmented FoV.
Figure 28B:
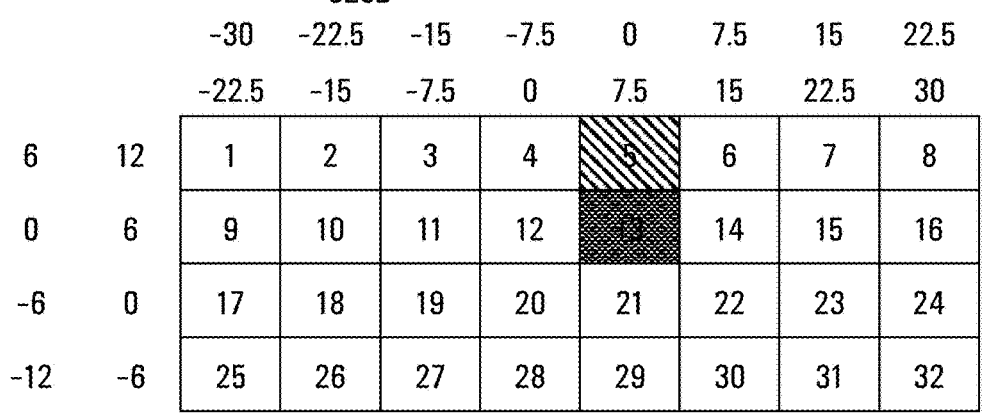
Figure 28C:
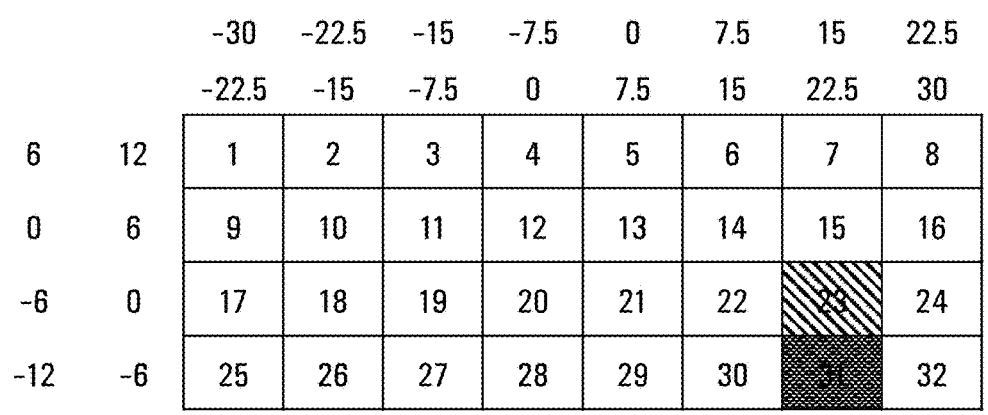

FIGS. 28A, 28B and 28C show a field of view of the LIDAR apparatus 600 of FIG. 26A divided into selectable tiles resulting from the 2D beam steering angles that are possible using the multi-stage LCPG beam steering element 606. In particular, FIGS. 28A, 28B and 28C show examples of the light beams 620A and 620B being steered to different selectable tiles within the segmented field of view of the LIDAR apparatus 600 of FIG. 26A. In FIG. 28A, the LCPG beam steering element 606 is configured to steer the light beam 620A to tile 3 within the field of view, which in this case corresponds to a deflection of +9° vertically and −11.25° horizontally relative to the original direction of propagation of the light beam 620A. This configuration of the LCPG beam steering element 606 steers the light beam 620B to tile 11 within the field of view, which in this case corresponds to a deflection of +9° vertically and −11.25° horizontally relative to the original direction of propagation of the light beam 620B In contrast, FIGS. 28B and 28C show two other steering angle configurations of the LCPG beam steering element 606 in which the LCPG beam steering element 606 is configured to steer the light beam 620A to tile 5 and tile 13, respectively, and to steer the light beam 620B to tile 13 and 31, respectively. In this example tiles 5 and 13 correspond to a deflection of +9° vertically and +3.75° horizontally for the light beams 620A and 620B, and tiles 23 and 31 corresponds to a deflection of −3° vertically and +18.75° horizontally for light beams 620A and 620B.

Figure 29A:
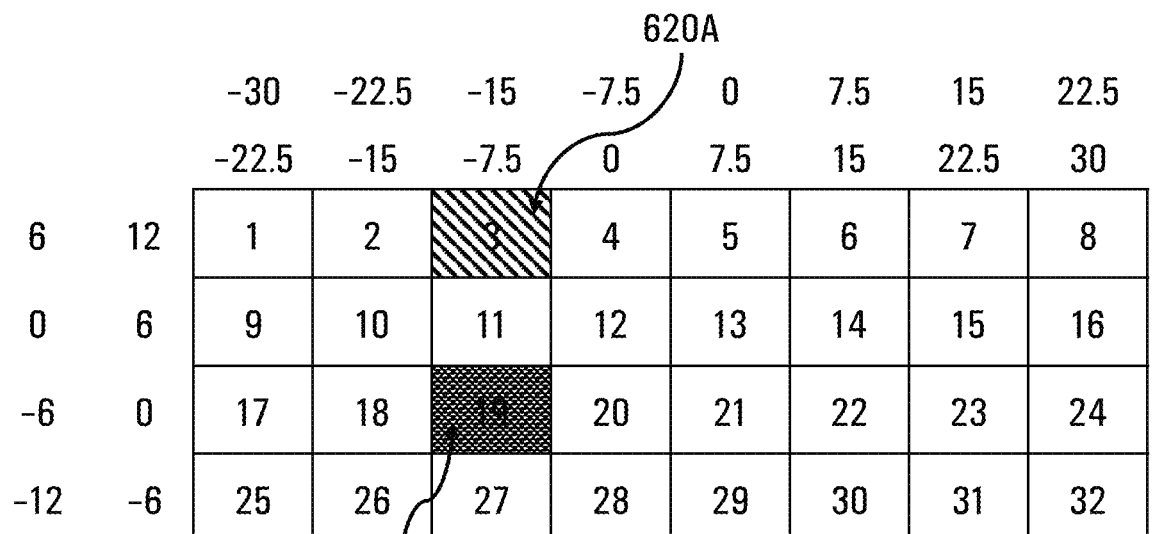
FIGS. 29A, 29B and 29C show examples of 2D multi-beam scanning that may be done by the LIDAR apparatus of FIG. 26B over a 60°×24° segmented FoV.
Figure 29B:
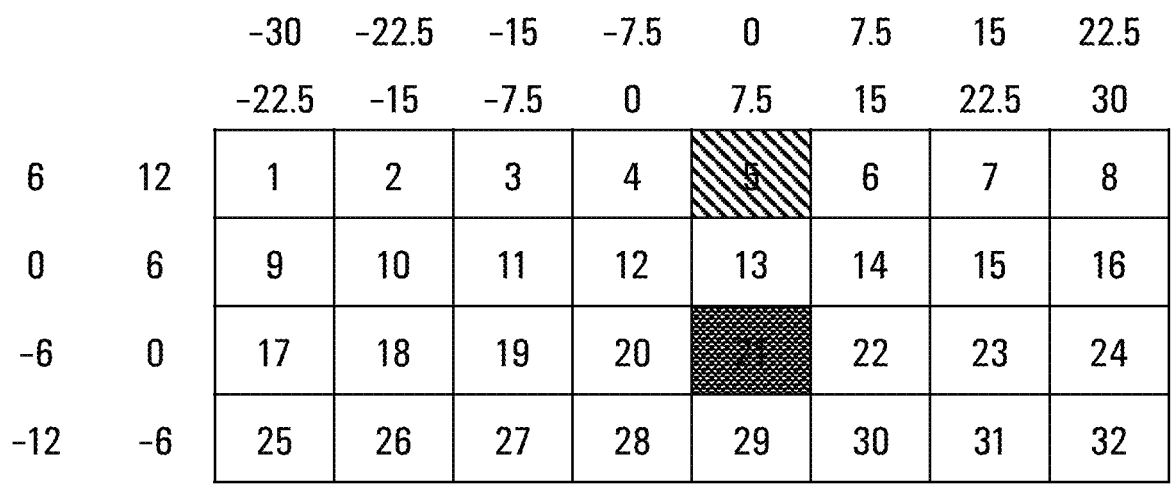
Figure 29C:
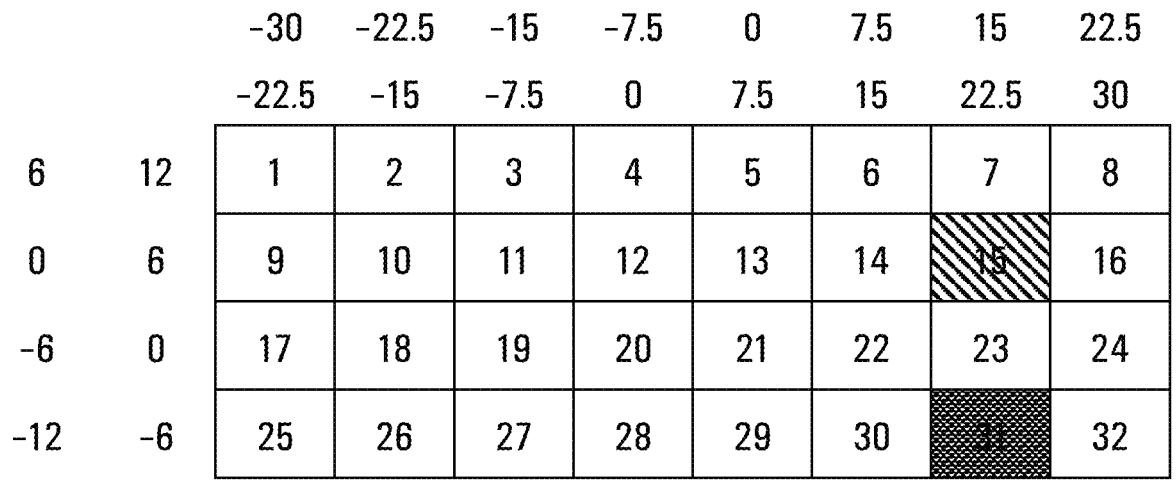

FIGS. 29A, 29B and 29C show a field of view of the LIDAR apparatus 600 of FIG. 26B divided into selectable tiles resulting from the 2D beam steering angles that are possible using the multi-stage LCPG beam steering element 606. In particular, FIGS. 29A, 29B and 29C show examples of the light beams 620A and 620B being steered to different selectable tiles within the segmented field of view of the LIDAR apparatus 600 of FIG. 26B. In FIG. 29A, the LCPG beam steering element 606 is configured to steer the light beam 620A to tile 3 within the field of view, which in this case corresponds to a deflection of +9° vertically and −11.25° horizontally relative to the original direction of propagation of the light beam 620A. This configuration of the LCPG beam steering element 606 steers the light beam 620B to tile 19 within the field of view, which in this case corresponds to a deflection of +9° vertically and −11.25° horizontally relative to the original direction of propagation of the light beam 620B In contrast, FIGS. 29B and 29C show two other steering angle configurations of the LCPG beam steering element 606 in which the LCPG beam steering element 606 is configured to steer the light beam 620A to tile 5 and tile 15, respectively, and to steer the light beam 620B to tile 21 and 31, respectively. In this example tiles 5 and 21 correspond to a deflection of +9° vertically and +3.75° horizontally for the light beams 620A and 620B, and tiles 15 and 31 corresponds to a deflection of +3° vertically and +18.75° horizontally for light beams 620A and 620B.

Figure 30A:
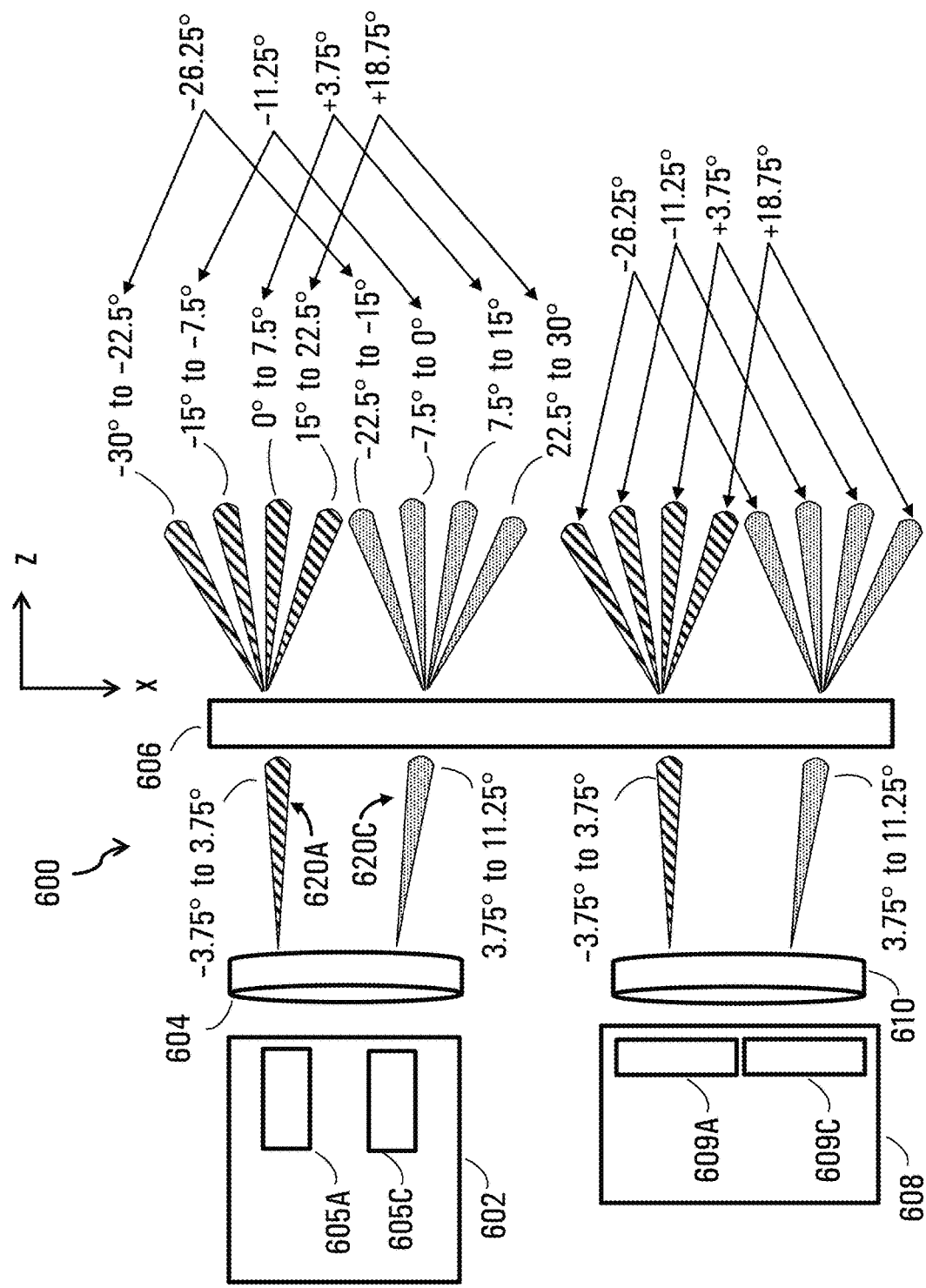
FIG. 30A shows a top down view of a LIDAR apparatus that includes a multi-beam transmitter configured to emit multiple light beams offset at different horizontal angles and a discrete beam-steering engine for 2D multi-beam scanning of a segmented FoV.

FIG. 30A shows a top down view of another LIDAR apparatus 600 that includes a multi-beam transmitting stage configured to emit multiple light beams offset at different horizontal angles, a 2D beam steering engine for 2D multi-beam scanning of a segmented FoV divided in tiles similar to the segmented field of view shown in FIG. 11, and a multi-beam receiving stage configured to receive multiple light beams offset at different horizontal angles from the segmented FoV. A number of components of the LIDAR apparatus 600 have been omitted from the illustration in the interest of clarity.

As shown in FIG. 30A, the transmitting stage of the LIDAR apparatus 600 includes a laser source 602 and associated optics 604. The 2D beam steering engine of the LIDAR apparatus 600 includes a multi-stage LCPG beam steering element 606 and the tiles of the segmented field of view implemented by the LIDAR apparatus 600 correspond to the 2D steering angles that are possible using the LCPG beam steering element 606. In particular, in this example each tile of the multi-stage LCPG beam steering element 606 has a nominal FoV of 7.5°×6.0° (Horizontal×Vertical) for a given steering direction or tile and a full FoV of 60°×24° that includes four rows of eight tiles each, for a total of thirty-two 7.5°×6.0° tiles.

In this example, the light source 602 includes two 8-channel laser light sources 605A and 605C. The first 8-channel laser light source 605A and the second eight-channel laser light source 605C, in combination with the optics 604, are configured to emit light beams that are incident on the LCPG beam steering element 606 at different horizontal angles, such that when the LCPG beam steering element 606 deflects the incident beams they are steered to different tiles within the segmented FoV. In particular, in the example implementation shown in FIG. 30A, a first light beam 620A emitted by the 8-channel laser light source 605A is incident on the LCPG beam steering element 606 at a substantially normal angle or at 0° in the horizontal/azimuth direction, whereas a second light beam 620C emitted by the second 8-channel laser light source 605B is incident on the LCPG beam steering element 606 at +7.5° in the horizontal/azimuth. This means that there is a relative offset of 7.5° in the horizontal/azimuth direction between the directions of propagation of the two light beams 620A and 620C. As such, when the two light beams 620A and 620C are subjected to deflection by the LCPG beam steering element 606 they are steered to different tiles within the segmented FoV because the tiles are also offset from one another by 7.5° in the horizontal/azimuth direction. As a result, as shown in FIG. 30A, by configuring the LCPG beam steering element 606 to deflect each of the two light beams 620A and 620C by +18.75° in the horizontal direction it is possible to steer the light beam 620A to a tile corresponding to 15° to 22.5° in the horizontal direction and to steer the light beam 620C to a tile corresponding to 22.5° to 30° in the horizontal direction. Similarly, by configuring the LCPG beam steering element 606 to deflect each of the two light beams 620A and 620C by +3.75° in the horizontal direction it is possible to steer the light beam 620A to a tile corresponding to 0° to 7.5° in the horizontal direction and to steer the light beam 620C to a tile corresponding to 7.5° to 15° in the horizontal direction. In addition, by configuring the LCPG beam steering element 606 to deflect each of the two light beams 620A and 620C by −11.25° in the horizontal direction it is possible to steer the light beam 620A to a tile corresponding to −15° to −7.5° in the horizontal direction and to steer the light beam 620C to a tile corresponding to −7.5° to 0° in the horizontal direction. Finally, by configuring the LCPG beam steering element 606 to deflect each of the two light beams 620A and 620C by +−26.25° in the horizontal direction it is possible to steer the first light beam 620A to a tile corresponding to −30° to −22.5° in the horizontal direction and to steer the light beam 620C to a tile corresponding to −22.5° to −15° in the horizontal direction. In this way, the LIDAR apparatus is able to illuminate the eight tiles in each of the four rows of the 8×4 segmented FoV by only transitioning the LCPG beam steering element 606 between four different horizontal steering angles rather than eight.

Figure 30B:
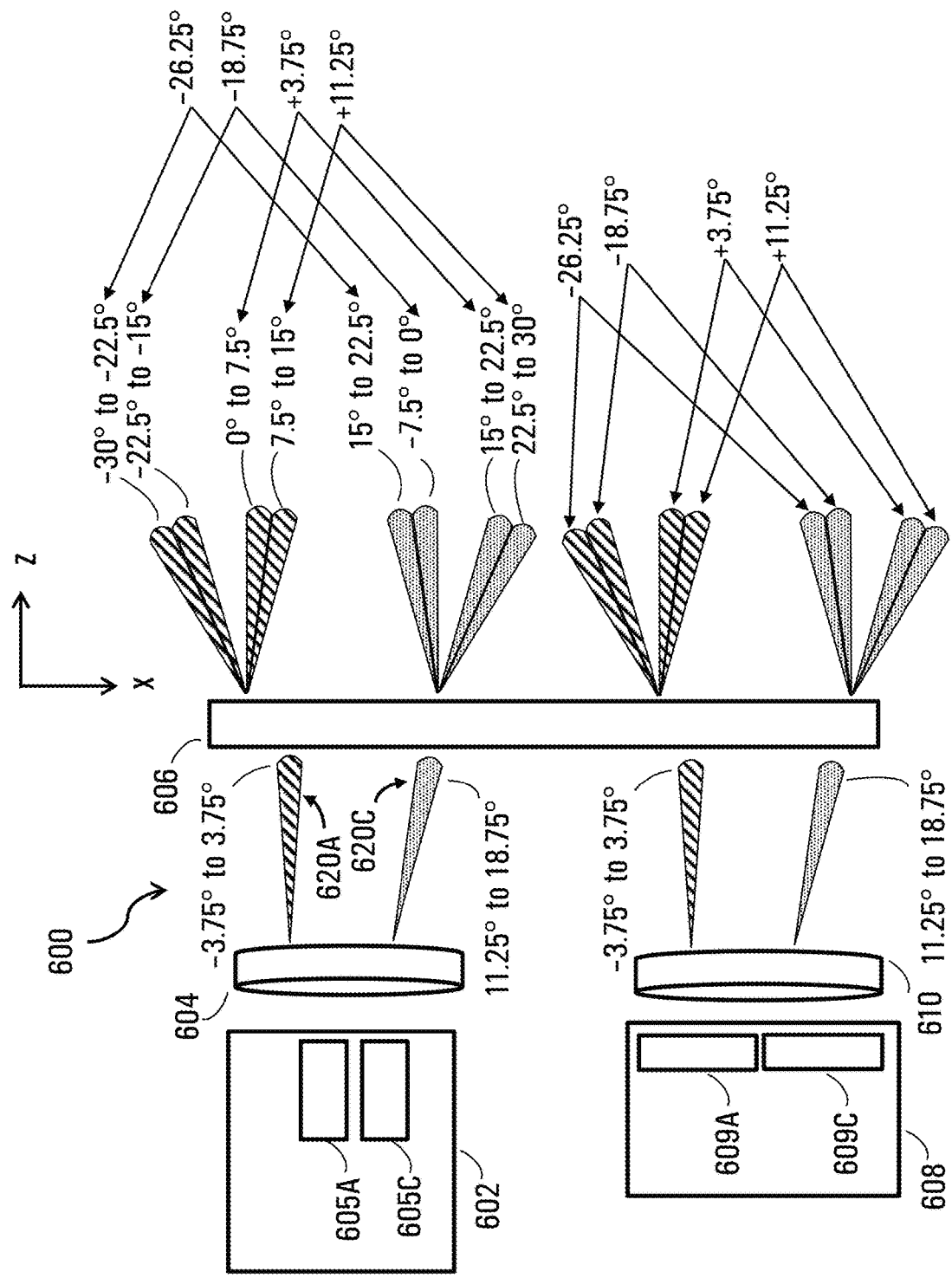
FIG. 30B shows an alternative configuration of the LIDAR apparatus of FIG. 26A, in which the multiple light beams emitted by the transmitter are offset by a different horizontal angle than in FIG. 30A.

In the example shown in FIG. 30A, the directions of propagation of the two light beams 620A and 620C are offset by 7.5°, which is equal to the horizontal steering angle offset between horizontally adjacent tiles in the segmented FoV. FIG. 30B shows another example of the LIDAR apparatus 600 in which the light source 602 and associated optics 604 are configured such that the directions of propagation of the two light beams 620A and 620C are offset in the horizontal direction by a larger integer multiple of the 7.5° vertical steering angle between horizontally adjacent tiles in the segmented FoV. In particular, in FIG. 30B, the directions of propagation of the two light beams 620A and 620C are offset by 15°. As a result, as shown in FIG. 30B, by alternately configuring the LCPG beam steering element 606 to deflect each of the two light beams 620A and 620B by +11.25°, +3.75°, −18.75° and −26.25° in the horizontal direction it is possible to illuminate the eight tiles in each of the four rows of the 8×4 segmented FoV by only transitioning the LCPG beam steering element 606 between four different horizontal steering angles.

The receiving stage of the LIDAR apparatus 600 of FIGS. 30A and 30B includes an optical receiver 608 and associated optics 610. The optical receiver 608 includes two sensor units 609A and 609C. For example, the sensor units 609A and 609C may be implemented using APDs. In the reception path for light reflected off object(s) in the FoV back to the LIDAR apparatus 600, the LCPG beam steering element 606 essentially acts in reverse to its actions in the transmission path. In particular, the LCPG beam steering element 606, via the reception optics 610, directs reflected light beams onto optical receiver 608 such that reflected light beams from light beam 620A are directed onto the sensor unit 609A and reflected light beams from light beam 620C are directed onto the sensor unit 609C.

Figure 31:
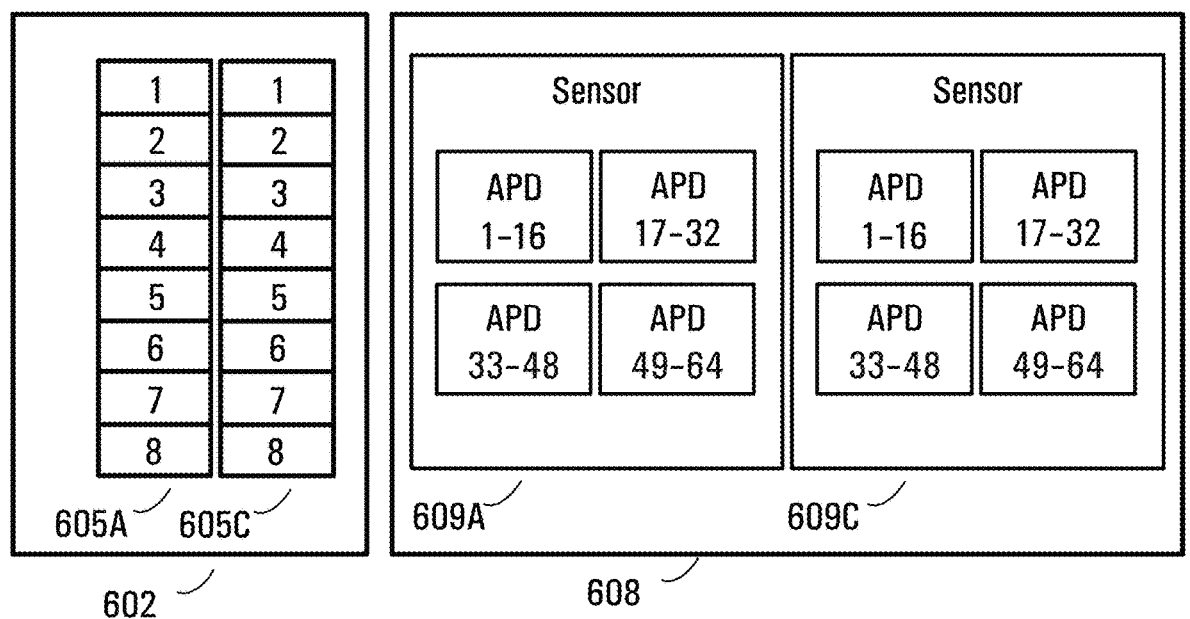
FIG. 31 shows an example of the configuration of the multi-beam light source of the transmitter stage and the sensor unit of the receiver stage of the LIDAR apparatus of FIGS. 30A and 30B.

In the LIDAR apparatus 600 of FIGS. 30A and 30B, two of the laser channels of the 8-channel laser light source 605A and two of the laser channels of the 8-channel laser light source 605C may be fired at the same time, such that optical impulses from alternating pairs of laser channels of the 8-channel laser light source 605A and alternating pairs of laser channels of the 8-channel laser light source 605C are transmitted according to a particular firing sequence. In such embodiments, the optical receiver 608 of the LIDAR apparatus 600 may be implemented by two arrays of APDs that are each arranged in a 2×32 array configuration. FIG. 31 shows an example of such a configuration of an optical receiver 608 that includes two sensor units 609A and 609C that each include a 2×32 APD array. In this configuration, laser channels 1-4 of laser light source 605A optically correspond to the top 1×32 APDs of the sensor unit 609A, laser channels 5-8 of the laser light source 605A optically correspond to the bottom 1×32 APDs of the sensor unit 609A, laser channels 1-4 of laser light source 605C optically correspond to the top 1×32 APDs of the sensor unit 609C and laser channels 5-8 of laser light source 605C optically correspond to the bottom 1×32 APDs of the sensor unit 609C.

Figure 32A:
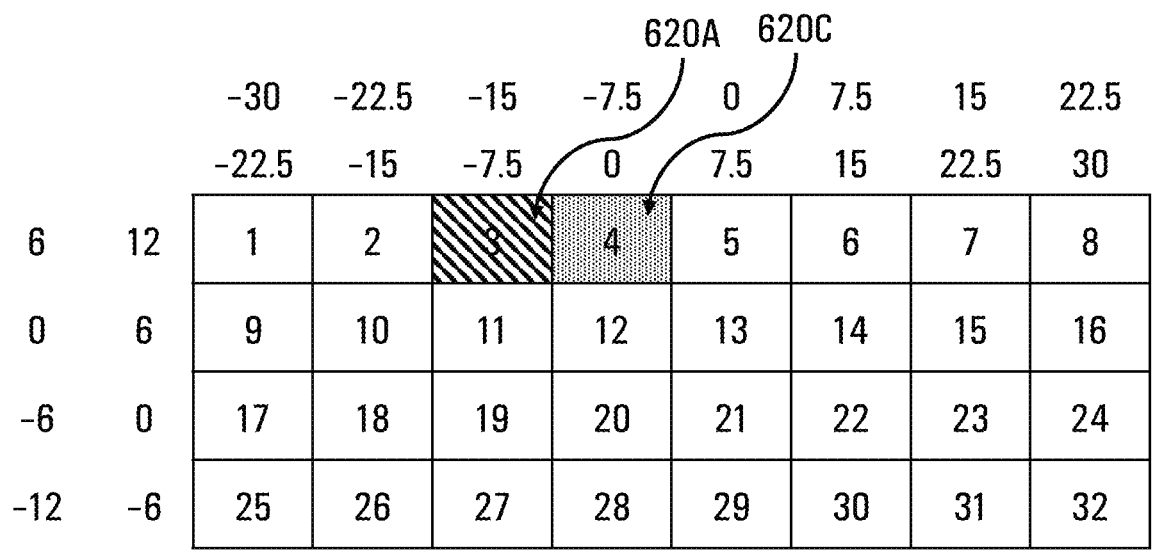
FIGS. 32A, 32B and 32C show examples of 2D multi-beam scanning that may be done by the LIDAR apparatus of FIG. 30A over a 60°×24° segmented FoV.
Figure 32B:
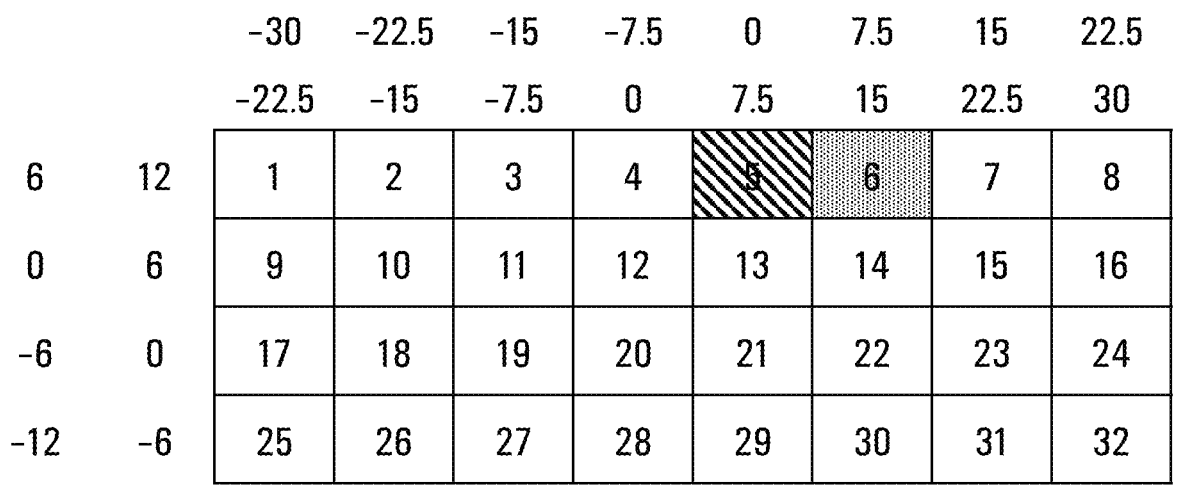
Figure 32C:
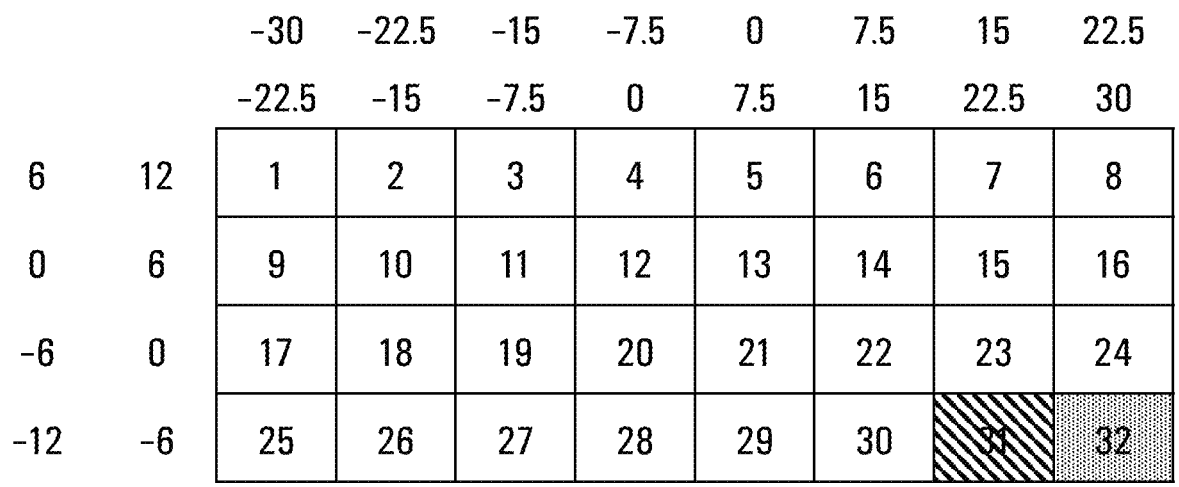

FIGS. 32A, 32B and 32C show a field of view of the LIDAR apparatus 600 of FIG. 30A divided into selectable tiles resulting from the 2D beam steering angles that are possible using the multi-stage LCPG beam steering element 606. In particular, FIGS. 30A, 30B and 30C show examples of the light beams 620A and 620C being steered to different selectable tiles within the segmented field of view of the LIDAR apparatus 600 of FIG. 30A. In FIG. 32A, the LCPG beam steering element 606 is configured to steer the light beam 620A to tile 3 within the field of view, which in this case corresponds to a deflection of +9° vertically and −11.25° horizontally relative to the original direction of propagation of the light beam 620A. This configuration of the LCPG beam steering element 606 steers the light beam 620C to tile 4 within the field of view, which in this case corresponds to a deflection of +9° vertically and −11.25° horizontally relative to the original direction of propagation of the light beam 620C. In contrast, FIGS. 32B and 32C show two other steering angle configurations of the LCPG beam steering element 606 in which the LCPG beam steering element 606 is configured to steer the light beam 620A to tile 5 and tile 31, respectively, and to steer the light beam 620B to tile 6 and 32, respectively. In this example tiles 5 and 6 correspond to a deflection of +9° vertically and +3.75° horizontally for the light beams 620A and 620C, and tiles 31 and 32 corresponds to a deflection of −3° vertically and +18.75° horizontally for light beams 620A and 620B.

Figure 33A:
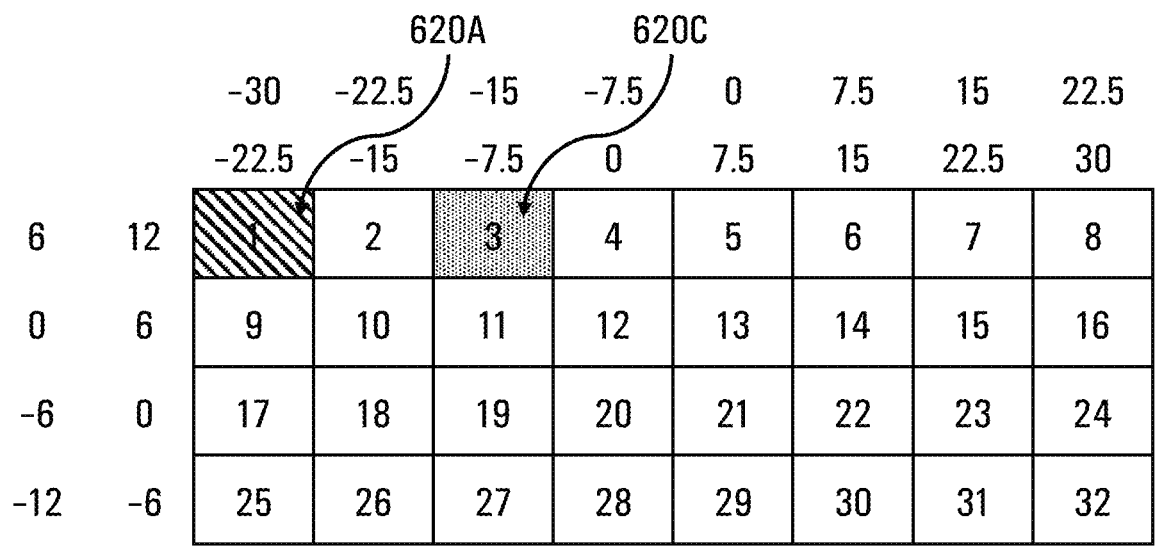
FIGS. 33A, 33B and 33C show examples of 2D multi-beam scanning that may be done by the LIDAR apparatus of FIG. 30B over a 60°×24° segmented FoV.
Figure 33B:
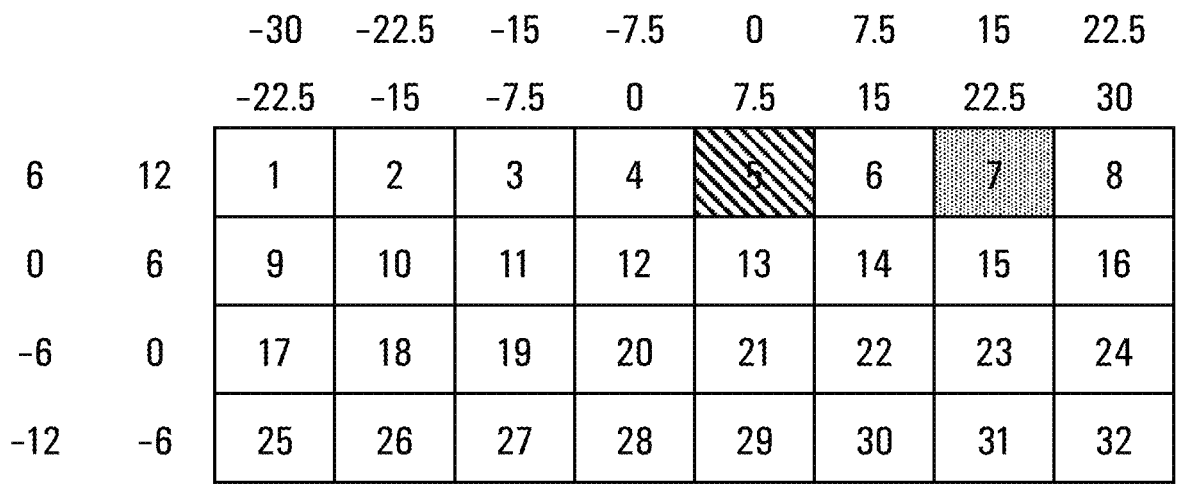
Figure 33C:
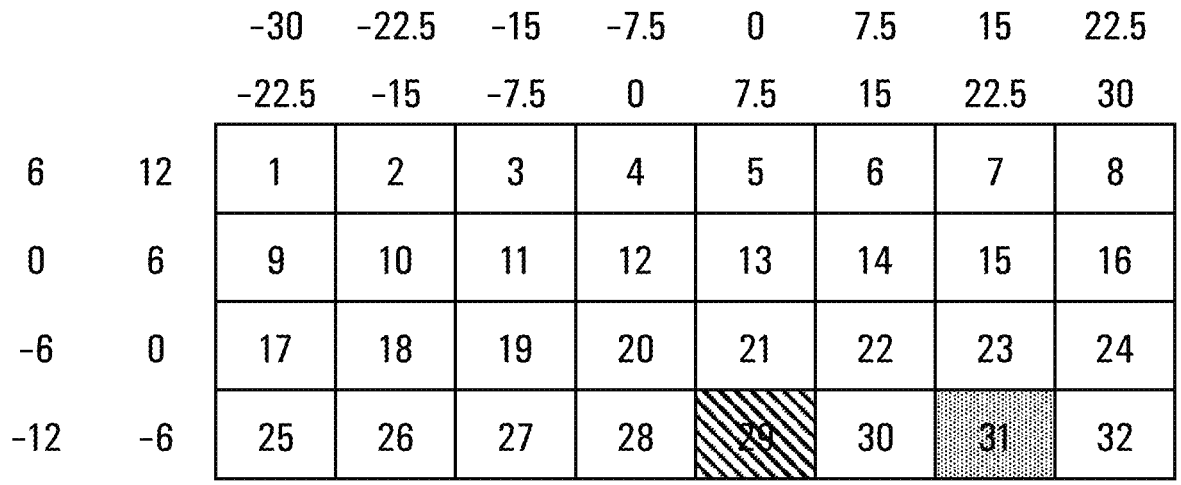
Figure 34:
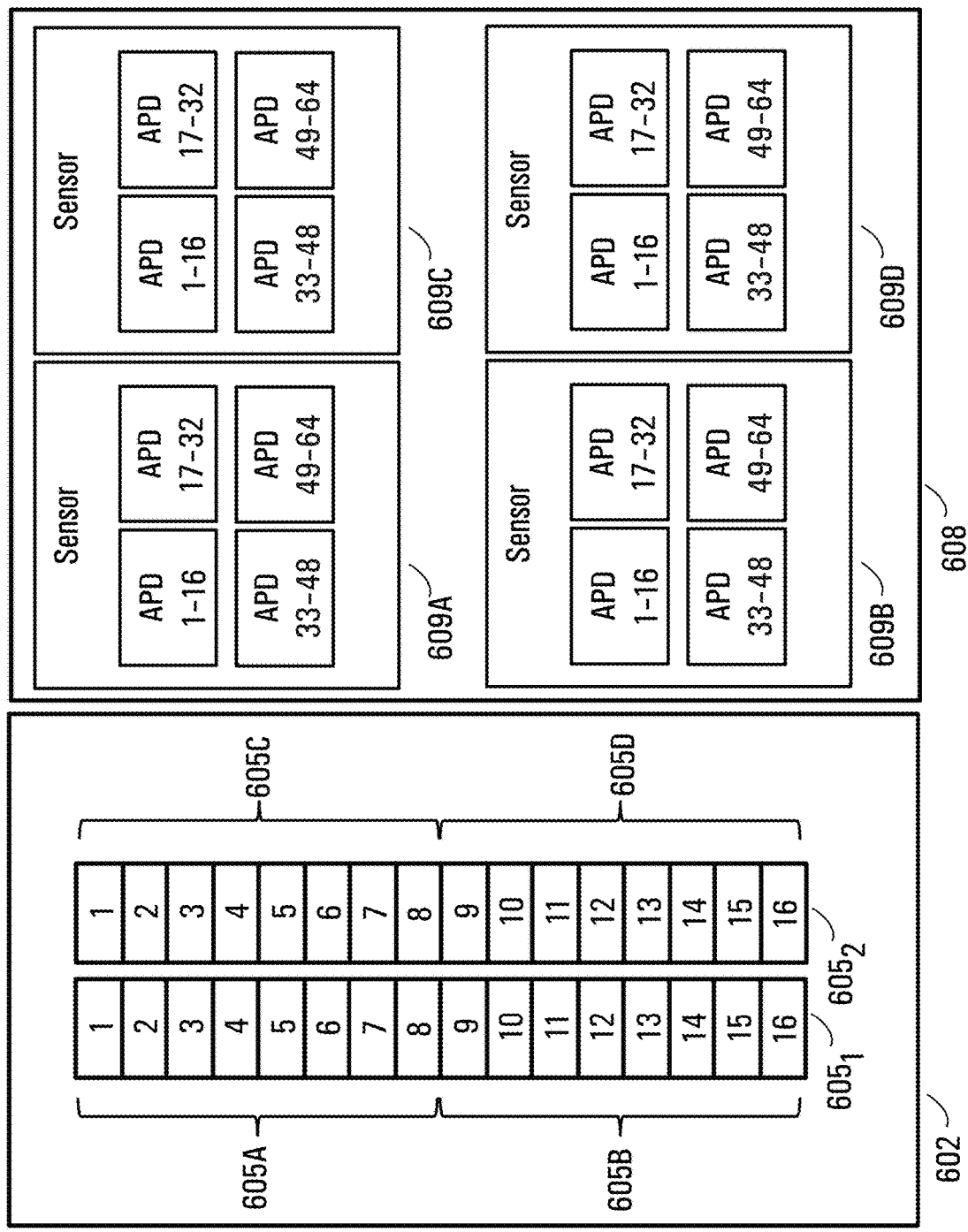
FIG. 34 shows an example of an alternative configuration of a multi-beam light source of the transmitter stage and the sensor unit of the receiver stage of the LIDAR apparatus of FIGS. 30A and 30B.
Figure 35A:
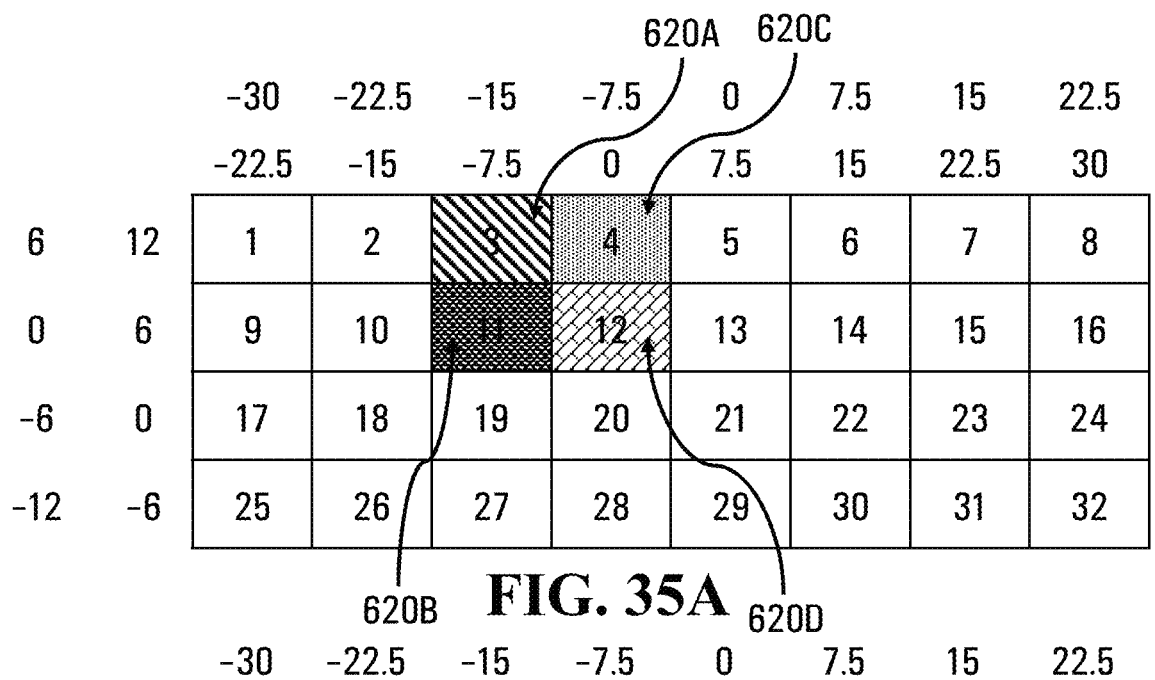
FIGS. 35A, 35B and 35C show examples of 2D multi-beam scanning that may be done by the LIDAR apparatus of FIG. 30A over a 60°×24° segmented FoV when multi-beam light source of the transmitter stage and the sensor unit of the receiver stage are configured in accordance with FIG. 34.
Figure 35B:
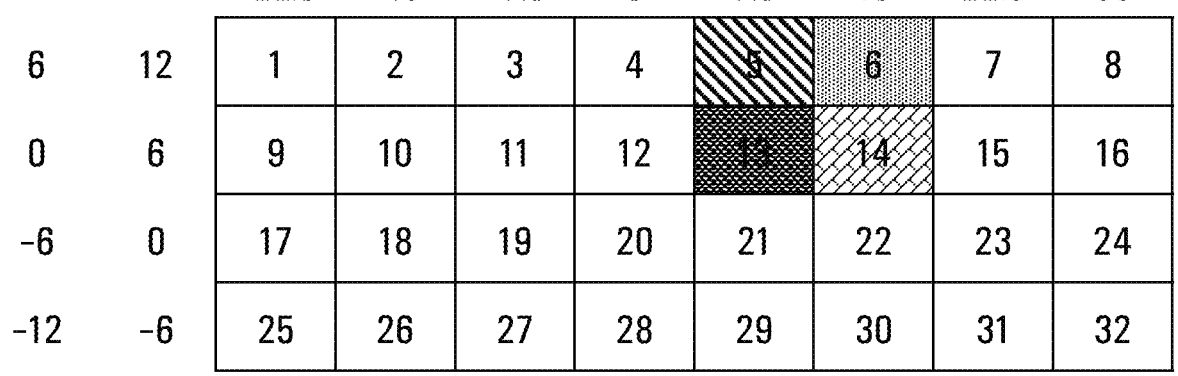
Figure 35C:
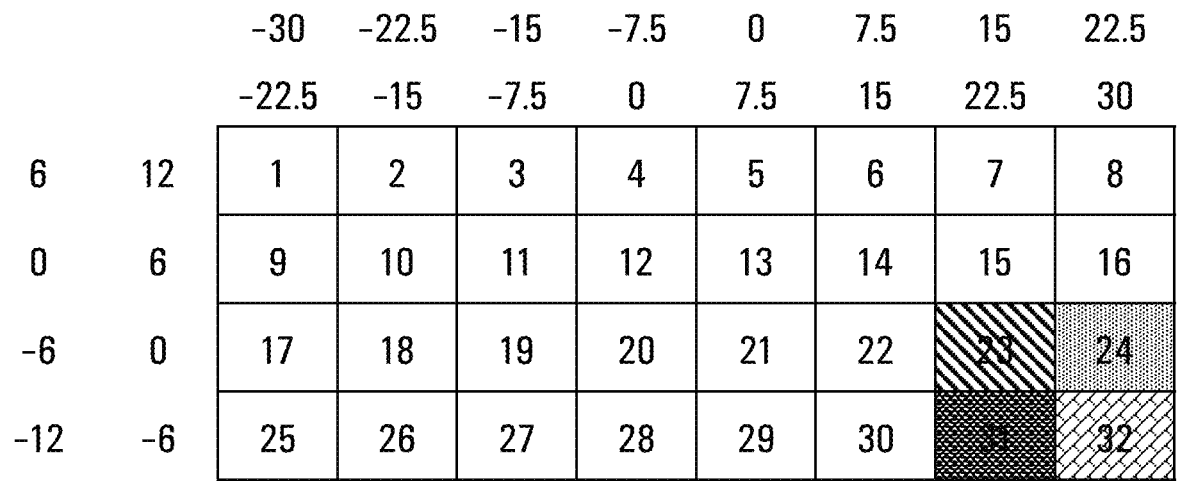
Figure 36A:
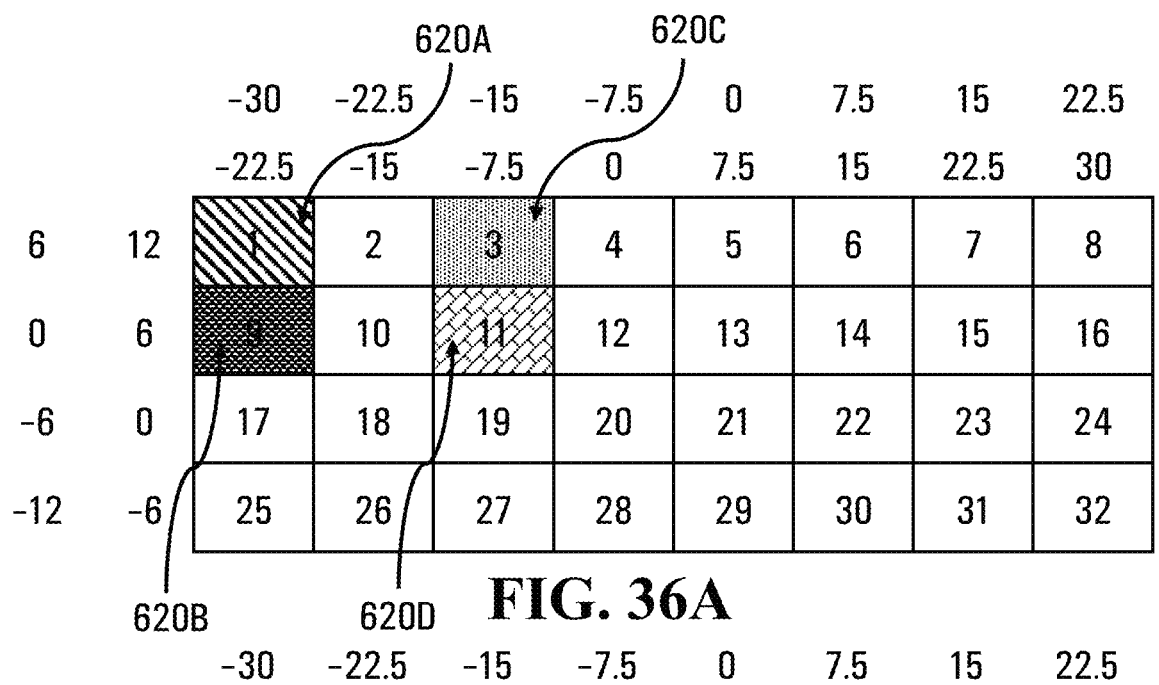
FIGS. 36A, 36B and 36C show examples of 2D multi-beam scanning that may be done by the LIDAR apparatus of FIG. 30B over a 60°×24° segmented FoV when multi-beam light source of the transmitter stage and the sensor unit of the receiver stage are configured in accordance with FIG. 34.
Figure 36B:
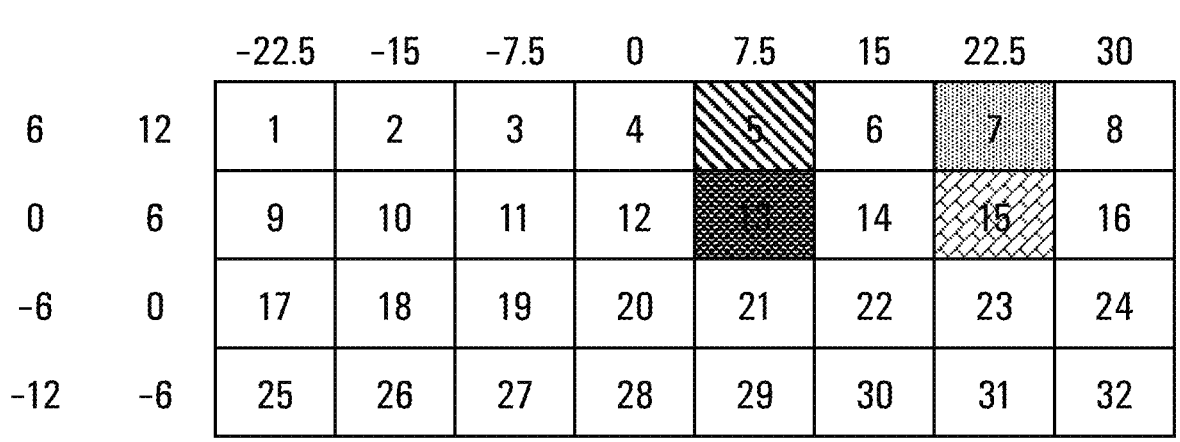
Figure 36C:
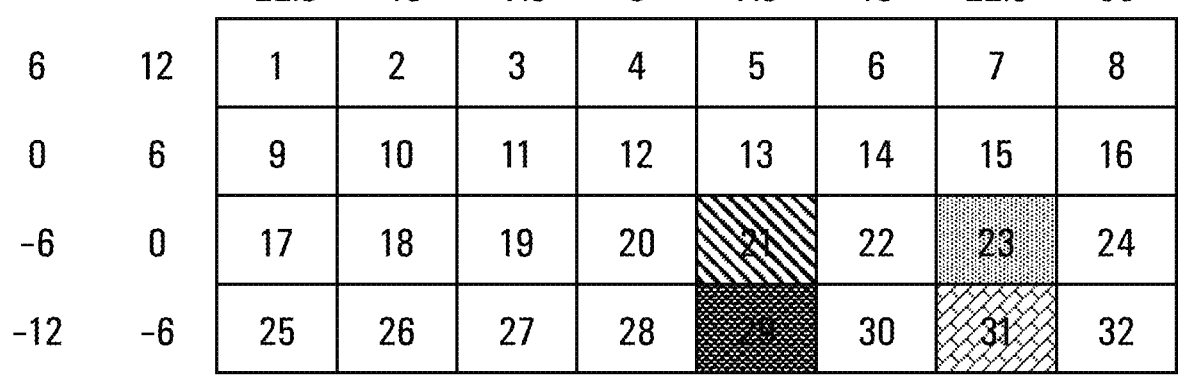
Figure 37A:
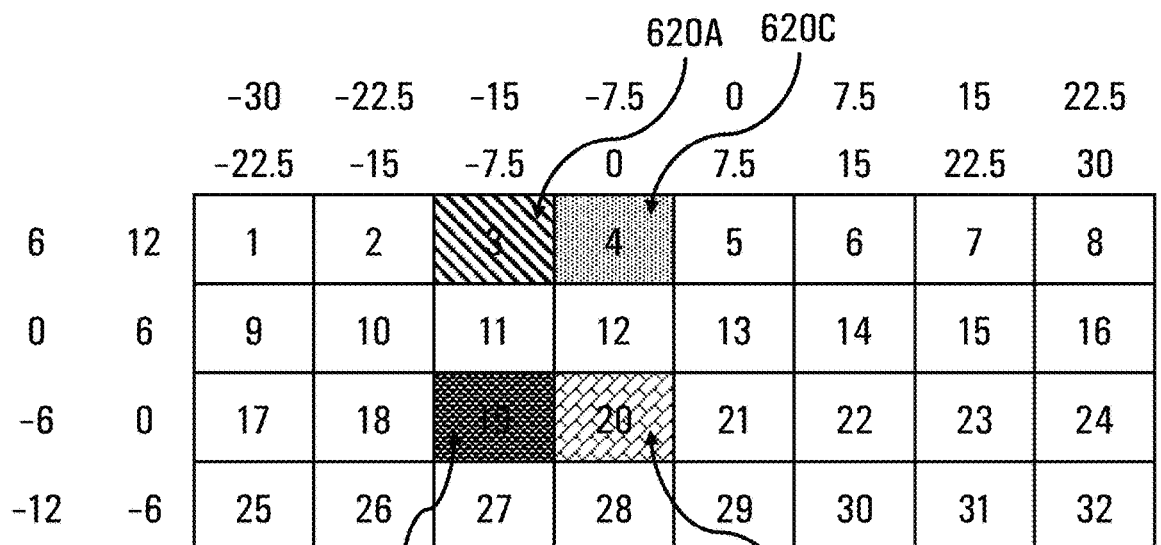
FIGS. 37A, 37B and 37C show further examples of 2D multi-beam scanning that may be done by the LIDAR apparatus of FIG. 30A over a 60°×24° segmented FoV when multi-beam light source of the transmitter stage and the sensor unit of the receiver stage are configured in accordance with FIG. 34.
Figure 37B:
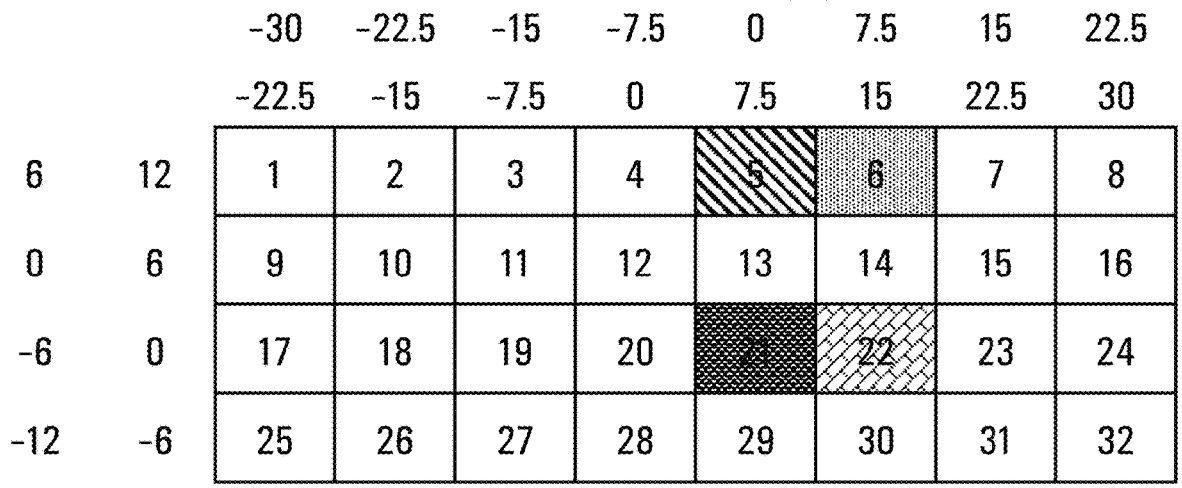
Figure 37C:
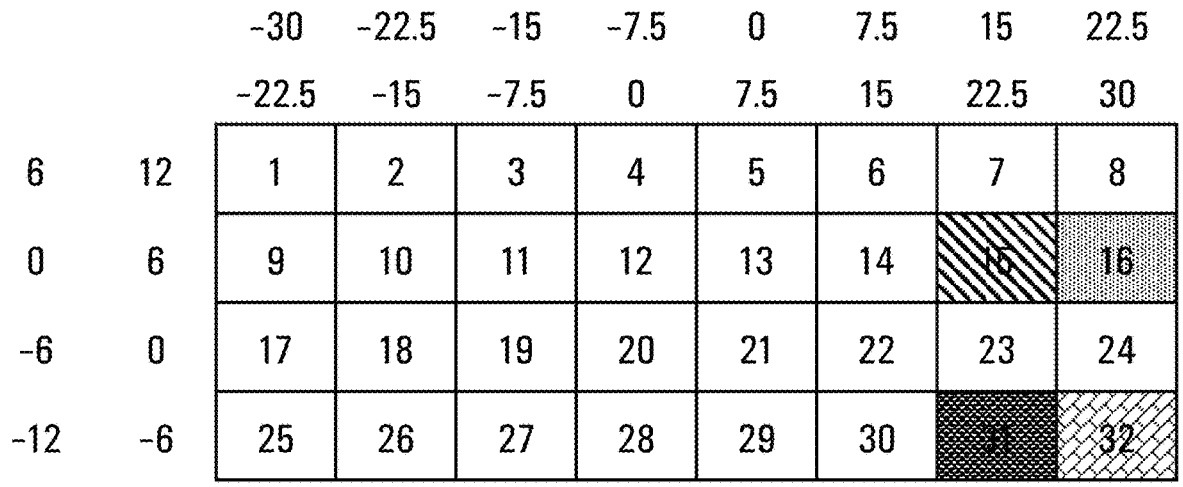
Figure 38A:
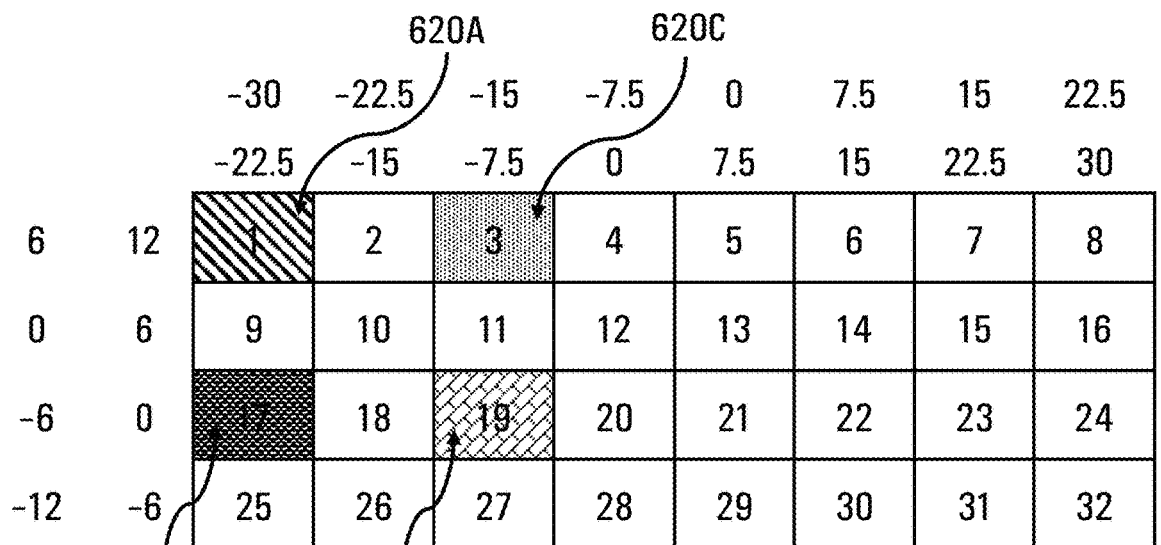
FIGS. 38A, 38B and 38C show further examples of 2D multi-beam scanning that may be done by the LIDAR apparatus of FIG. 30B over a 60°×24° segmented FoV when multi-beam light source of the transmitter stage and the sensor unit of the receiver stage are configured in accordance with FIG. 34.
Figure 38B:
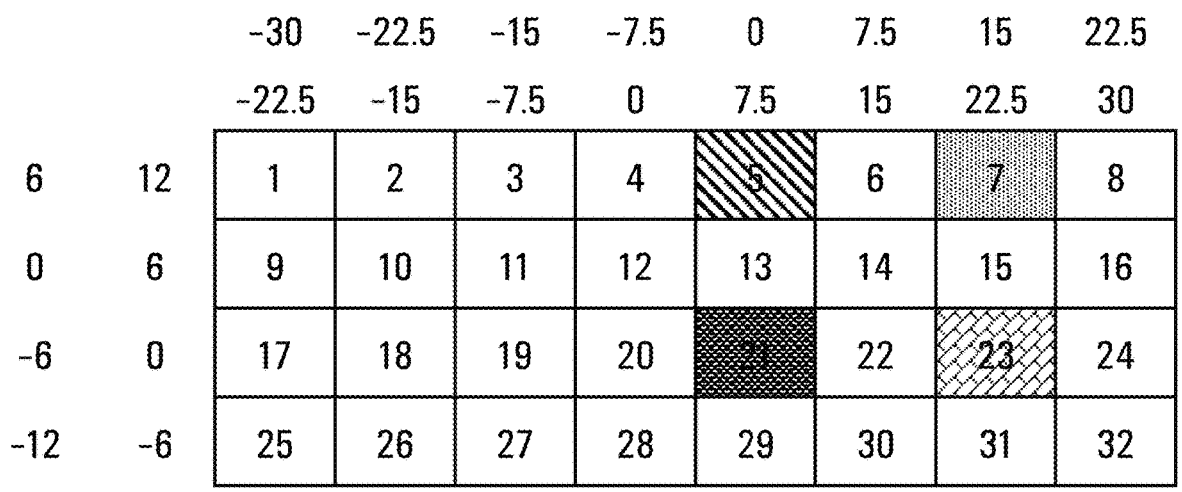
Figure 38C:
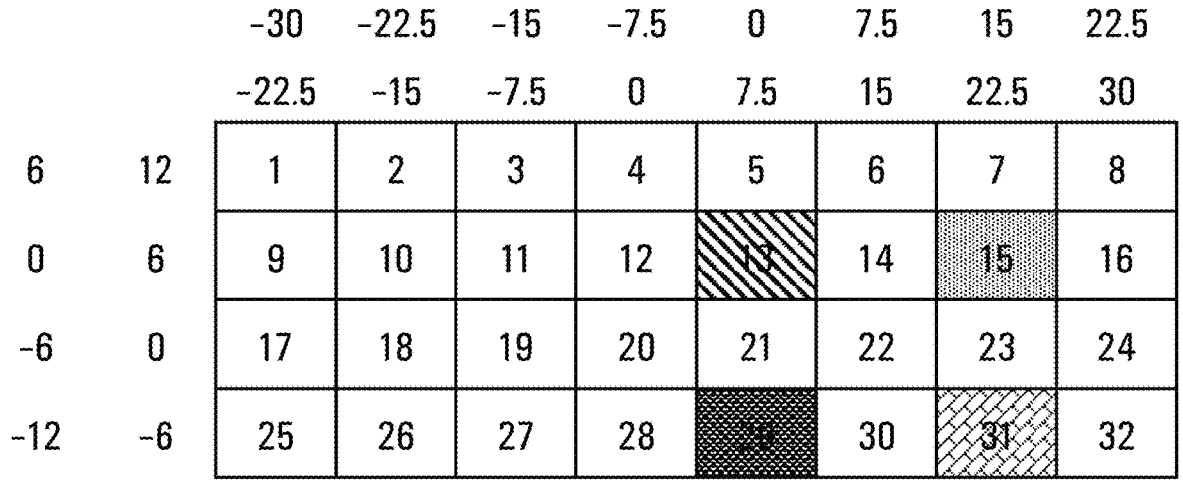

FIGS. 33A, 33B and 33C show a field of view of the LIDAR apparatus 600 of FIG. 30B divided into selectable tiles resulting from the 2D beam steering angles that are possible using the multi-stage LCPG beam steering element 606. In particular, FIGS. 33A, 33B and 33C show examples of the light beams 620A and 620C being steered to different selectable tiles within the segmented field of view of the LIDAR apparatus 600 of FIG. 30B. In FIG. 33A, the LCPG beam steering element 606 is configured to steer the light beam 620A to tile 1 within the field of view, which in this case corresponds to a deflection of +9° vertically and −26.25° horizontally relative to the original direction of propagation of the light beam 620A. This configuration of the LCPG beam steering element 606 steers the light beam 620C to tile 3 within the field of view, which in this case corresponds to a deflection of +9° vertically and −26.25° horizontally relative to the original direction of propagation of the light beam 620C. In contrast, FIGS. 33B and 33C show two other steering angle configurations of the LCPG beam steering element 606 in which the LCPG beam steering element 606 is configured to steer the light beam 620A to tile 5 and tile 29, respectively, and to steer the light beam 620C to tile 7 and tile 31, respectively. In this example tiles 5 and 7 correspond to a deflection of +9° vertically and +3.75° horizontally for the light beams 620A and 620C, and tiles 29 and 31 corresponds to a deflection of −9° vertically and +3.75° horizontally for light beams 620A and 620C.

In the example embodiments of the LIDAR apparatus 600 in FIGS. 26A and 26B, the directions of propagations of the two light beams 620A and 620B are offset in the vertical direction, and in the example embodiments of the LIDAR apparatus 600 in FIGS. 30A and 30B, the directions of propagations of the light beams 620A and 620C are offset in the horizontal direction. In other embodiments, the components of the transmitting stage, beam steering engine and receiving stage of the LIDAR apparatus 600 may be configured to work with two light beams that are emitted from the transmitting stage with directions of propagations that are offset in the horizontal direction and the vertical direction. For example, referring again to the embodiment shown in FIG. 26A, in some implementations the direction of propagation of the second light beam 620B may be offset by −7.5° in the horizontal direction as well as by −6° in the vertical direction relative to the direction of propagation of the first light beam 620A.

In another possible embodiment, the LIDAR apparatus 600 may be configured to work with four light beams having directions of propagation that are horizontally and vertically offset from one another such that when the LCPG beam steering element 606 deflects the incident beams they are each steered to a different tile within the segmented FoV of the LIDAR apparatus. FIG. 31 shows an example configuration of a light source 602 and an optical receiver 608 that may be used in such embodiments. In this example, the light source 602 includes two 16-channel laser light sources 605₁ and 605₂. The two 16-channel laser light sources 605₁ and 605₂, in combination with the optics 604, are configured such that the light source 602 emits four light beams 620A, 620B, 620C and 620D that have directions of propagation that are offset from one another in the horizontal direction and/or the vertical direction. In this configuration, the light beam 620A may be emitted by any of the first eight laser channels 605A of the 16-channel laser light source 605₁, the light beam 620B may be emitted by any of the second eight laser channels 605B of the 16-channel laser light source 605₁, the light beam 620C may be emitted by any of the first eight laser channels 605C of the 16-channel laser light source 605₂, and the light beam 620D may be emitted by any of the second eight laser channels 605D of the 16-channel laser light source 605₂.

In this example, the optical receiver 608 includes four sensor units 609A, 609B, 609C and 609D that each include a 2×32 APD array. In this configuration, laser channels 1-4 of laser light source 605₁ optically correspond to the top 1×32 APDs of the sensor unit 609A, laser channels 5-8 of the laser light source 605₁ optically correspond to the bottom 1×32 APDs of the sensor unit 609A, laser channels 1-4 of laser light source 605₂ optically correspond to the top 1×32 APDs of the sensor unit 609C, laser channels 5-8 of laser light source 605₂ optically correspond to the bottom 1×32 APDs of the sensor unit 609C, laser channels 9-12 of laser light source 605₁ optically correspond to the top 1×32 APDs of the sensor unit 609B, laser channels 13-16 of the laser light source 605₁ optically correspond to the bottom 1×32 APDs of the sensor unit 609B, laser channels 9-12 of laser light source 605₂ optically correspond to the top 1×32 APDs of the sensor unit 609D, and laser channels 13-16 of laser light source 605₂ optically correspond to the bottom 1×32 APDs of the sensor unit 609D.

FIGS. 35A-35C, 36A-36C, 37A-37C and 38A-38C show examples of the light beams 620A, 620B, 620C and 620D being steered to different selectable tiles within the segmented field of view of the LIDAR apparatus 600. The following table summarizes, for each of FIGS. 35A-35C, 36A-36C, 37A-37C and 38A-38C, the initial nominal directions of propagation of the light beams 620A, 620B, 620C and 620D before being deflected by the LCPG beam steering element 606, and also indicates the vertical and horizontal deflection angles applied by LCPG beam steering element to achieve the altered directions of propagation of the light beams 620A, 620B, 620C and 620 shown in those Figures.

| | Initial Direction of Propagation (V°; H°) | | | | LCPG |
|---|---|---|---|---|---|
| | Light beam 620A | Light beam 620B | Light beam 620C | Light beam 620D | Deflection Angle (V°; H°) |
| FIG. 35A | (0°; 0°) | (−6°; 0°) | (0°; +7.5°) | (−6°; +7.5°) | (+9°; −11.25°) |
| FIG. 35B | (0°; 0°) | (−6°; 0°) | (0°; +7.5°) | (−6°; +7.5°) | (+9°; +3.75°) |
| FIG. 35C | (0°; 0°) | (−6°; 0°) | (0°; +7.5°) | (−6°; +7.5°) | (−9°; +18.75°) |
| FIG. 36A | (0°; 0°) | (−6°; +0°) | (0°; +15°) | (−6°; +15°) | (+9°; −26.25°) |
| FIG. 36B | (0°; 0°) | (−6°; +0°) | (0°; +15°) | (−6°; +15°) | (+9°; +3.75°) |
| FIG. 36C | (0°; 0°) | (−6°; +0°) | (0°; +15°) | (−6°; +15°) | (−9°; +3.75°) |
| FIG. 37A | (0°; 0°) | (−12°; 0°) | (0°; +7.5°) | (−12°; +7.5°) | (+9°; −11.25°) |
| FIG. 37B | (0°; 0°) | (−12°; 0°) | (0°; +7.5°) | (−12°; +7.5°) | (+9°; +3.75°) |
| FIG. 37C | (0°; 0°) | (−12°; 0°) | (0°; +7.5°) | (−12°; +7.5°) | (+3°; +18.75°) |
| FIG. 38A | (0°; 0°) | (−12°; 0°) | (0°; +15°) | (−12°; +15°) | (+9°; −26.25°) |
| FIG. 38B | (0°; 0°) | (−12°; 0°) | (0°; +15°) | (−12°; +15°) | (+9°; +3.75°) |
| FIG. 38C | (0°; 0°) | (−12°; 0°) | (0°; +15°) | (−12°; +15°) | (+3°; +3.75°) |

As shown in FIGS. 35-38, in these embodiments the 60°×24° FoV is divided into 8×4 tiles and the LIDAR apparatus 600 is able to steer the light beams 620A, 620B, 620C and 620D to illuminate all of the 8×4 tiles within the 60°×24° FoV by transitioning the LCPG beam steering element 606 between eight steering angles such that at each of the eight steering angles the set of four light beams 620A, 620B, 620C and 620D illuminate a different set of four tiles within the 60°×24° FoV. For example, with reference to the example depicted in FIGS. 38A-38C, in that example the LIDAR apparatus 600 can illuminate all of the 8×4 tiles within the 60°×24° FoV by selectively controlling the LCPG beam steering element 606 to apply the following eight deflections (V°; H°) to the light beams 620A, 620B, 620C and 620D: (+9°; −26.25°); (+9°; −18.75°); (+9°; +3.75°); (+9°; +11.25°); (+3°; −26.25°); (+3°; −18.75°); (+3°; +3.75°); (+3°; +11.25°).

Redundancy Protection

In the LIDAR apparatuses 600 described above with reference to FIGS. 26-38, multiple laser light sources and/or multiple optical receiver sensor units are utilized for multi-beam scanning over multiple tiles in the segmented FoV of the LIDAR apparatus. Examples of implementations in which multiple laser light sources and/or multiple optical receiver sensor units are utilized to provide other advantages, such as to provide back-up redundancy, prolong the useful lifetime of one or more components or increase the vertical or horizontal resolution of the LIDAR apparatus, will now be described with reference to FIGS. 39 to 47.

Figure 39:
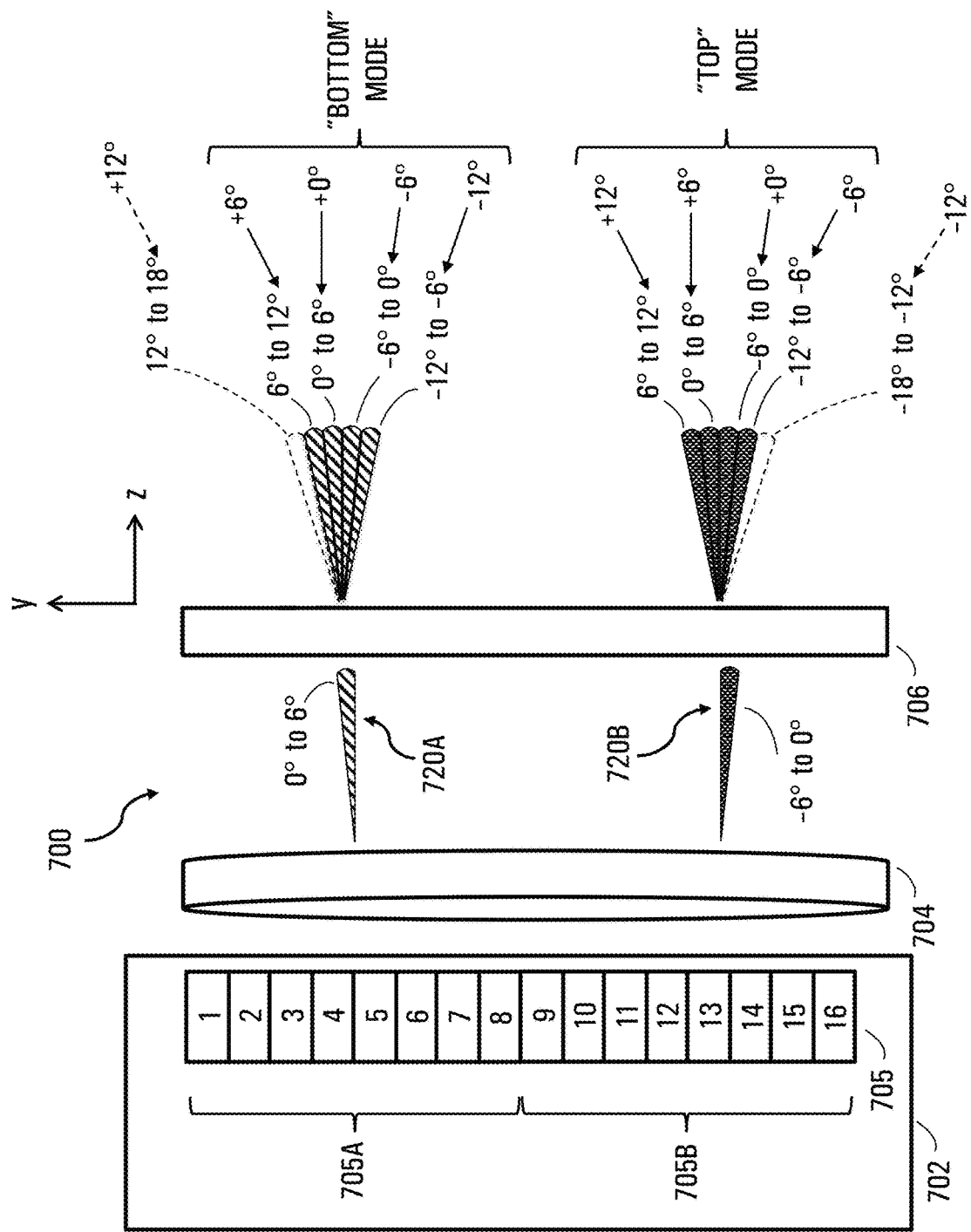
FIG. 39 shows a side on view of a LIDAR apparatus that can be selectively switched between vertical scanning modes to provide redundancy protection against light source failure.

For example, FIG. 39 shows a side on view of a LIDAR apparatus 700 that includes a multi-beam transmitting stage configured to emit multiple light beams offset at different vertical angles and a 2D beam steering engine that may be used to implement a field of view divided in tiles similar to the segmented field of view shown in FIG. 11. A number of components of the LIDAR apparatus 700 have been omitted from the illustration in the interest of clarity.

The transmitting stage of the LIDAR apparatus 700 includes a laser source 702 and associated optics 704. The 2D beam steering engine of the LIDAR apparatus 700 includes a multi-stage LCPG beam steering element 706 and the tiles of the segmented field of view implemented by the LIDAR apparatus correspond to the 2D steering angles that are possible using the LCPG beam steering element 706. In particular, in this example each tile of the multi-stage LCPG beam steering element 706 has a nominal FoV of 7.5°×6.0° (Horizontal×Vertical) for a given steering direction or tile and a full FoV of 60°×30° that includes five rows of eight tiles each, for a total of forty 7.5°×6.0° tiles. However, as discussed in further detail below, although the LCPG beam steering element 706 is capable of implementing a field of view divided into 8×5 (Horizontal×Vertical) tiles, the LIDAR apparatus 700 may be operated in modes in which only four rows of the five available rows of tiles are used in a given mode and the fifth available row of tiles is utilized for redundancy protection.

In this example, the light source 702 includes a 16-channel laser light source 705. The first eight channels 705A and the second eight channels 705B of the 16-channel laser light source 705, in combination with the optics 704, are configured to emit light beams 720A and 720B that are incident on the LCPG beam steering element 706 at different vertical angles. In particular, in this example the directions of propagation of the light beams 720A and 720B are offset relative to one another in the vertical direction by 6°, which is equal to the vertical steering angle offset between vertically adjacent tiles in the segmented FoV. In particular, in the example implementation shown in FIG. 39, the light beam 720A emitted by one of the first eight laser channels 705A is incident on the LCPG beam steering element 606 at +3° in the vertical/elevation direction, whereas the second light beam 720B emitted by one of the second eight laser channels 705B is incident on the LCPG beam steering element 706 at −3° in the vertical/elevation direction. As such, when the two light beams 720A and 720B are subjected to deflection by the LCPG beam steering element 706 they are steered to vertically adjacent tiles within the segmented FoV implemented by the steering of the LCPG beam steering element 606 because the tiles are also offset from one another by 6° in the vertical direction. As a result, as shown in FIG. 39, if the LCPG beam steering element 706 is configured to deflect by +6° in the vertical direction, the first light beam 720A would be steered to a tile corresponding to 6° to 12° in the vertical direction and the second light beam 670B would be steered to a tile corresponding to 0° to 6° in the vertical direction.

This configuration can be used to provide redundancy protection against laser light source failure for a 60°×24° (Horizontal×Vertical) FoV. For example, the LIDAR apparatus 700 may be configured to alternatively operate in either:
- a "Bottom" mode in which the first eight laser channels 705A are used to emit light beams like the light beam 720A that are steerable over the −12° to +12° vertical extent of the 60°×24° FoV using the "bottom" four of the five available rows of tiles; or
- a "Top" mode in which the second eight laser channels 705B are used to emit light beams like the light beam 720B that are steerable over the −12° to +12° vertical extent of the 60°×24° FoV using the "top" four of the five available rows of tiles.

If the LIDAR apparatus is operating in "Bottom" mode and a failure or other issue related to the first eight laser channels 705A is detected, the LIDAR apparatus 700 may be switched to the "Top" mode in order to switch from using the first eight laser channels 705A to using the second eight laser channels 705B, which may allow the LIDAR apparatus 700 to continue functioning despite the failure/issue related to the first eight laser channels 705A. Similarly, the LIDAR apparatus 700 may switch from "Top" mode to "Bottom" mode in the event that a failure/issue related to the second eight laser channels 705B is detected. The switch from "Bottom" mode to "Top" mode or vice versa may occur for reasons other than failure/issue detection. For example, switching between the two modes on an occasional or regular basis may allow for extended service/replacement intervals for the laser source 702 because the alternating use of the two sets of eight laser channels 705A and 705B may allow them to last longer than if a single 8-channel laser were used continuously whenever the LIDAR apparatus was operated.

Figure 40:
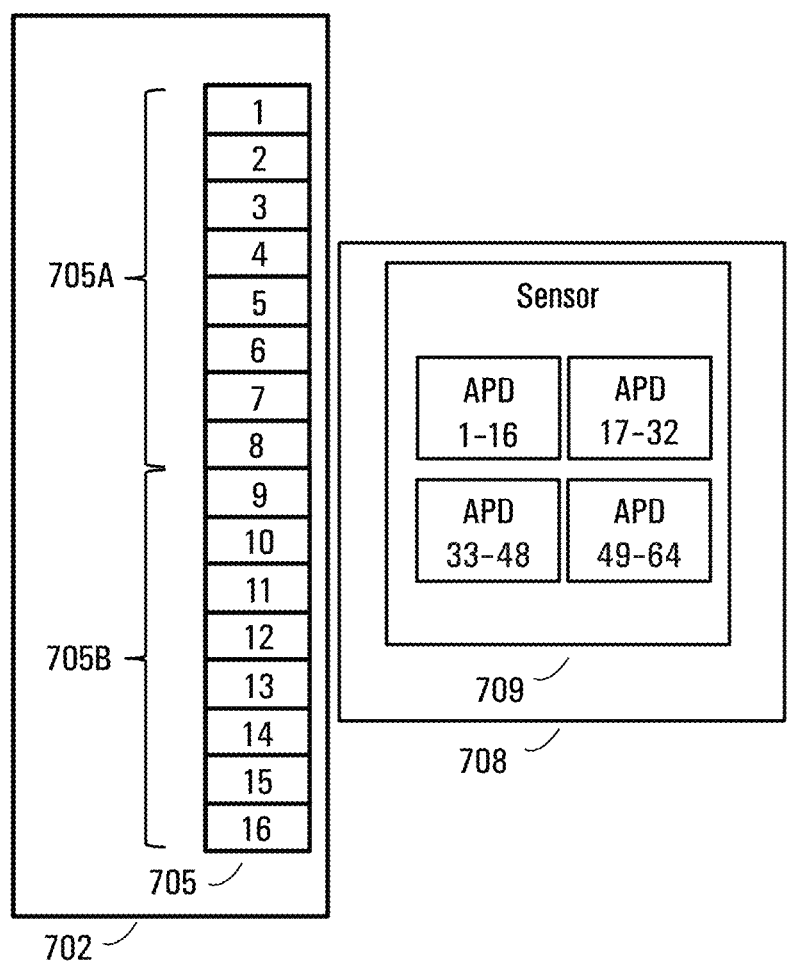
FIG. 40 shows an example configuration of a multi-beam light source of the transmitter stage and the sensor unit of the receiver stage of the LIDAR apparatus of FIG. 39.

In the LIDAR apparatus 700 two of the first eight laser channels 705A and two of the second eight laser channels 605B may be fired at the same time, such that optical impulses from alternating pairs of laser channels of the first eight laser channels 605A and alternating pairs of laser channels of the second eight laser channels 605B are transmitted according to a particular firing sequence. In such embodiments, an optical receiver 708 of the LIDAR apparatus 700 may be implemented by two arrays of APDs that are each arranged in a 2×32 array configuration. FIG. 40 shows an example of such a configuration of an optical receiver 708 that includes a sensor unit 709 implementing a 2×32 APD array. In this example, the firing sequence may be such that, when the LIDAR apparatus 700 is operated in "Bottom" mode, the following pairs of laser channels may be fired together: 1 and 5; 2 and 6; 3 and 7; and 4 and 8. Similarly, when the LIDAR apparatus 700 is operated in "Top" mode, the following pairs of laser channels may be fired together: 9 and 13; 10 and 14; 11 and 15; and 12 and 16. Other variations are possible and are contemplated within the scope of the present disclosure. In this configuration, laser channels 1-4 and 9-12 optically correspond to the top 1×32 APDs of the sensor unit 709, and laser channels 5-8 and 13-16 optically correspond to the bottom 1×32 APDs of the sensor unit 709.

Figure 41A:
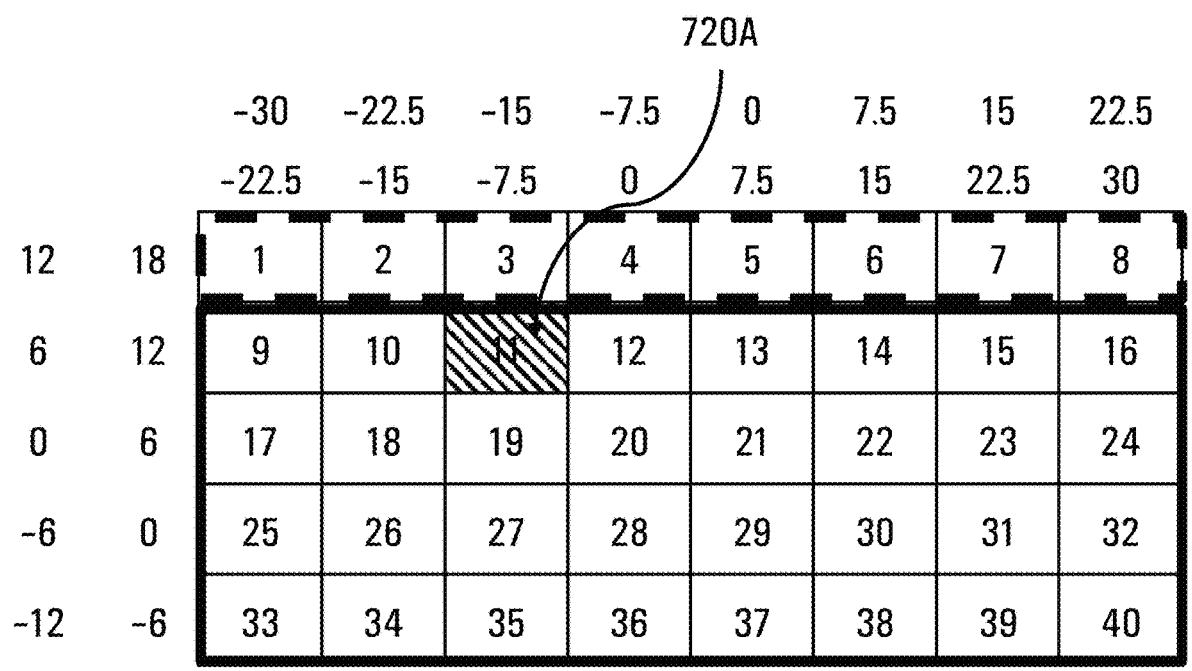
FIG. 41A shows a field of view of the LIDAR apparatus of FIG. 39 divided into selectable tiles resulting from the 2D beam steering angles that are possible using the multi-stage LCPG beam steering element when the LIDAR apparatus 700 is operated in a first mode.
Figure 41B:
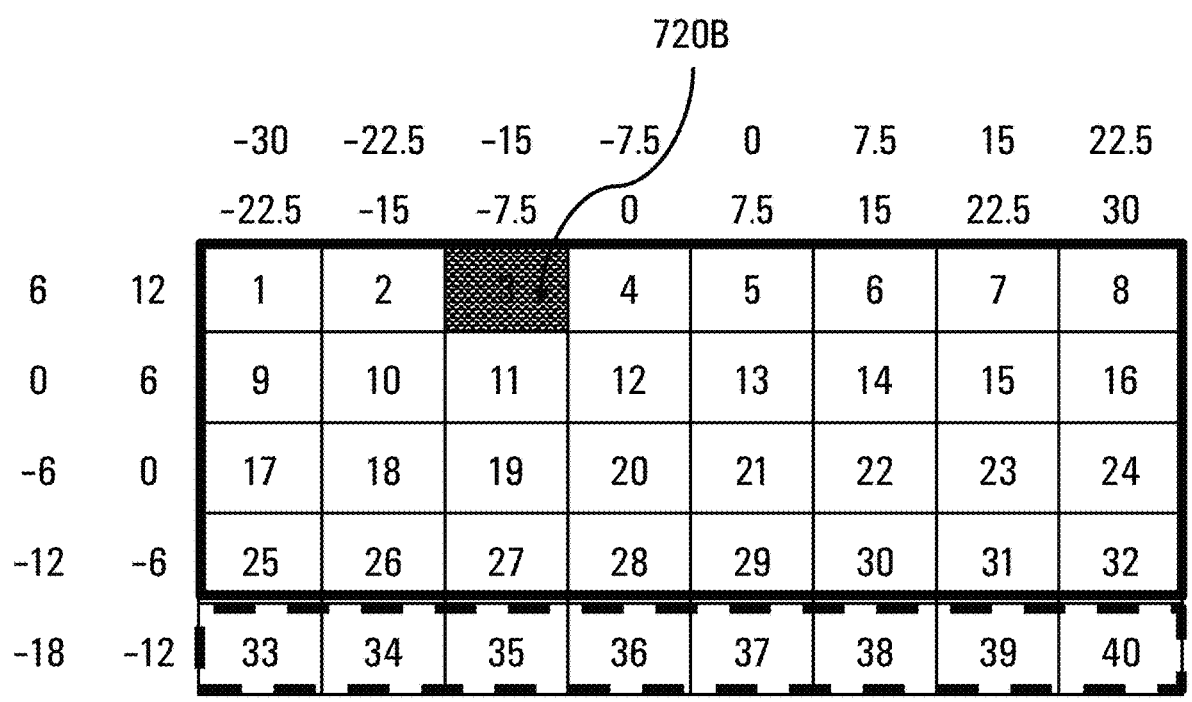
FIG. 41B shows a field of view of the LIDAR apparatus of FIG. 39 divided into selectable tiles resulting from the 2D beam steering angles that are possible using the multi-stage LCPG beam steering element when the LIDAR apparatus 700 is operated in a second mode.

FIGS. 41A and 41B show a field of view of the LIDAR apparatus 700 divided into selectable tiles resulting from the 2D beam steering angles that are possible using the multi-stage LCPG beam steering element 706. In particular, FIG. 41A shows the FoV of the LIDAR apparatus 700 when it is operated in "Bottom" mode, in which the bottom four rows of tiles are used to scan light beams 720A from the first eight laser channels 705A over the FoV. As shown in FIG. 41A, the top row of tiles, which includes tiles 1 to 8, is not used in "Bottom" mode. In contrast, FIG. 41B shows the FoV of the LIDAR apparatus 700 when it is operated in "Top" mode, in which the top four rows of tiles are used to scan light beams 720B from the second eight laser channels 705A over the FoV. As shown in FIG. 41B, the bottom row of tiles, which includes tiles 33 to 40, is not used in "Top" mode.

Furthermore, as shown in FIGS. 41A and 41B, when the LIDAR apparatus 700 is operated in "Bottom" mode, tile 11 (corresponding to a vertical deflection of +6°) is used to steer the light beam 720A to the segment of the FoV corresponding to a vertical direction of +9° and a horizontal direction of −11.25°, whereas when the LIDAR apparatus is operated in "Top" mode, tile 3 (corresponding to a vertical deflection of +12°) is used to steer the light beam 720B to that same segment of the FoV.

Figure 42:
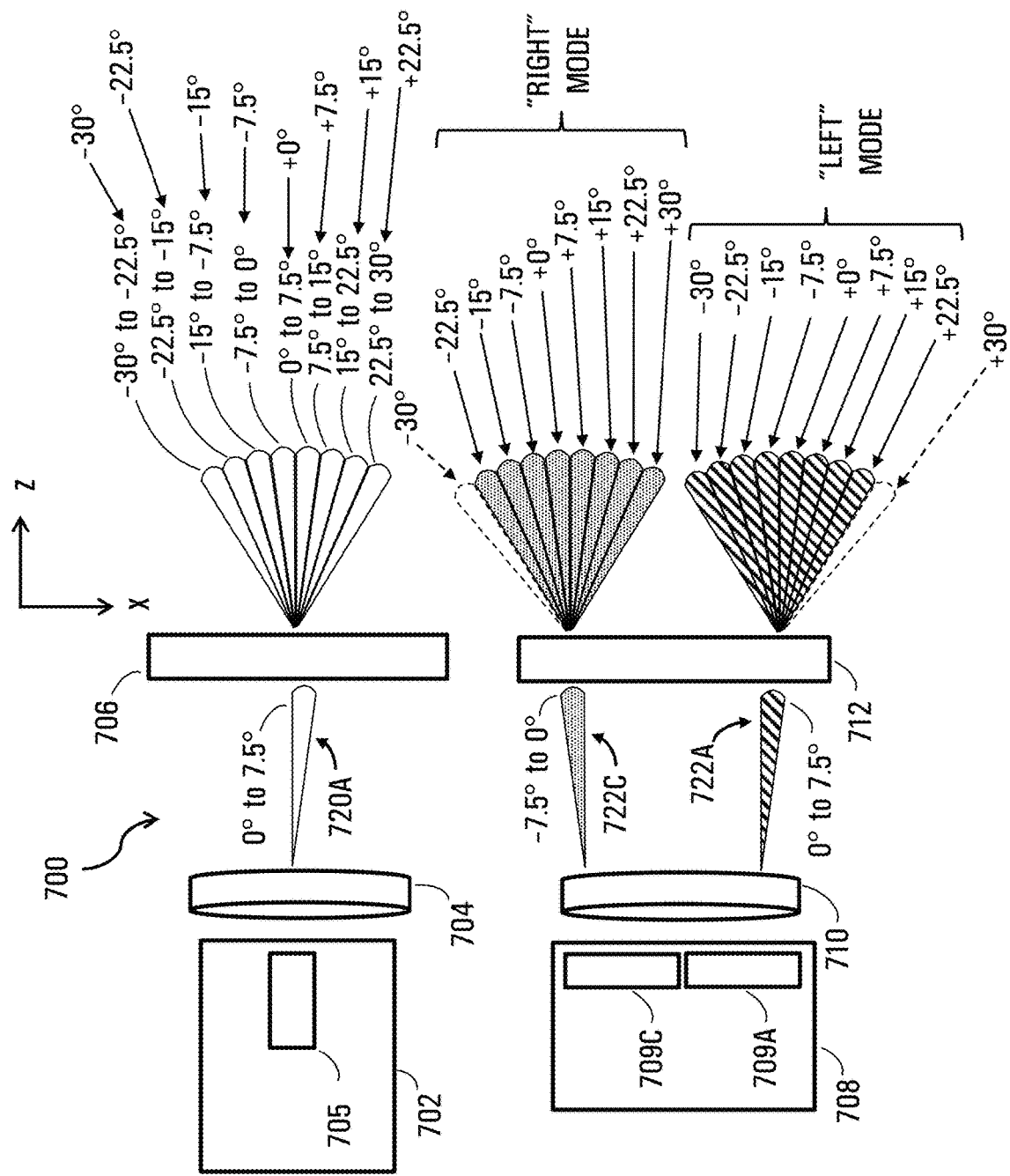
FIG. 42 shows a top down view of a LIDAR apparatus that can be selectively switched between horizontal scanning modes to provide redundancy protection against sensor failure.

In the LIDAR apparatus 700 of FIG. 39, the two sets of laser channels 705A and 705B and the inclusion of an additional row of tiles in the LCPG beam steering element 706 can be leveraged to provide redundancy protection against laser channel failure, e.g., if one or more laser channels fails in one of the two sets, the LIDAR apparatus can switch to using the other set of laser channels. This concept of utilizing duplicate components to provide redundancy protection can also be applied elsewhere in a LIDAR apparatus. For example, FIG. 42 shows a top down view of another LIDAR apparatus 700 that includes a transmitting stage, a 2D beam steering engine that may be used to implement a FoV divided in tiles similar to the segmented field of view shown in FIG. 11, and a receiving stage that includes duplicate optical sensors that can be selectively switched between to provide redundancy protection against sensor failure. As in the previous Figures, a number of components of the LIDAR apparatus 700 have been omitted from the illustration in FIG. 42 in the interest of clarity.

As shown in FIG. 42, the transmitting stage of the LIDAR apparatus 700 includes a laser source 702 and associated optics 704. The 2D beam steering engine of the LIDAR apparatus 700 in FIG. 42 includes a first multi-stage LCPG beam steering element 706 for steering light beams emitted by the laser source 702. The tiles of a segmented field of emission (FoE) implemented by the LIDAR apparatus correspond to the 2D steering angles that are possible using the LCPG beam steering element 706. In this example each tile of the multi-stage LCPG beam steering element 706 has a nominal FoE of 7.5°×6.0° (Horizontal×Vertical) for a given steering direction or tile and a full FoE of 60°×24° that includes four rows of eight tiles each, for a total of thirty-two 7.5°×6.0° tiles. In FIG. 42, the 2D beam steering engine of the LIDAR apparatus 700 also includes a second multi-stage LCPG beam steering element 712 for steering reflected light beams from a scene illuminated by the FoE so that they can be received by the receiving stage of the LIDAR apparatus. The tiles of a segmented field of regard (FoR) implemented by the LIDAR apparatus correspond to the 2D steering angles that are possible using the LCPG beam steering element 712. The field of view of the LIDAR apparatus 700 is the field of overlap between the FoE and FoR. In this example each tile of the second multi-stage LCPG beam steering element 712 has a nominal FoR of 7.5°×6.0° and a full FoR of 67.5°×30° that includes four rows of nine tiles each, for a total of thirty-six 7.5°×6.0° tiles. However, as discussed in further detail below, although the second LCPG beam steering element 712 is capable of steering over 9×4 (Horizontal×Vertical) tiles, the LIDAR apparatus 700 may be operated in modes in which only eight columns of the nine available columns of tiles are used in a given mode and the ninth available column of tiles is utilized for redundancy protection.

In this example, the light source 702 includes an 8-channel laser light source 705. The 8-channel laser light source 705, in combination with the optics 704, is configured to emit light beams 720A that are incident on the first LCPG beam steering element 706 at +3.75° in the horizontal/ azimuth. As a result, as shown in FIG. 42A, by configuring the first LCPG beam steering element 706 to selectively deflect light beam 720 by one of the following eight horizontal deflection angles: −30°, −22.5°, −15, −7.5°, +0°, +7.5, +15, +22.5°, it is possible to steer the light beam 720A to tiles corresponding to horizontal directions of −26.25°, −18.75°, −11.25°, −3.75°, +3.75°, +11.25°, +18.75, and +26.25°, respectively, in the FoE of the LIDAR apparatus.

The receiving stage of the LIDAR apparatus 700 of FIG. 42 includes an optical receiver 708 and associated optics 710. The optical receiver 708 includes two sensor units 709A and 709C. As noted above, the second LCPG beam steering element 712 is controllable to steer reflected light beams from the FoE of the LIDAR apparatus so that they can be received by the receiving stage. In this example the second LCPG beam steering element 712 and the receiving stage of the LIDAR apparatus 700, including the optical receiver 708 and associated optics 710, are configured such that the two sensor units 709A and 709C optically correspond to different tiles in the segmented FoV of the LIDAR apparatus. In particular, the two sensor units 709A and 709C, via associated optics 710, are optically offset in the horizontal direction by 7.5°, which is equal to the horizontal steering angle offset between horizontally adjacent tiles in the segmented FoR implemented by the second LCPG beam steering element 712. Conceptually, this means that the two sensor units 709A and 709C have fields of regard through the second LCPG beam steering element 712 that are horizontally offset from one another by one tile. For example, when the second LCPG beam steering element 712 is configured such that the sensor unit 709A "sees" a tile corresponding to −15° to −7.5° in the horizontal direction of the FoV, the sensor until 709C would "see" the horizontally adjacent tile corresponding to −22.5° to −15°.

This configuration can be used to provide redundancy protection against sensor failure for a 60°×24° (Horizontal× Vertical) FoV. For example, the LIDAR apparatus 700 of FIG. 42 may be configured to alternatively operate in either:

a "Left" mode in which the sensor unit 709A is used to scan over the −30° to +30° horizontal extent of the 60°×24° FoV using the "left" eight of the nine available rows of tiles of the full 67.5°×24° FoR of the LCPG beam steering element 712, or a "Right" mode in which the sensor unit 709C 709A is used to scan over the −30° to +30° horizontal extent of the 60°×24° FoV using the "right" eight of the nine available rows of tiles of the full 67.5°×24° FoR of the LCPG beam steering element 712.

If the LIDAR apparatus of FIG. 42 is operating in "Left" mode and a failure or other issue related to the sensor unit 709A is detected, the LIDAR apparatus may be switched to the "Right" mode in order to switch from using the sensor unit 709A to using the sensor unit 709C, which may allow the LIDAR apparatus to continue functioning despite the failure/issue related to the sensor unit 709A. Similarly, the LIDAR apparatus 700 may switch from "Right" mode to "Left" mode in the event that a failure/issue related to the sensor unit 709C is detected. The switch from "Left" mode to "Right" mode or vice versa may occur for reasons other than failure/issue detection. For example, switching between the two modes on an occasional or regular basis may allow for extended service/replacement intervals for the sensor units because the alternating use of the two sensor units may allow them to last longer than if a single sensor unit were used continuously whenever the LIDAR apparatus is operated. Here it is noted that the sensor units 709A and 709C need not be separate units. For example, in some cases the sensor units 709A and 709C may be implemented as arrays of sensor elements (e.g., APDs) that may be included on a single physical sensor unit.

In the LIDAR apparatus 700 of FIG. 42, two of the laser channels of the 8-channel laser light source 705 may be fired at the same time, such that optical impulses from alternating pairs of laser channels are transmitted according to a particular firing sequence. In such embodiments, each of the sensor units 709A and 709C may be implemented by an array of APDs arranged in a 2×32 array configuration, whereby, each of the two sets of 1×32 APDs of the sensor unit 709A or 709C that is used in a given mode (e.g., sensor unit 709A in the "Left" mode and sensor 709C in "Right" mode) measures one horizontal segment of the segmented FoV for one of the two lasers fired at a given time.

Figure 43:
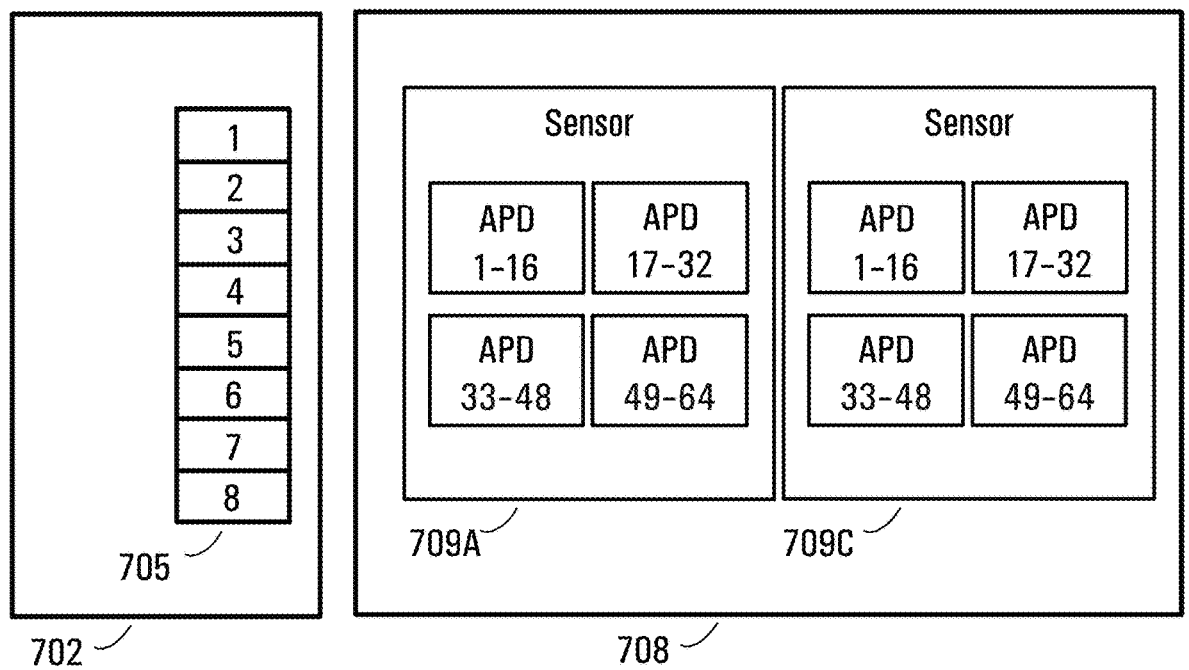
FIG. 43 shows an example configuration of the light source of the transmitter stage and the sensor unit of the receiver stage of the LIDAR apparatus of FIG. 42.
Figure 45:
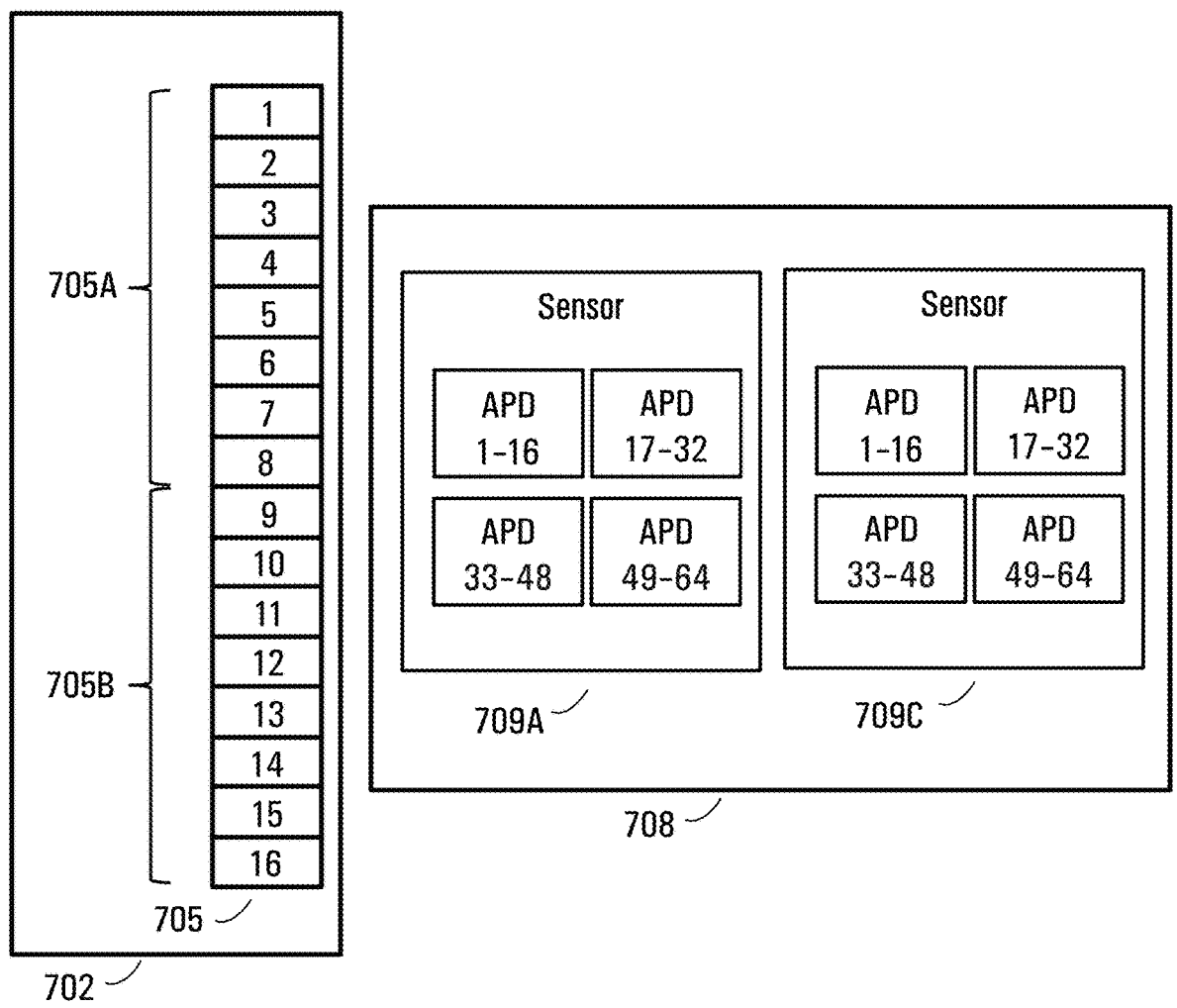
FIG. 45 shows an example of an alternative configuration of the light source and the optical receiver of the LIDAR apparatus of FIG. 42.

FIG. 43 shows an example of such a configuration of an optical receiver 708 that includes two sensor units 709A and 709C that each include a 2×32 APD array. In this example, the firing sequence may be such that the following pairs of laser channels may be fired together: 1 and 5; 2 and 6; 3 and 7; and 4 and 8. Other variations are possible and are contemplated within the scope of the present disclosure. In this configuration, when the LIDAR apparatus is operated in "Left" mode, the LCPG beam steering element 712 is configured so that laser channels 1-4 optically correspond to the top 1×32 APDs of the sensor unit 709A, and laser channels 5-8 optically correspond to the bottom 1×32 APDs of the sensor unit 709A. Similarly, when the LIDAR apparatus is operated in "Right" mode, the LCPG beam steering element 712 is configured so that laser channels 1-4 optically correspond to the top 1×32 APDs of the sensor unit 709C, and laser channels 5-8 optically correspond to the bottom 1×32 APDs of the sensor unit 709C.

FIG. 44A shows a FoE of the LIDAR apparatus 700 divided into selectable tiles resulting from the 2D beam steering angles that are possible using the multi-stage LCPG beam steering element 706. FIGS. 44B and 44C show the corresponding FoR of the LIDAR apparatus divided into selectable tiles resulting from the 2D beam steering angles that are possible using the multi-stage LCPG beam steering element 712. In particular, FIG. 44B shows the FoR of the LIDAR apparatus 700 when it is operated in "Left" mode, in which the eight leftmost columns of tiles of the LCPG beam steering element 712 are used to scan over the FoV. As shown in FIG. 44B, the ninth column of tiles, which includes tiles 9, 18, 27 and 36, is not used in "Left" mode. In contrast, FIG. 44C shows the FoR of the LIDAR apparatus 700 when it is operated in "Right" mode, in which the eight rightmost rows of tiles of the LCPG beam steering element 712 are used to scan over the FoV. As shown in FIG. 44C, the first column of tiles, which includes tiles 1, 10, 19 and 28 is not used in "Left" mode.

In this way, the "Left" mode using the sensor unit 709A and the "Right" mode using the sensor unit 709C are able to implement the same horizontal FoV using adjacent tiles of the LCPG beam steering element 712. For example, in FIG. 44A, it is assumed that tile 3 of the LCPG beam steering element 706 (corresponding to a −15° horizontal deflection of light beam 720A in this example) is used to steer the light beam 720A to the segment of the FoV corresponding to a vertical direction of +9° and a horizontal direction of −11.25°. Furthermore, as shown in FIGS. 44B and 44C, when the LIDAR apparatus 700 is operated in "Left" mode (FIG. 44A), tile 3 of the LCPG beam steering element 712 (corresponding to a −15° horizontal deflection) is used to steer the nominal 7.5°×6° FoR 722A of the sensor unit 709A to the segment of the FoV corresponding to a vertical direction of +9° and a horizontal direction of −11.25°, whereas when the LIDAR apparatus is operated in "Right" mode (FIG. 44B), tile 4 of the LCPG beam steering element 712 (corresponding to a −7.5° horizontal deflection) is used to steer the nominal 7.5°×6° FoR 722C of the sensor unit 709C to that same segment of the FoV.

The LIDAR apparatus 700 of FIG. 39 includes two sets of laser channels 705A and 705B and an additional row of tiles in the LCPG beam steering element 706 to provide redundancy protection against laser channel failure. In the LIDAR apparatus 700 of FIG. 42, two sensor units 709A and 709C and an additional column of tiles in the LCPG beam steering element 712 are used to provide redundancy protection against sensor failure. In some embodiments, features of the LIDAR apparatus 700 of FIG. 39 and the LIDAR apparatus 700 of FIG. 42 may be combined to provide to provide redundancy protection against sensor failure and laser failure. For example, if the laser source 702 and the LCPG beam steering element 706 of the LIDAR apparatus shown in FIG. 42 are modified so that the laser source 702, in combination with the optics 704, is configured to emit light beams 720A and 720B that are incident on the LCPG beam steering element 706 at different vertical angles and the LCPG beam steering element 706 includes an additional row of tiles, then the resulting LIDAR apparatus 700 could potentially be switched between the following four modes to provide redundancy protection against sensor failure and/or laser failure:

a "Bottom-Left" mode in which:
  the first eight laser channels 705A are used to emit light beams 720A that are steerable over the −12° to +12° vertical extent of the 60°×24° FoV using the "bottom" four of the five available rows of the full 60°×30° FoE of the LCPG beam steering element 706; and
  the sensor unit 709A is used to scan over the −30° to +30° horizontal extent of the 60°×24° FoV using the "left" eight of the nine available rows of tiles of the full 67.5°×24° FoR of the LCPG beam steering element 712;

a "Bottom-Right" mode in which:
  the first eight laser channels 705A are used to emit light beams 720A that are steerable over the −12° to +12° vertical extent of the 60°×24° FoV using the "bottom" four of the five available rows of the full 60°×30° FoE of the LCPG beam steering element 706; and
  the sensor unit 709C is used to scan over the −30° to +30° horizontal extent of the 60°×24° FoV using the "right" eight of the nine available rows of tiles of the full 67.5°×24° FoR of the LCPG beam steering element 712;

a "Top-Left" mode in which:
  the second eight laser channels 705B are used to emit light beams like the light beam 720B that are steerable over the −12° to +12° vertical extent of the 60°×24° FoV using the "top" four of the five available rows of tiles of the full 60°×30° FoE of the LCPG beam steering element 706; and
  the sensor unit 709A is used to scan over the −30° to +30° horizontal extent of the 60°×24° FoV using the "left" eight of the nine available rows of tiles of the full 67.5°×24° FoR of the LCPG beam steering element 712;

"Top-Right" mode in which:
  the second eight laser channels 705B are used to emit light beams like the light beam 720B that are steerable over the −12° to +12° vertical extent of the 60°×24° FoV using the "top" four of the five available rows of tiles of the full 60°×30° FoE of the LCPG beam steering element 706; and
  the sensor unit 709C is used to scan over the −30° to +30° horizontal extent of the 60°×24° FoV using the "right" eight of the nine available rows of tiles of the full 67.5°×24° FoR of the LCPG beam steering element 712.

Increased Resolution

Referring again to the LIDAR apparatus 400 discussed earlier with reference to FIGS. 18-21, it is noted that one way to increase the horizontal resolution of the LIDAR apparatus would be to increase the density of sensor elements used to measure the horizontal dimension of each segment of the FoV. For example, in the context of the example implementation of the optical receiver 408 shown in FIG. 19, the 2×32 array of APDs of the sensor unit 409 to a 2×64 array of APDs such that the nominal 7.5° horizontal dimension of each tile of the FoV is measured using 64 APDs rather than 32 would double the horizontal resolution by decreasing the horizontal pixel-to-pixel distance from 0.234° to 0.117°. However, increasing the horizontal resolution in this manner can become prohibitively difficult for several reasons, such as the generally increased cost of larger sensor arrays and/or spatial limitations because larger sensor arrays generally have a larger physical footprint.

Another aspect of the present disclosure provides a LIDAR apparatus comprising a beam steering engine that includes a discrete beam steering engine configured to deflect light beams at an increased number of horizontal deflection angles within the FoV in order to provide increased horizontal resolution.

Figure 46:
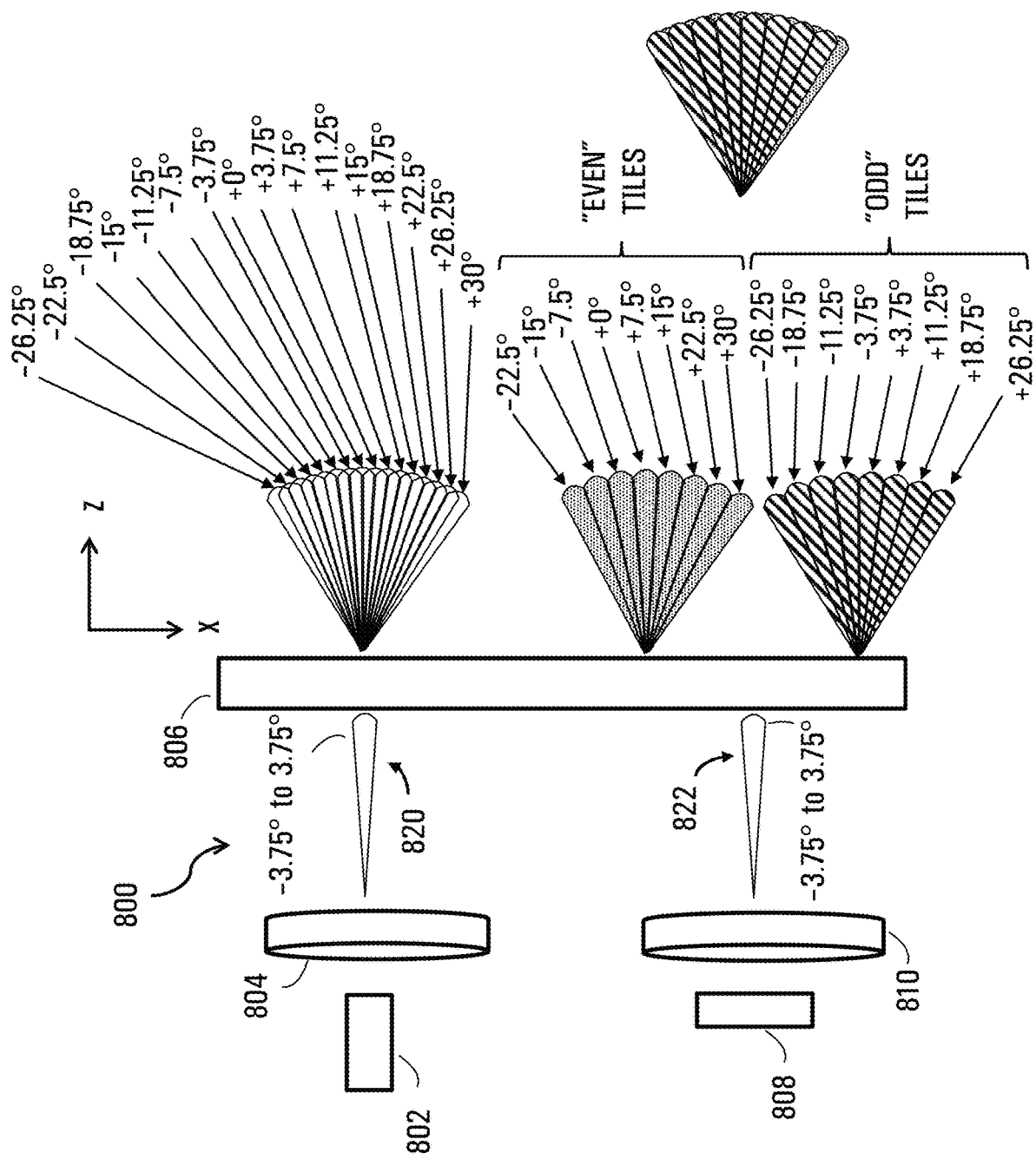
FIG. 46 shows a top down view of a LIDAR apparatus configured to provide increased horizontal resolution.

For example, FIG. 46 shows a top down view of a LIDAR apparatus 800 that is similar to the LIDAR apparatus 400 of FIG. 18A but has a LCPG beam steering element 806 that includes twice as many columns of tiles compared to the LCPG beam steering element 406 of FIG. 18A to provide increased horizontal resolution.

As shown in FIG. 46, the LIDAR apparatus 800 includes a transmitting stage that includes a laser source 802 and associated optics 804, a receiving stage that includes an optical receiver 808 and associated optics 810, and a beam steering engine that includes a multi-stage LCPG beam steering element 806. A number of components of the LIDAR apparatus 800 have been omitted from the illustration in the interest of clarity. For example, similar to the LIDAR apparatuses discussed above, the LIDAR apparatus 800 may include a controller that receives outputs from the receiver 808 and controls the operation of the transmitting stage and the operation of the steering engine such as to synchronize all these components.

In this example each tile of the multi-stage LCPG beam steering element 406 has a nominal FoV of 7.5°×6.0° (Horizontal×Vertical) for a given steering direction or tile and a full FoV of 60°×24° that includes four rows of sixteen tiles each, for a total of sixty-four 7.5°×6.0° tiles. In contrast to the LCPG beam steering engine 406 of FIG. 18A, in which the horizontal tile-to-tile spacing between horizontally adjacent tiles was nominally 7.5° (i.e., substantially equal to the nominal 7.5° horizontal dimension of each tile of the FoV), the horizontal tile-to-tile spacing between horizontally adjacent tiles of the LCPG beam steering engine 806 is nominally 3.75°, (i.e., substantially equal to half the nominal 7.5° horizontal dimension of each tile of the FoV). This means that the nominal 7.5° horizontal dimension of each tile of the FoV is effectively measured twice by the optical receiver 708 as the LCPG beam steering element 806 scans horizontally over its 16 columns of tiles that are nominally spaced by 3.75°.

As shown in FIG. 46, the LCPG beam steering element 806 is capable of steering an optical beam from the light source 802 in any of sixteen horizontal directions that are generally uniformly distributed between −26.25° and +30° in nominally 3.75° increments. For example, if, as shown in FIG. 46, an optical beam 820 from the light source 702 is incident on the LCPG beam steering element 806 at a normal angle relative to the horizontal axis and has a horizontal extent of 7.5°, then the LCPG beam steering element 806 is capable of steering the optical beam over any of sixteen tiles that are generally uniformly distributed between −30° and 30°. In the corresponding reception path for light reflected off object(s) in the FoV back to the LIDAR apparatus 800, the LCPG beam steering element 806 essentially acts in reverse. In particular, the LCPG beam steering element 806, via the reception optics 810, directs reflected light beams onto optical receiver 808.

Figure 47:
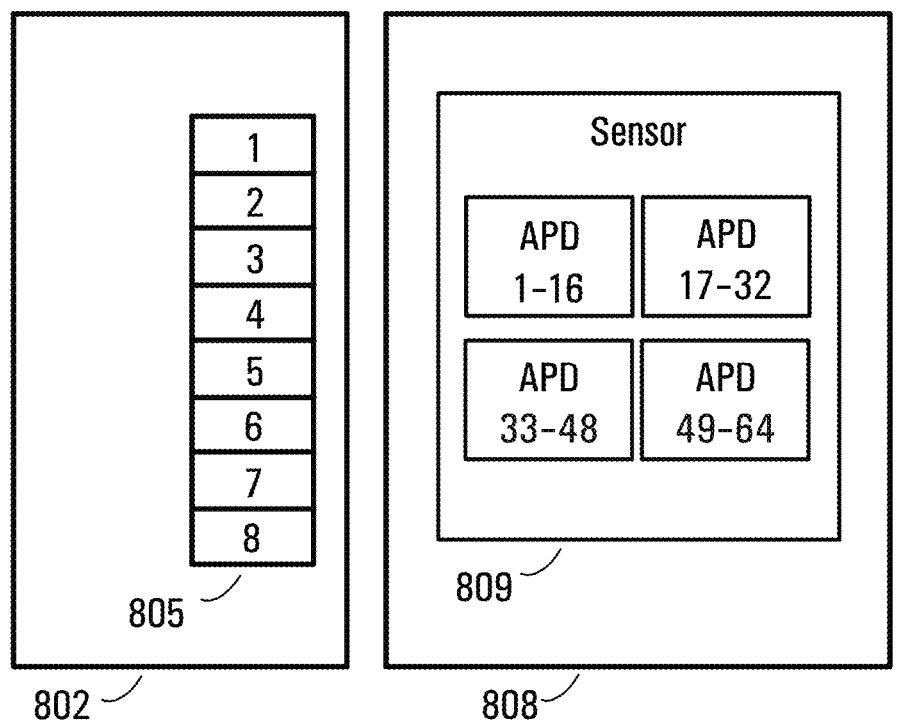
FIG. 47 shows an example configuration of the light source and the optical receiver of the LIDAR apparatus of FIG. 46.

In some embodiments, the light source may implement a multi-channel laser light source. The multi-channel laser light source may be similar to the 8-channel laser light source 405 described earlier. For example, FIG. 47 shows an example configuration of the light source 802 and the optical receiver 808 in which the light source 802 implements an 8-channel laser light source 805 and the optical receiver implements a sensor unit 809 that includes a 2×32 APD array. In this configuration, laser channels 1-4 optically correspond to the top 1×32 APDs of the sensor unit 809 and laser channels 5-8 optically correspond to the bottom 1×32 APDs of the sensor unit 809. Here it is noted that by utilizing 32 APDs to measure each of sixteen generally uniform 3.75° horizontal segments across a horizontal FoV that spans substantially 60°, the resulting generally uniform horizontal resolution is approximately 0.117°.

Figure 48:
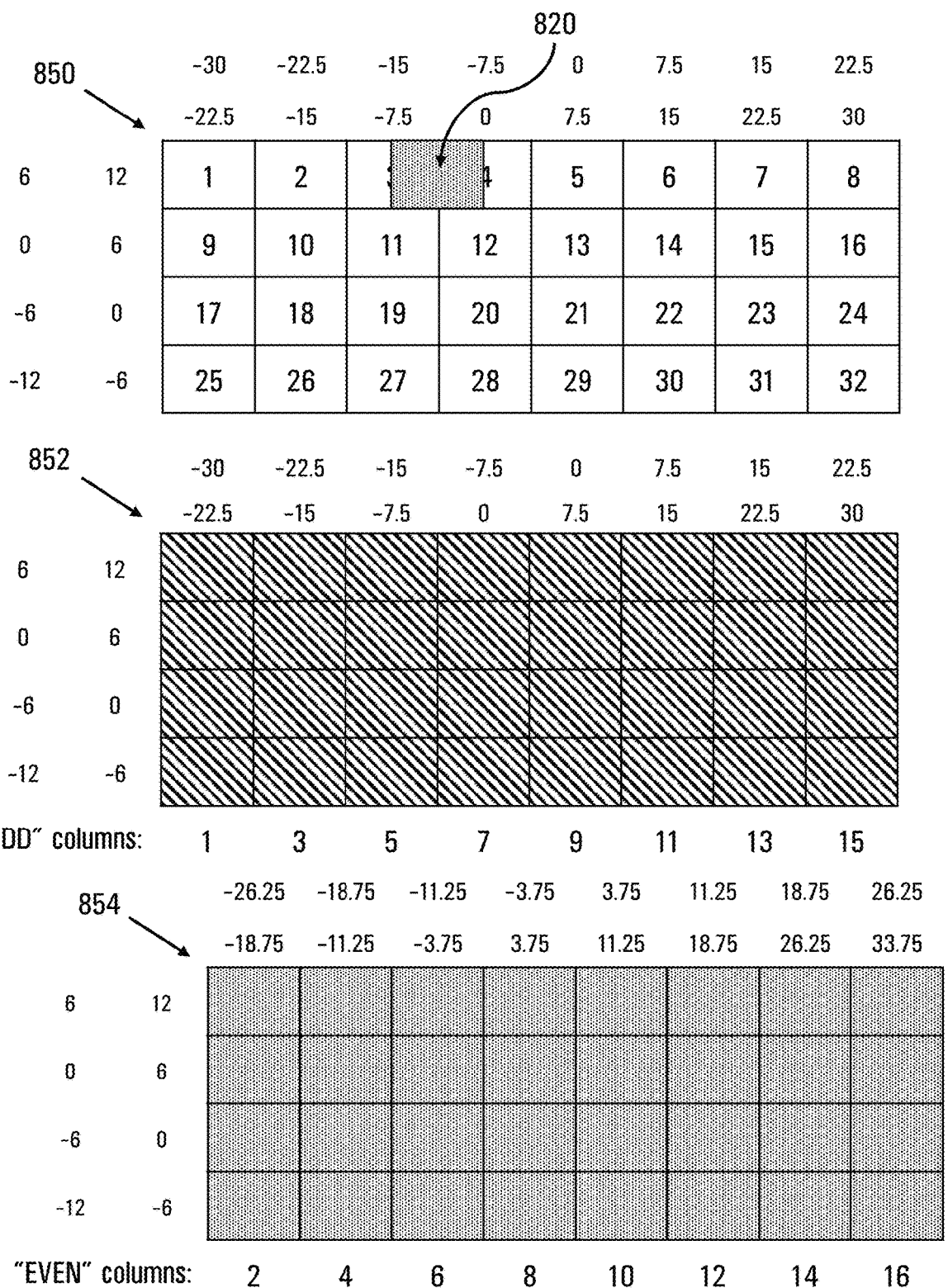
FIG. 48 shows a field of view of the LIDAR apparatus of FIG. 46, and the 16×4 selectable tiles of the LCPG beam steering element divided into eight "Odd" columns and eight "Even" columns.

FIG. 48 shows a field of view 850 of the LIDAR apparatus 800 divided into 32 segments, and the 16×4 selectable tiles of the LCPG beam steering element 806 that include eight "Odd" columns of four rows of tiles (generally indicated at 852 in FIG. 48) and eight "Even" columns of four rows of tiles (generally indicated at 854 in FIG. 48). As shown in FIG. 48, the "Odd" columns 852 and "Even" columns 854 are nominally offset by 3.75°. In FIG. 48, the LCPG beam steering element 806 is controlled to steer the light beam from laser source 802 using a tile from "Even" column 6, which in this case corresponds to a deflection of +9° vertically and −7.5° horizontally relative to the original direction of propagation of the light beam.

Figure 49A:
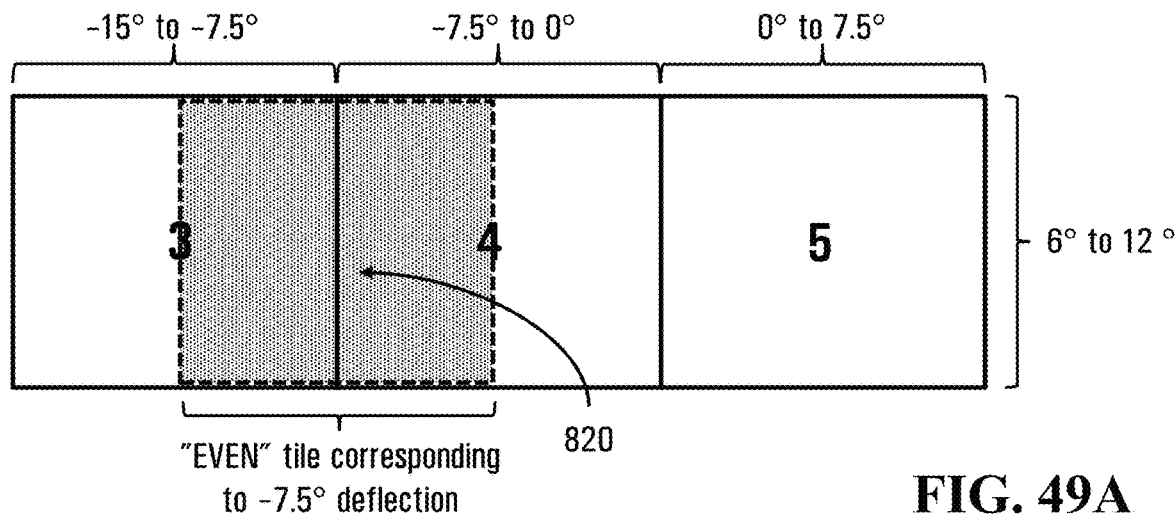
FIGS. 49A, 49B and 49C show an example of scanning across a tile of the FoV of the LIDAR apparatus of FIG. 46 using the 16×4 selectable tiles of the LCPG beam steering element to obtain an increased horizontal resolution.
Figure 49B:
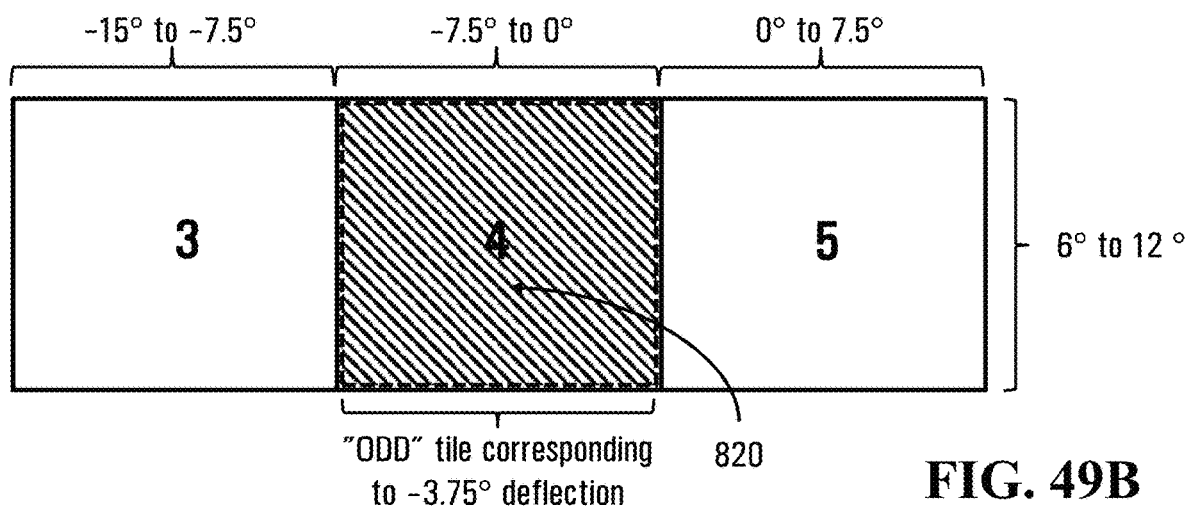
Figure 49C:
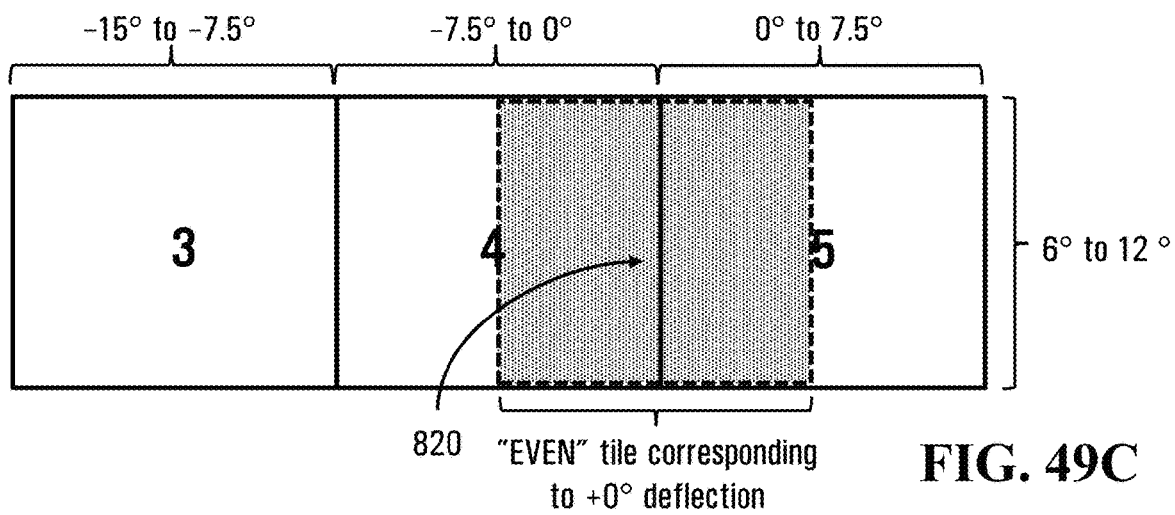

FIGS. 49A-49C show an example of the light beam 820 being scanned across tile 4 of the FoV 850 in 3.75° increments using an "Even" tile from column 6 corresponding to −7.5° horizontal deflection and +9° vertical deflection (FIG. 49A), an "Odd" tile from column 7 corresponding to −3.75° horizontal deflection and +9° vertical deflection (FIG. 49B), and an "Even" tile from column 8 corresponding to +0° horizontal deflection and +9° vertical deflection (FIG. 49C). As shown in FIGS. 49A-49C, the 7.5° horizontal extent of tile 4 of the FoV is scanned twice by the three steering configurations; a first portion of tile 4 is scanned in FIG. 49A, the first portion of tile 4 is scanned again along with a second portion of tile 4 in FIG. 49B, and the second portion of tile 4 is scanned again in FIG. 49C, which means that both portions of tile 4 are scanned twice. Furthermore, the difference between horizontal steering angles of FIGS. 49A, 49B and 49C is such that the scanning of the first portion of tile 4 in FIG. 49A and the scanning of the first portion of tile 4 in FIG. 49B are offset such that an increased horizontal resolution is achieved.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Circuitry, as used herein, may be analog and/or digital, components, or one or more suitably programmed microprocessors and associated hardware and software, or hardwired logic. Also, "components" may perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory may be electrically based or optically based.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

In case of any discrepancy, inconsistency, or other difference between terms used herein and terms used in any document incorporated by reference herein, meanings of the terms used herein are to prevail and be used.

Although various embodiments and examples have been presented, this was for purposes of describing, but should not be limiting. Various modifications and enhancements will become apparent to those of ordinary skill and are within a scope of this disclosure.

The invention claimed is:

1. A LIDAR apparatus, comprising:
   a. a non-mechanical beam-steering engine configured to receive an incident light beam, the beam-steering engine including an optical element switchable between first and second operational modes in response to a control signal, in the first operational mode the incident light beam passes through the beam-steering engine and it is output along a first propagation direction to illuminate a scene, in the second operational mode the incident light beam passes through the beam-steering engine and it is output along a second propagation direction to illuminate the scene, a transition time between the first mode and the second mode being shorter than a transition time between the second mode and the first mode,
   b. a receiver optically coupled to the non-mechanical beam-steering engine to sense optical returns produced as a result of illumination of the scene and propagating back to the receiver via the non-mechanical beam-steering engine, the receiver configured to generate output signals conveying a depth map of the scene in response to acquisitions of optical returns,
   c. a controller coupled to the receiver and to the non-mechanical beam-steering engine and configured to:
      i. generate the control signal for causing the non-mechanical beam steering engine to switch from the second mode to the first mode,
      ii. delay acquisition of light returns by the receiver until the non-mechanical beam-steering engine has transitioned to the first mode.

2. A LIDAR apparatus as defined in claim 1, wherein the optical element includes a liquid crystal layer.

3. A LIDAR apparatus as defined in claim 2, wherein a transition between the first mode and the second mode includes an up-voltage transition.

4. A LIDAR apparatus as defined in claim 3, wherein a transition between the second mode and the first mode includes a relaxation transition.

5. A LIDAR apparatus as defined in claim 4, wherein the optical element includes either one of a polarization grating and a polarization selector.

6. A LIDAR apparatus as defined in claim 4, wherein the optical element includes a polarization grating configured to receive the light beam, wherein the light beam has one of a first polarization state and a second polarization state, wherein the polarization grating is configured to re-direct the light beam in one of two propagation directions in dependence of the polarization state of the light beam.

7. A LIDAR apparatus as defined in claim 6, wherein the non-mechanical beam-steering engine includes a polarization selector stacked upstream on the polarization grating, the polarization selector being switchable in response to the control signal to set the polarization state of the light beam in a selected one of the first and second polarization state.

8. A LIDAR apparatus as defined in claim 1, wherein the controller controls the receiver such that the receiver acquires optical returns at periodic acquisition intervals, the controller being further configured to skip acquisition intervals until the beam-steering engine has transitioned to the first mode.

9. A LIDAR apparatus, comprising:
   a. a non-mechanical beam-steering engine configured to receive an incident light beam, the beam-steering engine including an optical element switchable between first and second operational modes in response to a control signal, in the first operational mode the incident light beam passes through the beam-steering engine and it is output along a first propagation direction to illuminate a scene, in the second operational mode the incident light beam passes through the beam-steering engine and it is output along a second propagation direction to illuminate the scene, a transition time between the first mode and the second mode being shorter than a transition time between the second mode and the first mode,
   b. a receiver optically coupled to the non-mechanical beam-steering engine to sense optical returns produced as a result of illumination of the scene and propagating back to the receiver via the non-mechanical beam-steering engine, the receiver configured to generate output signals conveying a depth map of the scene in response to acquisitions of optical returns,
   c. a controller coupled to the receiver and to the non-mechanical beam-steering engine and configured to:
      i. generate the control signal for causing the non-mechanical beam steering engine to switch from the second mode to the first mode,
      ii. time the acquisition of the optical returns by the receiver such that they occur outside the transition time between the second mode and the first mode.

10. A LIDAR apparatus as defined in claim 9, wherein the optical element includes a liquid crystal layer.

11. A LIDAR apparatus as defined in claim 10, wherein a transition between the first mode and the second mode includes an up-voltage transition.

12. A LIDAR apparatus as defined in claim 11, wherein a transition between the second mode and the first mode includes a relaxation transition.

13. A LIDAR apparatus as defined in claim 12, wherein the optical element includes either one of a polarization grating and a polarization selector.

14. A LIDAR apparatus as defined in claim 13, wherein the optical element includes a polarization grating configured to receive the light beam, wherein the light beam has one of a first polarization state and a second polarization state, wherein the polarization grating is configured to re-direct the light beam in one of two propagation directions in dependence of the polarization state of the light beam.

15. A LIDAR apparatus as defined in claim 14, wherein the non-mechanical beam-steering engine includes a polarization selector stacked upstream on the polarization grating, the polarization selector being switchable in response to the control signal to set the polarization state of the light beam in a selected one of the first and second polarization state.

16. A LIDAR apparatus as defined in claim 9, wherein the controller controls the receiver such that the receiver acquires optical returns at periodic acquisition intervals, the controller being further configured to skip acquisition intervals until the beam-steering engine has transitioned to the first mode.

17. A LIDAR apparatus, comprising:
   a. a non-mechanical beam-steering engine configured to receive light returns from a scene through a Field of View (FOV) as a result of illumination of the scene with a light beam, the beam-steering engine defining a set of tiles in the FOV, that are individually switchable between inactive and active states, a tile in the active state enabling reception of light returns, a switch of a tile between an inactive state and an active state including a transition time period,
   b. a receiver optically coupled to the non-mechanical beam-steering engine to sense optical returns from a tile in the active state and propagating back to the receiver via the non-mechanical beam-steering engine, the receiver configured to generate output signals conveying a depth map in response to acquisitions of the optical returns from the tile in the active state,
   c. a controller coupled to the receiver and to the non-mechanical beam-steering engine and configured for synchronizing the switching of the individual tiles between the inactive and the active states and the acquisition of the optical returns such that the acquisition of the optical returns is performed outside of the transition time periods.

* * * * *